US006522311B1

(12) United States Patent
Kadowaki et al.

(10) Patent No.: US 6,522,311 B1
(45) Date of Patent: Feb. 18, 2003

(54) IMAGE INFORMATION DISPLAYING SYSTEM AND HOLOGRAM DISPLAY APPARATUS

(75) Inventors: Satoru Kadowaki, Mie (JP); Tooru Matsumoto, Ichinomiya (JP); Naoyuki Kawazoe, Hashima (JP); Yasuhiro Mizutani, Mie (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/160,358

(22) Filed: Sep. 25, 1998

(30) Foreign Application Priority Data

| Sep. 26, 1997 | (JP) | ................................................ 9-279641 |
| Oct. 16, 1997 | (JP) | ................................................ 9-303576 |
| May 20, 1998 | (JP) | ................................................ 10-138131 |
| May 21, 1998 | (JP) | ................................................ 10-139897 |
| Jul. 15, 1998 | (JP) | ................................................ 10-200452 |
| Aug. 11, 1998 | (JP) | ................................................ 10-227223 |

(51) Int. Cl.⁷ .................................................. G09G 5/00
(52) U.S. Cl. ........................ 345/7; 345/8; 345/9; 359/11; 359/16
(58) Field of Search .............................. 345/87, 207, 5, 345/7, 8, 9; 348/744, 750, 751; 359/10, 11, 15, 16

(56) References Cited

U.S. PATENT DOCUMENTS

| 4,367,486 A | * | 1/1983 | Eichenlaub ................... 358/88 |
| 5,066,525 A | | 11/1991 | Nakamachi et al. |
| 5,337,073 A | * | 8/1994 | Tsunoda et al. ............. 345/207 |
| 5,515,079 A | * | 5/1996 | Hauck ......................... 345/157 |
| 5,528,263 A | * | 6/1996 | Platzker et al. ............. 345/156 |
| 5,557,324 A | * | 9/1996 | Wolff .......................... 345/207 |
| 5,572,251 A | * | 11/1996 | Ogawa ......................... 348/207 |
| 5,589,956 A | * | 12/1996 | Morishima et al. ............ 359/15 |
| 5,642,209 A | * | 6/1997 | Baker ........................... 359/10 |
| 5,708,519 A | * | 1/1998 | Yamamoto et al. ............ 359/15 |
| 5,844,530 A | * | 12/1998 | Tosaki ........................... 345/8 |
| 5,999,281 A | * | 12/1999 | Abbott et al. ................. 359/15 |
| 6,111,670 A | * | 8/2000 | Hattori et al. ................. 359/15 |

FOREIGN PATENT DOCUMENTS

| EP | 0 772 103 A2 | 5/1997 |
| JP | 3 60375 | 6/1991 |
| JP | 5 35192 | 2/1993 |
| JP | 6 43821 | 2/1994 |
| JP | 8 266186 | 10/1996 |
| JP | 9 32856 | 2/1997 |
| JP | 9-33856 | 2/1997 |
| JP | 9-114354 | 5/1997 |

* cited by examiner

Primary Examiner—Richard Hjerpe
Assistant Examiner—Kimnhung Nguyen
(74) Attorney, Agent, or Firm—Harness, Dickey & Pierce, PLC

(57) ABSTRACT

An image information displaying system comprises a transparent support, a hologram screen attached to the transparent support, a radiation unit for radiating image information on the hologram screen, a sensor for detecting the ambient condition within the viewing angle of the hologram screen, and a controller for controlling the radiation unit based on the signal from the sensor. The image information displaying system, which is inexpensive, long in service life, superior in eye-catching effect and low in running cost, consumes less energy and is controlled by a central control unit connected thereto through a communication line. The lower-end of the hologram screen is 80 to 180 cm from the floor level.

30 Claims, 44 Drawing Sheets

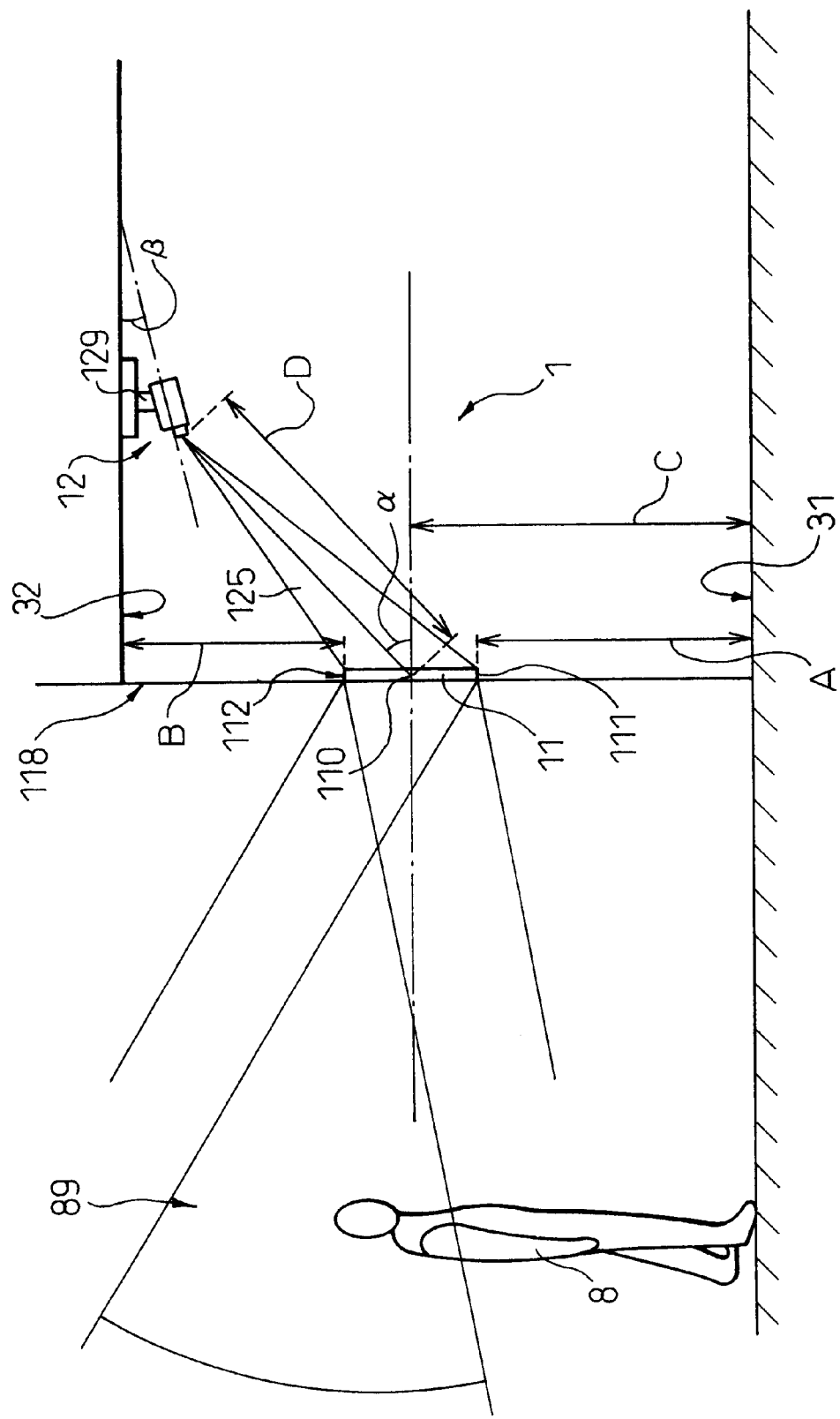

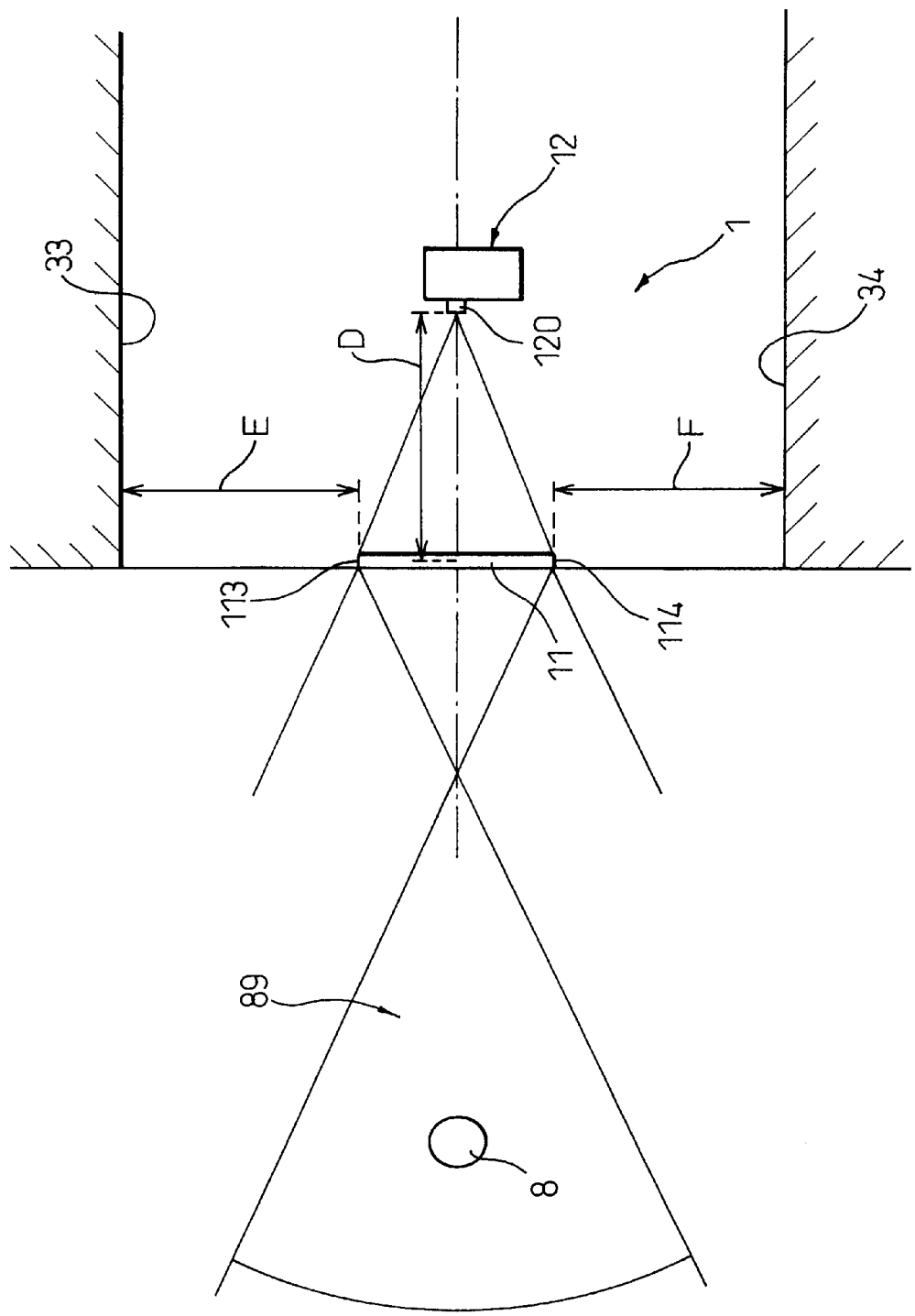

111

11

111

11

111

11

111

11

111

11

111

IMAGE INFORMATION DISPLAYING SYSTEM AND HOLOGRAM DISPLAY APPARATUS

BACKGROUND OF THE INVENTION

1. Field of the Invention

The present invention relates to an image information displaying system and hologram displaying apparatus, capable of being installed in a showroom and so forth, for presenting image information including moving and still images.

2. Description of the Related Art

Image information displaying systems are widely used to present image information including moving and still images to passersby and viewers in front of showrooms. These systems are composed of a screen and a unit for supplying image information to the screen.

A typical image information displaying system employs a videotape, an optical disk, or slides to store image information, a video deck, an LD player, or a projector to reproduce the image information, and a CRT or a liquid-crystal panel to display the reproduced image information.

Poorly presented image information hardly attracts the attention of passersby, and therefore, hardly realizes advertising and eye-catching effects.

Image information to be displayed must be adjusted so that it can be recognized easily by people. If image information is poorly adjusted and is hardly recognizable, it will not appeal to, or attract the attention of, people.

Image information must be adjusted according to ambient conditions around the location where the image information displaying system is installed. It is very difficult to adjust image information beforehand. In particular, when the system is installed outdoors or facing the outdoors, the values of parameters used to adjust image information vary from hour to hour and are dependent on weather and seasonal conditions.

Usually, the system is continuously operated to always display image information. The system, therefore, consumes a large amount of power and energy, has high running costs, and has a short service life.

A conventional image information displaying system comprising a screen and a means for supplying image information to the screen finds application as a means for presenting image information, as still pictures or a moving picture, from a showroom or the like to passersby and other viewers in general.

Specifically, the image information recorded in the videotape, the optical disk, slides or the like is reproduced and presented using a displaying system such as a CRT or a liquid crystal panel connected to various reproduction or playback apparatuses including a video deck, an LD player and a projector.

Consider the case in which an image information displaying system is used for presenting information to chain store outlets or branch offices located over wide areas.

In such a case, for the image information displaying system of each outlet or branch office to be operated practically, it is necessary to teach the operating know how to each outlet and branch office and to train the staff therein. This poses no problem if the image information displaying systems are installed within a small area or in a small number or the workers are limited in number. In the case where the image information systems are installed over a wide area, in many units or must be operated by many workers, however, the presentation of information requires the troublesome and expensive work of training the workers, distributing operating manuals, etc.

No available image information displaying system places sufficient emphasis on reduced costs for management and practical operation (education and training as examples) of each of a multiplicity of systems installed over a wide area.

In the case where the image information displaying system is used for displaying a commercial for a commodity, for example, the mere presentation of image information on the image displaying system can hardly attract the attention or interest of passersby or viewers, making effective advertisement difficult. In other words, the eye-catching effect is small.

The operation of an image information displaying system, therefore, requires an appropriate adjustment of the image information to make it easily visible to passersby and viewers and to attract their attention even more. The adjustment for presenting more visible image information may include brightness adjustment, color drift correction, determination of appropriate hue or adjustment of the position at which the image is displayed.

As long as the image information is difficult to recognize due to insufficient adjustment, the image information is less appealing to passersby and viewers and a good eye-catching effect is often difficult to produce.

To cope with the above-mentioned problems and to improve the eye-catching effect, a method has been conceived to install a means for adjusting the image information with each image information displaying system. The adjusting means, however, makes the image information displaying system more expensive. In addition, the maintenance and inspection as well as the operation of the adjusting means often increases the system cost.

Also, since the image information displaying system is kept in operation for presenting image information, the reproduction or playback unit and the display unit thereof are also kept in operation. The power consumed by these units is so large as to pose problems from the viewpoints of energy saving and running cost. Further, the protracted operation time of the reproduction unit and the display unit shortens the service life thereof.

New display systems employing plasma display units, thin liquid-crystal display units, and projection television units are being developed to present still and moving images to passersby in front of showrooms.

To enhance an advertising effect, these systems must be made larger. The larger systems, however, frequently provide an oppressive feeling to viewers. This limits their possible locations, usability, and design flexibility.

To solve the problem and realize a high advertising effect, a display system employing a hologram screen has been proposed.

The hologram screen, as will be explained later in detail, consists of a transparent base and a thin-film hologram element attached thereto. The hologram element has interference fringes. When light containing image information is emitted onto the interference fringes, the light forms a real image, which is diffracted by the hologram element. Viewers see the real image reproduced on the hologram element.

The hologram element is transparent, and the hologram screen does not require a power source or a driver. The hologram screen, therefore, needs only a small installation space and the designing freedom thereof is good.

One problem of the hologram screen is that it has a limited viewing angle within which people can see images on the hologram screen. Accordingly, the hologram screen must be carefully installed so that viewers can correctly see images thereon.

To achieve correct positioning of the hologram screen, many experiments have been made. For example, a mirror method surrounds a light diffuser with mirrors to produce-object beams that irradiate a photosensitive material from different directions. The object beams and a reference beam record intricate interference fringes on the photosensitive material. The photosensitive material is used as a hologram element of a hologram screen.

Even the hologram screen made by the mirror method has a limited viewing angle. Namely, the hologram element of the mirror method involves parts where no light diffuser is recorded, and therefore, images on the hologram screen are partly invisible depending on viewer's positions. At some position, images on the hologram screen provide low brightness, different colors, or poor quality for viewers.

In this way, it is very difficult to sufficiently expand the viewing angle of a hologram screen.

SUMMARY OF THE INVENTION

In view of the first viewpoint of the prior art, a first object of the present invention is to provide an image information displaying system capable of providing excellent eye-catching effects, reduced energy consumption and running costs, and an extended service life.

In order to accomplish the object, a first aspect of the present invention provides an image information displaying system having a transparent support, a hologram screen attached to the support, a projector for projecting image information onto the screen, a sensor for sensing ambient conditions within a viewing angle of the hologram screen, and a controller for controlling the projector according to signals from the sensor.

The hologram screen may be of a transmission type or of a reflection type.

To improve an eye-catching effect, preferably, the hologram screen may be transparent so that viewers may see a background and exhibits behind the screen.

The transparent hologram screen and support may achieve an effect of suddenly displaying image information in a vacant space to greatly attract the attention of people.

The transparent hologram screen does not disturb the view of other people, thereby improving the degree of freedom in designing and installing the system.

The transparent support may be a show window made of glass or resin, a front or rear window of a mobile body such as a car, a vessel, an airplane, or a train, a window panel of an office or a shop, or a wall made of glass or plastics of a guest room, or any other space.

The projector may be a slide projector, an overhead projector (OHP), or any device for projecting moving and still images.

The projector may receive image information from an external supply unit, which may be a player of videotapes and optical disks, or information processing equipment such as a personal computer connected to the Internet.

The projector emits a beam of image information onto the hologram screen, which diffracts and diffuses the beam into a conical area. Only within the conical area is the image information visible.

More precisely, each beam of image information from the projector forms a conical area on the hologram screen, and a viewer can see an image only in an overlap of such conical areas. These conical areas define a viewing angle of the hologram screen. The viewing angle will be explained later in detail.

A plurality of image information displaying systems may be installed and linked to one another. In this case, each system may have a sensor (embodiment A2), or the systems may share a single sensor.

The operation of the first aspect of the present invention will be described in the following.

The sensor senses ambient conditions in the viewing angle of the hologram screen, and the controller controls the projector according to signals from the sensor.

This system is capable of automatically starting, optimizing, and stopping image information provided by the projector according to ambient conditions detected in the viewing angle of the hologram screen.

For example, if the illuminance in the viewing angle is high, the system increases the brightness of image information, or changes the image information itself to another having a higher brightness, so that viewers may easily recognize the images.

If voices are sensed in the viewing angle, the system determines that there are people in the viewing angle and activates the projector to present image information to the people.

In this way, the present invention automatically changes the conditions and kinds of image information and starts and stops image information according to ambient conditions that vary from hour to hour.

The system provides eye-catching image information to strongly attract people's attention.

The projector may be automatically started and stopped according to situations, to shorten an actual operation time of the projector, thereby reducing power consumption and running costs.

Shortening the operation time of the projector may extend the service life thereof.

In this way, the system of the present invention reduces energy consumption and running costs and extends the service life.

A second aspect of the present invention defines the viewing angle of the hologram screen in an area where brightness is K0/2 or over (K0 being a brightness value at a front center point of the hologram screen).

Brightness within the viewing angle of the hologram screen is high and, therefore, viewers in the viewing angle may clearly recognize images on the hologram screen. Accordingly, images within the viewing angle achieve a high eye-catching effect.

In an area where brightness is below K0/2, viewers may recognize image information but may hardly grasp the contents thereof. In this case, the eye-catching effect of the image information is low. The brightness of the hologram screen is highest at the center thereof.

The details of K0 and the viewing angle of a hologram screen will be explained later.

A third aspect of the present invention employs, as the sensor, an illuminance sensor so that the image information displaying system may present optimum image information in the viewing angle of the hologram screen.

A fourth aspect of the present invention provides the image information displaying system with a speaker for providing audio information. In this case, the sensor is a volume sensor.

This arrangement provides audio information as well as image information, thereby providing an improved eye-catching effect.

The volume sensor senses a sound volume in the viewing angle of the hologram screen and feedback-controls the speaker, to optimize audio information as well as image information according to ambient conditions. If not needed, the speaker may be stopped to reduce running costs and prolong the service life.

A fifth aspect of the present invention uses the sensor to detect the presence of people in the viewing angle of the hologram screen.

If people enter the viewing angle of the hologram screen, the fifth aspect activates the projector to project image information, or switches displayed image information to another.

If no image information is displayed, the hologram screen is inconspicuous to passersby. Accordingly, the fifth aspect may provide a high eye-catching effect by suddenly displaying image information in a vacant space where the hologram screen is installed.

The fifth aspect is capable of activating the projector only when people are present in the viewing angle of the hologram screen. This shortens an operation time of the projector, reduces power consumption and running costs, and prolongs the service life of the system.

The sensor may be an infrared sensor, a voice sensor, a vibration sensor, a weight sensor arranged on the floor, etc. A single sensor, a plurality of sensors, or a various types of sensors may be used in combination.

The sensor may sense not only people entering the viewing angle of the hologram screen but also people going out of the viewing angle. If the sensor senses that people enter the viewing angle, the controller starts the projector to project image information, and if the sensor senses that people exit the viewing angle, the controller stops the projector.

The arrangement of the fifth aspect secures the effect of the present invention.

A sixth aspect of the present invention installs the image information displaying system in a mobile body.

If the hologram screen is transparent, it does not bother the sight of people. In this case, the system does not block a driver of the mobile body from seeing the outside through the hologram screen. Accordingly, the system can be installed in a mobile body.

The system installed in a mobile body is used to display driver assisting information such as navigation information, or alarm information to the outside of the mobile body.

If the mobile body is a car, the system may display image information for passengers in the rear seat of the car.

A seventh aspect of the present invention arranges the image information displaying system between two seats of a mobile body.

This arrangement prevents the hologram screen from being exposed to the sun, thereby extending the service life thereof.

More precisely, this arrangement prevents discoloration and performance deterioration due to ultraviolet rays and heat from the sun.

An eighth aspect of the present invention makes the hologram screen of the image information displaying system retractable when it is not used.

This arrangement effectively uses a limited space in a mobile body. When the hologram screen is retracted, it is protected from being discolored or deteriorated due to ultraviolet rays and heat from the sun. This arrangement also makes the installation of the system into a mobile body easier.

The retractable hologram screen may be realized by winding, folding, or detaching of the screen.

The hologram screen may be arranged on a sunroof. In this case, a viewer sets himself or herself on a fully reclined seat to see image information.

The hologram screen may be integrated with or embedded in a seat of a mobile body (FIG. 14).

A ninth aspect of the present invention employs, as the sensor of the image information displaying system, a vibration sensor. The vibration sensor senses the vibration of a mobile body in which the system is installed. In response to signals from the vibration sensor, the controller of the system corrects a blur of image information on the hologram screen due to the vibration of the mobile body (FIG. 15).

A tenth aspect of the present invention employs the vibration sensor to suppress the vibration of the projector of the system against the vibration of the mobile body in which the system is installed (FIG. 16).

When the mobile body vibrates, the projector may provide blurred images. This problem is serious when the mobile body is large such as a bus or a truck because the vibration thereof is also large.

The tenth aspect uses the vibration sensor to detect vibration, electrically corrects image information according to signals from the vibration sensor, and projects the corrected image information from the projector onto the hologram screen, thereby correcting a blur of images on the screen.

The tenth aspect may have a mechanism for suppressing the vibration of the projector. The mechanism is driven in response to signals from the vibration sensor, to correct a blur of images on the hologram screen.

The system of the tenth aspect is capable of displaying blur-free images in the mobile body.

The mechanism for suppressing the vibration of the projector may be a damper or a piezoelectric actuator.

An eleventh aspect of the present invention connects image information displaying systems to a central control unit through a communication circuit and controls the systems by the central control unit.

The central control unit centrally controls and manages the systems, to save manpower.

The communication circuit may be a public or private voice circuit (telephone circuit), a moving image circuit of, for example, a cable television service using optical cables, or a radio circuit such as a communication satellite digital circuit. Any wire or wireless communication circuit can be used for the eleventh aspect. The Internet can also be used.

Image information to be displayed may be held at the image information displaying systems or at the central control unit. In the latter case, the central control unit can centrally manage image information, to reduce management costs.

For example, each image information displaying system is installed in each branch office, and the central control unit in the head office, which distributes new product information simultaneously to the branch offices so that the branch offices may release an announcement of the new product at the same time. This saves the labor of sending materials related to the new product to the branch offices beforehand.

In another example, each image information displaying system is installed in each chain store, and the central control unit in the head office. This provides the same effect as the above example. In addition, updating commodity information is made only in the central control unit. This eliminates each chain store's labor of updating the commodity information.

If the central control unit must hold image information, it is preferable to employ a high-speed communication circuit such as a wide-band private circuit to distribute the image information to the branch offices or chain stores.

A twelfth aspect of the present invention makes the central control unit receive signals from the sensor of each system through a communication circuit and controls the projector of the system in question according to the signals to project image information onto the hologram screen of the system.

This arrangement secures the effect of the present invention.

A thirteenth aspect of the present invention records a diffuser on the hologram screen of the image information displaying system.

This aspect provides an effect of displaying full-color images on the hologram screen.

In view of the above-mentioned problems in the second viewpoint of the prior art, a second object of the invention is to provide an inexpensive image information displaying system which has a low maintenance/inspection cost, a low running cost and a long service life.

In order to achieve the second object described above, according to a 14th aspect of the invention, there is provided an image information displaying system comprising a transparent support, a hologram screen attached to the transparent support, and a radiation unit for irradiating the hologram screen with image information, the image information displaying system being controlled by a central control unit connected thereto through a communication line.

The central control unit can be configured as a mainframe computer or various work stations or the like, for example. For improving the effect of the invention further, each central control unit is desirably connected with a great number of image information displaying systems.

Various communication lines are available for use including the audio communication lines such as the telephone network and leased lines, optical fiber cables for distribution of image sequences used on the cable TV or the like, radio channels such as the CS digital line using an earth satellite, or various other wire and wireless channels. A computer network such as the Internet can also be used.

A transmission-type hologram screen can be used as the above-mentioned hologram screen. A hologram screen of a reflection type is another candidate.

A transparent hologram screen is desirable for assuring an improved eye-catching effect. This makes possible a configuration in which viewers can see commodities exhibited and the background behind the hologram screen through the hologram screen.

Also, for its ability to present image information suddenly in an apparently vacant space (although a transparent support and a hologram are actually installed), the hologram can attract the attention and interest of viewers considerably.

Further, the image information displaying system, which can be configured to not interfere the viewing field of viewers, can be installed with a higher freedom.

The transparent support includes window glass made of various types of glass or plastics, the rear and front glass of various mobile bodies (such as automobiles, seagoing vessels, airplanes and electric trams), the window glass used in branch offices and retail outlets, and the glass window panes and transparent walls arranged around a guest room or the like.

The radiation unit, on the other hand, includes a slide projector, an OHP (overhead projector), a liquid crystal projector, a motion picture projector and various other devices capable of radiating still images and image sequences.

The image information can be supplied to the radiation unit also from an external source. External information sources include reproduction or playback units such as videotape and optical disk players and information processing systems such as personal computers connected to the internet. Also, image information can be distributed from a central control unit.

The operation and effects of the 14th aspect of the invention will be explained.

The image information displaying system according to this aspect of the invention is so configured as to be controlled by a central control unit connected thereto through a communication line.

The central control unit makes possible the collective management and practical operation of the image information displaying systems, thereby reducing the cost for management and practical operation which otherwise would be required on the part of the image information displaying system. The staff and labor cost can thus be reduced.

Since the job of management and practical operation of the image information displaying system can be left to the central control unit, the construction of each image information displaying system is simplified for a correspondingly reduced cost thereof. In other words, the image information displaying system can be constructed in so simplified a fashion as to have only the functions of displaying images and accepting the control from the central control unit.

The simplicity of the image information displaying system reduces the system cost on the one hand and the maintenance cost for repair and inspection as well as the running cost at the same time. The simple construction is also a factor in reducing the number of system faults.

Further, the various adjustments of the parts of the image information displaying system which can be accomplished from the central control unit facilitates the system operation. The labor of educating and training the workers can thus be saved. Also, the simplicity of the system configuration can produce an image information displaying system easy to handle even by unskilled workers.

An example of the mechanism for management and operation is a diagnosis mechanism for discovering a fault and deterioration at an early time. Provision of the diagnosis mechanism in the central control unit lengthens the service life of the system while at the same time preventing the image information displaying system from being complicated in structure and increased in cost.

It is also possible to start and stop the operation of the image information displaying system at a preset time. The system can be suspended from operation or put into continuous operation or otherwise controlled by the central control unit. Since the image information displaying system can thus be operated only when required and can be controlled in fine detail, the system life is lengthened and the running cost thereof is reduced.

In addition, emergency and newspaper information, as well as the original image information to be displayed, can be selected as desired by the management thereof.

The hologram screen irradiated with the image information displays the image by diffraction and scattering the radiated beam containing the image information. The hologram which has no power supply and no driving unit contributes to reduction in running cost and saves energy for the image information displaying system according to the invention.

As described later, the hologram screen requires some correction and adjustment for displaying a clear-cut, normal image having a strong impact on, and giving a vivid impression to, viewers.

The image information displaying system according to this invention, which can be adjusted and corrected by the central control unit, eliminates the need of the various troublesome jobs of adjustment and correction on the part of the image information displaying system, thus reducing the management cost and labor in general.

The data for image information radiated can be incorporated in either the image information displaying system or the central control unit. In the latter case, the image information can be centrally controlled by the central control unit for a reduced management cost.

Assume, for example, that a party for unveiling a new product is held in all branch offices at the same time. The image information displaying system according to the invention is installed in each branch office and the central control unit in the head office from which the information on the new product can be distributed to the branch offices in various areas. This saves the trouble of distributing the information on the new product to various areas in advance.

Another example application is to install the image information displaying system at each outlet of a chain store or the like and the central control unit at the headquarters. This has the same effect as the preceding case. Further, the information on commodities can be updated simply by updating the image information incorporated in the central control unit.

For locating the image information in the central control unit, a high-speed communication line (wide-area leased line, for example) is desirably used.

The 14th aspect of the invention described above can thus provide an inexpensive image information displaying system with low running, maintenance and inspection costs and a long service life.

A 15th aspect of the invention is desirably configured in such a way that the central control unit alone corrects the image-information, or in such a way that the central control unit or a relay interposed between the central control unit and the image information displaying system corrects the image information.

The provision of the relay permits part of the processing in the central control unit to be transferred to the relay. The processing can thus be distributed between the central control unit and the relay, thereby making it possible to improve the stability and speed of the processing of the whole network including the central control unit and the image information displaying system.

In addition, a local area network can be formed with the relay as a base. Thus finely detailed control meeting local requirements is made possible.

Also, the following general properties of the hologram screen are known. Specifically, the scattered beam emitted from the hologram screen often has a peak in a specified wavelength range, even when the incident beam is white, often with the result that the tone of the image reproduced on the hologram screen is different from that of the radiated beam.

For this reason, image color adjustment and color correction are crucial in using the hologram screen.

The image information displaying systems distributed to various points are adjusted by individual workers. Due to the difference in color sense from one person to another, however, it is very difficult to adjust and correct the color of the images displayed on all the image information displaying systems to the same state.

The collective control using the central control unit as in the 15th aspect of the invention, however, can maintain the same state of the image information displayed on a multiplicity of systems distributed over a wide area. At the same time, the labor of the workers is reduced. This labor saving effect can reduce the cost and trouble of the whole management.

The fact that the image information can be corrected by the central control unit or the relay makes it possible to display a correct image normally free of a color drift between the radiated beam and the displayed image.

Also, the elimination of the need of correction and adjustment on the part of the image information displaying system can save the equipment for image information correction which otherwise would be required in each image information displaying system. The cost of the image information displaying system can thus be reduced. Further, since the cost for repair and inspection and the running cost of the correction unit is not required, the system cost can accordingly be reduced.

Furthermore, in displaying a commercial of a commodity as image information, for example, the sponsor of the commercial who emphasizes the image of the commodity may request the faithful reproduction of fine color texture of the image information.

With the image information displaying system according to the 15th aspect, the image information can be collectively corrected at the central control unit and therefore such a request can be readily met.

It is also possible to incorporate the image information in the central control unit, and after correction, distribute it among the image information displaying systems for display. The image information stored in each image information displaying system can also be corrected individually.

According to a 16th aspect of the invention, the above-mentioned correction is preferably that of a trapezoidal distortion.

In order to prevent the radiated beam from directly entering the eyes of the viewer, the radiation unit is generally installed at an angle to the hologram screen. The radiation unit, therefore, is often located at a position diagonally above or below the hologram screen.

Locating the radiation unit at such a position may cause a trapezoidal distortion of the image on display as shown in FIG. 33a.

According to this aspect of the invention, as shown in FIG. 33b, the trapezoidal distortion of the image information is reversely corrected by the central control unit in advance. Therefore, as shown in FIG. 33c, the image information displaying system can display a normal image.

As in the 15th aspect, the image information displaying system is not required to correct the trapezoidal distortion. Therefore, the trapezoidal distortion correction unit can be eliminated from the image information displaying system, and the cost of the image information displaying system can be reduced.

Other details are similar to those of the 15th aspect.

Also, as the 16th aspect of the invention, the correction described above is desirably at least one of the processes including the color adjustment, color correction, image position adjustment, image brightness adjustment and the image contrast adjustment.

As a result, a clear-cut image having a strong impact on viewers can be displayed.

According to a 17th aspect of the invention, the image information displaying system includes means for supplying audio information, and the central control unit or the relay is preferably configured to correct the audio information.

The provision of the means for supplying audio information leads to an image information displaying system having a superior eye-catching effect which can present both image information and audio information.

As in the 15th aspect, the correction of audio information is not required on the part of the image information displaying system, and therefore the audio information correction unit can be eliminated from the image information displaying system. The cost of the image information displaying system can thus be reduced.

Other details are similar to those of the 15th aspect.

The processing for correcting the audio information includes the automatic starting and automatic stopping of the system, adjustment of sound volume or sound quality, selection and switching of audio information, etc.

The means for supplying audio information is a speaker, for example.

According to an 18th aspect of the invention, the image information displaying system preferably comprises a sensor for detecting the ambient conditions within the viewing angle of the hologram screen and a radiation control unit configured to control the radiation unit based on the signal from the sensor.

As described above, in the case where the image information displaying system is used for presenting a commercial of a commodity, the mere image information appearing on the image information displaying system fails to attract the attention and interest of passersby or viewers, thereby making effective advertisement and publicity difficult. In other words, the eye-catching effect is low.

When using an image information displaying system, therefore, it is necessary to adjust the image information to a most visible form for passersby and viewers in such a manner as to attract their maximum attention. As long as the system is not sufficiently adjusted and the image information remains difficult to recognize, the image information is less appealing to passersby and viewers and can rarely produce a good eye-catching effect. The adjustment for this purpose may include adjusting the brightness for making the image easy to see, correcting the color drift, selecting an appropriate hue and adjusting the position at which the image is displayed.

The effective adjustment of the image information depends on the environment in which the image information displaying system is installed. Therefore, it has thus far been difficult to preset adjustment values for the image information displaying system. Especially in outdoor applications or applications at a location facing the outdoor environment, the optimum adjustment values for the image information system undergo a constant change with time, weather conditions and the season of the year.

With the image information displaying system according to the 18th aspect of the invention, the condition and type of image information can be changed or the presentation of the image information can be started or stopped automatically in accordance with the various ambient conditions undergoing a constant change within the viewing angle.

In the case where the ambient illuminance within the viewing angle is high, for example, the brightness of the image information is increased or the image information is changed to the one of higher brightness or otherwise image information easily visible to viewers can be supplied.

When the voice of a person is sensed within the viewing angle, for example, the presence of a viewer within the viewing angle is assumed and the radiation unit is activated to supply the image information to the particular viewer.

As a result, the image information can be supplied with such a high eye-catching effect as to attract the attention of the viewer sufficiently.

In the image information displaying system according to the 18th aspect, the radiation unit can be configured to operate automatically as required and therefore the substantial operation time of the radiation unit can be shortened. The power consumption of the radiation unit can thus be saved for a lower running cost.

Also, the shorter operating time of the radiation unit can lengthen the service life thereof.

As described above, according to the 18th aspect of the invention, an image information displaying system is provided which has a high eye-catching effect, is low in running cost and has a long service life.

Further, a plurality of image information displaying systems according to the invention can be used in coordination with each other through a central control unit. In such a case, the image information displaying systems each can be provided with a sensor (embodiment B2) or can share a sensor.

According to a 19th aspect of the invention, the viewing angle is desirably located in an area having a brightness of at least K0/4 (K0 represents the brightness value at the front center of the hologram screen).

The brightness of the hologram screen as viewed from within the above-mentioned viewing angle is so high that the viewer standing within the viewing angle can recognize the image information on the hologram screen as a bright and clear-cut image. The image information displaying system according to this aspect, therefore, can present image information having a good eye-catching effect.

In the brightness range of less than K0/4, the viewer can recognize the image information but may find it difficult to comprehend the contents of the image information. A reduced eye-catching effect is the probable result.

The hologram screen has such a feature that the image information issued from the radiation unit and impinged on the hologram screen can be observed on the hologram screen only from within a conical space formed by diffraction and diffusion of the image information (radiated beam).

The image information on the hologram screen, therefore, is visible only in an area where conical spaces formed by the image information (radiated beam) impinged on various parts of the hologram screen are overlapped. This area constitutes a viewing angle, which will be described later in detail.

The brightness of the hologram screen, on the other hand, assumes the highest value at the center thereof.

According to a 19th aspect of the invention, the sensor described above is preferably an illuminance sensor. This makes it possible to realize an image information displaying system capable of presenting optimum image information corresponding to the brightness within the viewing angle.

According to a 20th aspect of the invention, the sensor is desirably a volume sensor.

The sound volume within the viewing angle can be sensed by the volume sensor. Thus, the sound volume information with the sound volume most suitable for the prevailing ambient conditions can be supplied in addition to the image information. If the sound volume information is not required, a device such as the speaker for supplying audio information can be deactivated for reducing the running cost and lengthening the service life of the system.

According to a 21st aspect of the invention, the sensor is desirably configured to sense the entry of the viewer into the viewing angle.

Thus, an image information displaying system is realized in which, when a viewer enters the viewing angle of the hologram screen, the radiation unit is activated to radiate the image information or the image information is switched.

The hologram screen is so inconspicuous that it is not easily recognized by the viewer until image information is displayed thereon. For this reason, the invention makes it possible to present a situation in which image information suddenly presents itself in a thus far empty space and thus a good eye-catching effect can be produced.

Also, as described above, according to this invention, the radiation unit can be activated as soon as the viewer enters the viewing angle. The operation time of the radiation unit can thus be shortened for a reduced power consumption and running cost. The service life of the system can also be lengthened.

The above-mentioned sensor can include an infrared sensor, an audio sensor, a vibration sensor or a weight sensor installed on the floor. These sensors can be used individually or a plurality of sensors or sensor types can be used in combination.

The above-mentioned sensor desirably detects both the entry into and exit from the viewing angle of the viewer. In response to the signal from this sensor, the radiation control unit desirably causes the image information to be radiated from the radiation unit when the viewer enters the viewing angle and deactivates the radiation unit when the viewer leaves the viewing angle.

As a result, the effect of the invention can be secured more positively.

According to a 22nd aspect of the invention, the image information displaying system is desirably mounted on a mobile body.

The use of a transparent hologram can produce a transparent image information displaying system which does not interfere with the field of view. Such an image information displaying system has the effect of providing a lesser chance of preventing both the driving, and the observation of the outside, of the mobile body. The image information displaying system according to the invention thus is suitably installed on a mobile body.

The image information displaying system installed on a mobile body can be used for displaying driving-support information like the car navigation system or a warning to other mobile bodies.

In the case where the mobile body is an automotive vehicle, the image information displaying system is usable as a display unit for rear-seat passengers, for example.

According to a 23rd aspect of the invention, the image information displaying system is desirably installed between at least two seats in a mobile body (FIG. 29).

As a result, the hologram screen is prevented from being directly exposed to sunlight and thus early degeneration of the hologram screen is prevented.

Specifically, it is possible to prevent discoloring or performance deterioration due to the ultraviolet light and the heat of direct sunlight.

According to a 24th aspect of the invention, the hologram screen is desirably retractable into an appropriate means when not in use.

This makes possible the effective utilization of the limited internal space of the mobile body. Also, the retraction of the hologram screen when not in use can further prevent the discoloring, the performance reduction and deterioration thereof which otherwise might be caused by the ultraviolet light and the solar heat. Further, other work in the mobile body may be facilitated.

Specifically, the hologram screen is desirably provided as a roll-up, folding or detachable type.

The hologram screen can also be arranged on the sunroof. In this case, the hologram screen can be configured in the form of full flat sheet on which the image information can be observed.

Another possible configuration is integrating the hologram screen with or embedding it in the front passenger seat or the head rest (FIG. 30).

According to a 25th aspect of the invention, the sensor is a vibration sensor, and the radiation control unit is desirably configured to correct the blur of the radiated image information caused by the vibration of the mobile body based on the signal from the vibration sensor.

According to a 26th aspect of the invention, the sensor is a vibration sensor and the radiation control unit is desirably so configured as to suppress the vibrations of the radiation unit due to the vibrations of the mobile body based on the signal from the vibration sensor.

In the case of installing various display units on a mobile body, the problem of image blurring due to vibrations of the mobile body is encountered especially by a display unit which projects the image information by a radiation unit. This problem is especially serious for large-sized vehicles such as buses and trucks.

According to this invention, a blurred image is corrected in such a manner that vibrations are detected by a vibration sensor, and the data making up the image information is electrically corrected based on the detected signal and radiated from the radiation unit.

Alternatively, a mechanism for suppressing the vibrations of the radiation unit can be provided and driven based on the signal from the vibration sensor to correct the image blurs.

These means can produce an image information displaying system by which image information can be viewed with little blurring on a mobile body.

Means for absorbing the vibrations of the radiation unit include a damper and a piezo-actuator.

According to a 27th aspect of the invention, preferably, the central control unit or the relay receives the signal from the sensor through the communication line, and based on the same signal, controls the radiation control unit.

In the image information displaying system according to the 27th aspect, as in the embodiment B1 described later, the ambient condition within the viewing angle of the hologram screen is detected by a sensor, and the resulting signal representing the ambient condition is applied from the sensor to the central control unit or the relay. The central control unit or the relay, upon receipt of this signal from the sensor, can control the radiation control unit in keeping with the ambient condition within the viewing angle.

As a consequence, the central control unit or the relay can perform various control operations such as activating and deactivating the radiation unit, switching the image information radiated from the radiation unit or correcting or adjusting the image information in accordance with the ambient condition within the viewing angle.

In other words, according to this embodiment, the image information displaying system can perform the control operation taking the ambient condition of the image information displaying system into consideration, substantially free of manual operation. Also, an image information displaying system high in energy-saving ability is provided.

According to a 28th aspect of the invention, a diffuser is preferably recorded in the hologram screen.

This makes it possible to produce an image information displaying system capable of projecting a full-color image and to further improve the eye-catching effect.

The diffuser described above can be a light diffuser such as ground glass.

In view of the above-mentioned problems described in the third viewpoint of the prior art, a third object of the present invention is to provide a hologram displaying system capable of displaying a superior image and having a high eye-catching effect.

In order to achieve the third object described above, according to a 29th aspect of the invention, there is provided a hologram displaying system comprising a hologram screen, and a projector for projecting an image beam on the hologram screen, wherein the lower end of the hologram screen is located at the distance of 80 to 180 cm from the floor level.

The hologram screen will be explained.

The hologram screen can be classified into a hologram of transmission type for transmitting an image beam therethrough and a hologram screen of reflection type for reflecting an image beam. The present invention can use either type of the screen.

As shown in FIGS. 51(*a*) to 51(*f*), 52(*a*) to 52(*f*), 53(*a*) to 53(*f*) described later, various shapes of screen can be used. Further, although the hologram screen can be used with the image beam projected over the entire surface thereof to display an image as described with reference to FIG. 54 later, the image beam can be projected on part of the hologram screen using the zoom function of the image projector to display the image.

The hologram screen of a transmission type is the one with the image projector arranged at the back of the screen. The image beam projected from the image projector is focused and forms a real image on the hologram screen. A person can recognize the image by the diffracted light scattered and transmitted from the real image.

The hologram screen of reflection type, on the other hand, is the one using the image projector arranged on the front side of the screen. The image beam projected from the image projector is focused and forms a real image on the hologram screen. A person can recognize the image by the diffracted beam scattered and reflected from the real image.

In a method of fabricating the hologram screen, a beam constituting an object beam diffused through a light diffuser such as ground glass and a non-diffused beam constituting a reference beam are projected on a photosensitive material to form interference fringes. An example of the fabrication method will be explained below.

In fabricating a hologram screen of a transmission type, as shown in FIG. 48, a coherent beam 34 radiated from a laser beam source 51 is changed in light path by a mirror 511, and then split into two beams 341, 342 by a half mirror 512.

After the beam 341 is scattered by a lens 516, transmitted through a light diffuser 52, and the resulting diffused beam is projected as an object beam 36 on a photosensitive material 50.

The other beam 342 split by the half mirror 512 is changed in light path by mirrors 513, 514, scattered by a lens 515, and projected on the photosensitive material 50 as a reference beam 35. The reference beam 35 and the object beam 36 form interference fringes on the photosensitive material 50. In FIG. 48, the corrugation shows a model of the diffused beam.

In fabricating a hologram screen of a reflection type, on the other hand, as shown in FIG. 49, the reference beam 35 and the object beam 36 are projected from opposite sides of the photosensitive material 50 to form interference fringes.

A PET film is attached to the surfaces of the photosensitive material 50 obtained by the process mentioned above to form protective films, thus making up a hologram screen.

Various devices are usable as an image projector. They include a slide projector, an OHP (overhead projector), a projector, a movie projector or other devices that can project an image beam of still pictures and image sequences.

It is also possible to supply an image to the image projector from external devices such as a videotape, an optical disk, a personal computer or other reproduction units. The reproduction unit can, of course, be built into the projector. Further, the image can be supplied from an external source using the telephone line, an earth satellite or the like channel.

In the case where the height of the hologram screen is less than 80 cm, the line of eyesight of the viewer is liable to depart considerably from the viewing angle specific to the hologram element, often making it difficult for the viewer to observe the image of a superior quality. This also applies in the case where the height of the hologram screen is more than 180 cm, in which case the image is sometimes difficult to see for the same reason.

The "superior image", is defined as an image having a small color difference with and having substantially the same brightness, contrast and luminance as the image beam projected from the projector.

Also, the hologram displaying system according to this invention can be installed either indoor or outdoor. For the hologram displaying system installed outdoor, the "floor level" indicates the ground level.

As shown in FIG. 55 described later, the floor level is defined as the floor level 311 on which a viewer 8 of the hologram displaying system stands.

Also, as shown in FIGS. 51(*a*) to 51(*f*), 52(*a*) to 52(*f*) and 53(*a*) to 53(*f*) described later, the hologram screen can assume various shapes. The lower end of the hologram screen is also shown in the drawings.

The hologram screen can be configured either in flat form or in a curved form having a radius of curvature.

The hologram screen can have a very thin portion. Any portion where a image visible to the viewer cannot be displayed, however, fails to play the role of the hologram screen of the image displaying system according to the invention. Therefore, such a very thin portion cannot be considered as a lower end. The lower end of the hologram screen can be determined taking the above fact into consideration.

A hologram screen according to a 29th aspect of the invention uses interference fringes. The hue and brightness of the image on display, therefore, are varied depending on the angle at which the image is viewed. In other words, the hologram screen has some portions easy to view and other portions difficult to view. The portion where a superior image is clearly visible is called the viewing angle.

The viewing angle will be specifically described with reference to FIGS. 34 and 35.

The hologram screen has the feature that the image is invisible from other than a conical space formed by diffraction and diffusion of the image beam impingeing on the hologram screen from the projector.

Therefore, the image is visible only in an area where individual conical spaces formed as the image beam impingeing on various portions of the hologram screen are overlapped one over the other. This area constitutes a viewing angle.

In FIG. 34, the image beam 125 projected from an image projector 12 fans out and reaches a hologram screen 11. The image beam 125 that has impinged on the upper end 112 of the hologram screen 11 is scattered and transmitted while fanning out. Also, the image beam 125 that has hit the lower end 111 of the hologram screen 11 also fans out.

Similarly in FIG. 35, the image beam 125 that has impinged on the left end 113 and the image beam 125 that has impinged on the right end 114 of the hologram screen 11 also fan out.

The foregoing description refers to the plan views of FIGS. 34 and 35, and therefore the diffusion of the image beam 125 is expressed as "fan out". Actually, however, the image beam assumes a conical shape as it diffuses into the space.

The image displayed on the hologram is known to become difficult to view when the brightness of the image decreases to less than one half of the central brightness. The central brightness is defined as the brightness of the image at the center of the hologram screen.

Consequently, the viewing angle 89 on the hologram screen 11 represents the sectorial area in the diagrams of FIGS. 34 and 35.

Now, the operation and effects of the 29th aspect of the invention will be explained.

In the hologram displaying system according to this invention, the hologram screen is installed under the above-mentioned conditions. The viewing angle of the hologram screen, therefore, is included in the line of sight of the viewer.

As described above, the interior of the viewing angle is an area where a superior image is visible. Therefore, the hologram displaying system according to this invention can display a superior image.

In this respect, the hologram displaying system according to the 29th aspect of the invention can display an image highly appealing to the viewer. In addition, the hologram screen is easily configured to be transparent, and therefore, the viewer feels that an image is projected in an otherwise empty space.

Consequently, the hologram displaying system according to the 29th aspect of the invention has the effect of attracting the attention of persons, i.e. has a superior eye-catching effect.

As will be seen from the foregoing description, according to the 29th aspect of the invention, there is provided a hologram displaying system capable of displaying a superior image and having a good eye-catching effect.

The photosensitive material used for fabricating the hologram element is generally composed of photo-polymer. The portion of the photo-polymer to which the laser beam is applied is crosslinked and formed with interference fringes.

Also, for a superior image to be displayed on the hologram screen described above, the interference fringes desirably remain in the same state as immediately after fabrication (initial state).

The interference fringes, however, are liable to be deteriorated by heat.

Consider, for example, the case in which a hologram element is attached to a transparent support like window glass to make up a hologram screen. The difference in thermal expansion coefficient exists between the hologram element and the transparent support. When the hologram element and the transparent support are heated, therefore, a thermal stress occurs between them. This thermal stress sometimes causes the distortion of the photo-polymer making up the hologram element.

The distortion of the interference fringes causes a distorted diffraction of the image beam, with the result that the image reproduced on the hologram screen is likely to develop a distortion.

Heat sources considered to cause this problem include the heat of the image beam itself, the hot air produced from the cooling fan or the like installed on the projector, the direct sunlight in high-temperature seasons such as the summer, and the heat reflected from the ground surface.

With the hologram displaying system according to the 29th aspect of the invention, the hologram screen is installed under the above-mentioned conditions.

The hologram screen thus is installed some distance off the floor and has a spatial margin with the floor surface. As a result, the hologram screen is prevented from being heated by the heat which otherwise might stay around the hologram screen.

The hologram screen, if it has a height of less than 80 cm, is liable to be exposed to the heat radiated back from the ground surface. Also, the proximity to the floor surface often causes the heat to remain due to the inefficient heat radiation.

In the case where the hologram screen has a height of more than 180 cm, on the other hand, the image is not easily visible.

Especially a hologram screen used by being attached to the glass is desirably held between biaxial oriented PET films or the like having a thermal expansion coefficient similar to that of glass (3 to $10 \times 10^{-6}$ cm/° C.) in order to alleviate the thermal effect efficiently.

With the hologram displaying system according to the 29th aspect of the invention, the projector can be installed either above or under the hologram screen (embodiments C1, C2). It is also possible to arrange the hologram displaying system at a position diagonally above or below the hologram screen.

In the case where the projector is arranged below the hologram screen and the image beam is projected from under the hologram screen, the hologram screen should be located as high as possible. In the case where the projector is arranged above the hologram displaying system, in contrast, the hologram screen is desirably located as low as possible. In this way, the zero-order beam from the projector (the image beam projected from the projector) is prevented from entering into the eyes of the viewer.

According to a 30th aspect of the invention, there is provided a hologram displaying system comprising a hologram screen and a projector for projecting the image beam on the hologram screen, wherein the center height of the hologram screen is 110 to 210 cm from the floor level.

Also, with the hologram displaying system according to the 30th aspect of the invention, as described above, the viewing angle of the hologram screen comes just in the range of the line of sight of the viewer and therefore a superior image can be displayed in the range of the viewer's field of view.

In this respect, the invention can display an image highly appealing to the viewer. In other words, the system has a good eye-catching effect.

As described above, according to the 30th aspect of the invention, there is provided a hologram displaying system capable of displaying a superior image and having a high eye-catching effect.

In the case where the center height is less than 110 cm, the line of the viewer's sight is liable to depart from the viewing angle, and therefore the image hue is deteriorated making the image not easily visible. In the case where the height is more than 210 cm, in contrast, the hologram screen is installed at a correspondingly high position and the image is also liable to be not easily visible.

The reference floor level for measurement of the center height in this example is also represented by the floor surface 311 on which the viewer 8 stands, as shown in FIG. 55.

Also, the fact that the hologram screen is installed under the above-mentioned conditions prevents the heat from remaining around the hologram screen.

In the case where the center height is less than 110 cm, the hologram screen is exposed to the heat radiated back from the floor surface and the heat is liable to stay around the hologram screen.

According to a 31st aspect of the invention, there is provided a hologram displaying system comprising a hologram screen and a projector for projecting the image beam on the hologram screen, wherein the angle of projection of the projector to the hologram screen is 20 to 50 degrees.

With the hologram displaying system according to the 31st aspect in which the projection angle is set within the range mentioned above, the viewing angle of the hologram screen is just within the range of the viewer's line of sight. A superior image can thus be displayed within the range of the viewer's line of sight.

In this respect, the system according to the invention can display an image highly appealing to the viewer, i.e. it has a good eye-catching effect.

In the case where the projection angle is less than 20 degrees the zero-order beam from the projector intrudes the viewer's eyes and is liable to make normal observation of the image impossible.

In the case where the projection angle exceeds 50 degrees, in contrast, the trapezoidal distortion of the image projected on the hologram screen increases to such an extent that a normal image becomes difficult to observe.

As shown in FIG. 34 described later, the projector is sometimes installed at a position diagonally above or below as well as just above or below the hologram screen for projecting the image beam.

It is shown in FIG. 43 that the projection angle of a indicates the state in which the projector is installed on the circumference of a circle constituting the bottom of a cone assumed to have an apex at the center of the hologram screen.

Specifically, as shown in FIG. 43, assume that image projectors are installed at a position t1 above the hologram, at a position t2 below the hologram screen, at a position t3 diagonally above the hologram screen and at a position t4 diagonally below the hologram screen. The projection angle of all the projectors is the same and α.

As in a 32nd aspect of the invention, the hologram displaying system desirably comprises a trapezoidal distortion correction mechanism.

There is thus provided a hologram displaying system capable of displaying a correct image free of a trapezoidal distortion on the hologram screen and permitting the viewer to observe a correct image.

The trapezoidal distortion correction mechanism may include a trapezoidal distortion correction circuit capable of correcting the image electrically or a correction device for correcting the image optically using a lens.

According to a 33rd aspect of the invention, the diagonal length of the hologram screen is desirably not less than 30 inches and the projection distance of the image beam is desirably not less than 90 cm.

This permits the projector to be installed in a limited space while at the same time securing an image size of not less than 30 inches which is sufficiently large to produce an eye-catching effect. Also, substantially all the projectors sold on the market can be used.

The diagonal length indicates the length of the diagonal line of a substantially rectangular hologram screen. In the case where the diagonal length is less than 30 inches, the eye-catching effect is liable to be insufficient.

The upper limit of the diagonal length, though not specifically defined, is a value that can secure the distance from the floor level described in each of the claims.

The projection distance is defined as the distance between the surface of the hologram screen and the image beam projection unit of the projector (such as the lens of the liquid crystal projector).

In the case where the projection distance of the image beam is shorter than 90 cm, the diagonal length of the image probably is less than 30 inches. At the same time, the projector projects the image of itself on the hologram screen and undesirably becomes visible to the viewer.

The upper limit of the projection distance is desirably set to 350 cm. In the case where this upper limit is exceeded, the installation space increases to such an extent that the projector cannot be easily suspended from a low ceiling. Even in the case where the projector is installed on the floor, a sufficient space may not be secured. Further, even when the image is focused by the zoom function of the projector, the image often overflows the hologram screen.

According to a 34th aspect of the invention, the relation y=ax+b (where x is the diagonal length in inches, y is the projection distance in cm, and a, b are coefficients depending on the projector involved) is desirably satisfied between the diagonal length of the hologram screen and the projection distance.

As a result, the size of the hologram screen can be matched with the performance of the projector, thereby saving the installation space.

For Projector TH-L392J of Matsushita Electric Industrial Co., for example, a=4.6 and b=−23.7.

Generally, the coefficient a assumes a value of −20 to −30.

As shown in FIG. 39 described later, in the case where a plurality of hologram screens are arranged side by side and used as a single large screen, the diagonal length of the combined large screen is employed as the diagonal length L of the hologram screen under consideration.

According to a 35th aspect of the invention, the hologram screen is desirably installed in an environment where the contrast (defined as (brightness of white image screen+ background brightness+external beam brightness)/ (brightness of black image screen+background brightness+ external beam brightness)) is not less than 1.5. This secures an image appearance having a sufficient eye-catching effect.

In the case where the contrast is less than 1.5, the image appearance is so inferior that a sufficient eye-catching effect may not be secured. A more desirable upper limit of the contrast is 300. For a contrast higher than this value, the image becomes too bright and often difficult to view.

The brightness of white image screen is the brightness of the normal white screen input on a personal computer, and the brightness of black image screen is the brightness of the black screen input on a personal computer. Also, the background brightness is the brightness of an object behind the hologram screen, and the external beam brightness is the brightness of an object projected on the hologram screen.

For realizing the above-mentioned environment, a configuration as described below is desirably provided for the hologram displaying system.

For example, the projector is desirably configured in such a manner that a sensor for detecting the brightness around the hologram screen is operatively interlocked with means for adjusting the image brightness and the image size.

Also, as in the embodiment C7 described later, a polarizing film or an antireflection film is desirably incorporated in the hologram screen to reduce the background brightness and the external beam brightness for an improved contrast.

The hologram displaying system according to this invention is desirably installed in such a position that the hologram screen is not exposed to sunlight directly. This arrangement can exclude the adverse effect of heat while at the same time improving the contrast of the environment of the hologram screen to not less than 1.5 as described above.

If an antireflection film, a polarizing film or the like is mounted on the hologram screen as such a protective means like in the embodiment C7 described later, a normal image can be observed even at a very bright place under direct sunlight.

Also, a sunshade, a peak or a blind can be provided for protection from direct sunlight.

According to a 36th aspect of the invention, the hologram screen is chamfered at the corners thereof, or the section of the hologram is tapered.

As a result, the hologram screen is not easily removed.

As shown in the embodiment C1 described later, the hologram screen installed on the window glass or the like is prevented from coming off at the time of cleaning the window.

The wording "the corners are chamfered" is indicative of the fact that what is called at least a corner R is formed. The corners of the hologram screen are thus formed as shown in FIGS. 37(a), 37(d) described later, for example.

The wording "the section is tapered" means configuring a hologram screen into the state as shown in FIGS. 37(c), 37(d) described later, for example.

According to a 37th aspect of the invention, the hologram screen is desirably installed by covering with water (stretch).

This allows for a sufficient time before being dried, during which the position of the hologram screen can be finely adjusted taking advantage of the slidability of water.

Adhesives usable for the above-mentioned stretch include acrylic ester copolymer, acrylic styrene copolymer, polyvinyl alcohol, polyvinyl butyral or the like, aqueous micromole, aqueous emulsion or the like, and an organic binder for plastic which becomes transparent when dried.

According to a 38th aspect of the invention, the projector is desirably fixed at an inclination angle of 20 to 50 degrees to the horizontal ceiling surface by a fixing jig.

As a result, the eyes of the viewer are protected from the zero-order beam of the image projector and the viewer can normally observe the image.

In the case where this angle is less than 20 degrees, the zero-order beam is liable to intrude the viewer's eyes. For the inclination angle of more than 50 degrees, on the other hand, the image is often distorted excessively or an out-of-focus condition may develop.

The inclination angle of the projector to the horizontal ceiling surface will be explained.

Consider a straight line perpendicular to the surface on which the hologram screen is installed. In the case where this straight line is parallel to the ceiling surface (FIG. 34), the ceiling constitutes the horizontal ceiling surface. The angle that the ceiling forms with the projector is the inclination angle.

In the case where the straight line perpendicular to the surface on which the hologram screen is installed is not parallel to the surface of the ceiling (FIG. 56), on the other hand, the plane containing the particular straight line constitutes the horizontal ceiling surface. The angle that this horizontal ceiling surface forms with the projector constitutes the inclination angle.

The surface on which the hologram screen is installed is regarded as the plane containing the surface of the hologram screen in the case where the hologram screen is flat.

According to the 29th to 38th aspects of the invention, the hologram displaying system can also comprise various sensors which produces signals for controlling the operation of the projector. Thus, a system is realized which is automatically activated whenever required. The various sensors referred to above include those for detecting the brightness, weight, rain, humidity, temperature, odor, sunlight, etc.

On the other hand, a plurality of hologram screens can be combined side by side to construct a large-sized hologram screen. In this case, the image beam corrected in accordance with the properties of each hologram screen is projected, and thus an integrated image free of the sense of incompatibility as a whole can be observed.

The correction referred to above includes the adjustment of the hue, brightness, etc. of the image beam.

BRIEF DESCRIPTION OF THE DRAWINGS

Other objects and features of the present invention will be described hereinafter in detail by way of preferred embodiments with reference to the accompanying drawings, in which:

FIG. 34 is a side view for explaining a hologram displaying system according to the embodiment C1.

FIG. 35 is a plan view for explaining a hologram displaying system according to the embodiment C1.

DESCRIPTION OF THE PREFERRED EMBODIMENTS

Figure 1:
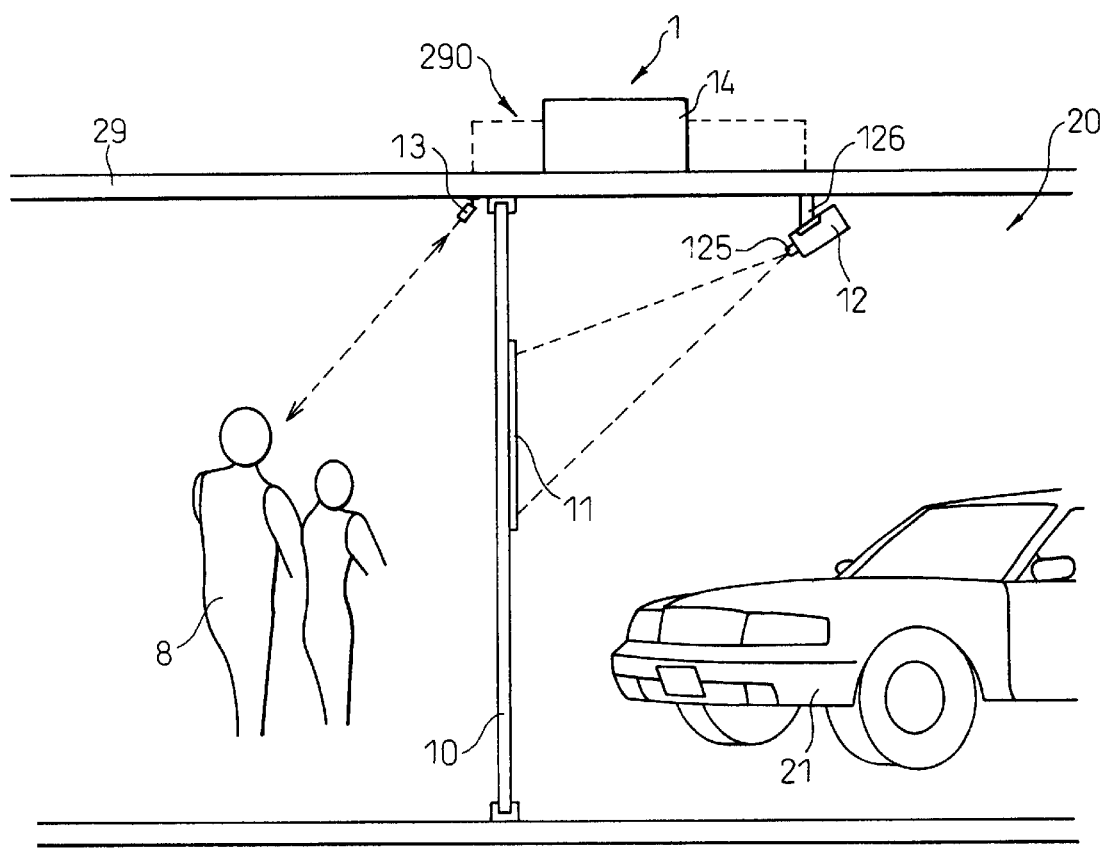
FIG. 1 shows an image information displaying system according to an embodiment A1 of the present invention.

From FIG. 1 to FIG. 16, the same reference numeral represents the same part. From FIG. 17 to FIG. 33, the same reference numeral represents the same part. From FIG. 34 to FIG. 56, the same reference numeral represents the same part. Even if a reference numeral in the group of FIG. 1–FIG. 16 is the same as a reference numeral in the other group of FIG. 17–FIG. 33 or of FIG. 34–FIG. 56, the same reference numeral does not always represent the same part.

Embodiment A1

Figure 2:
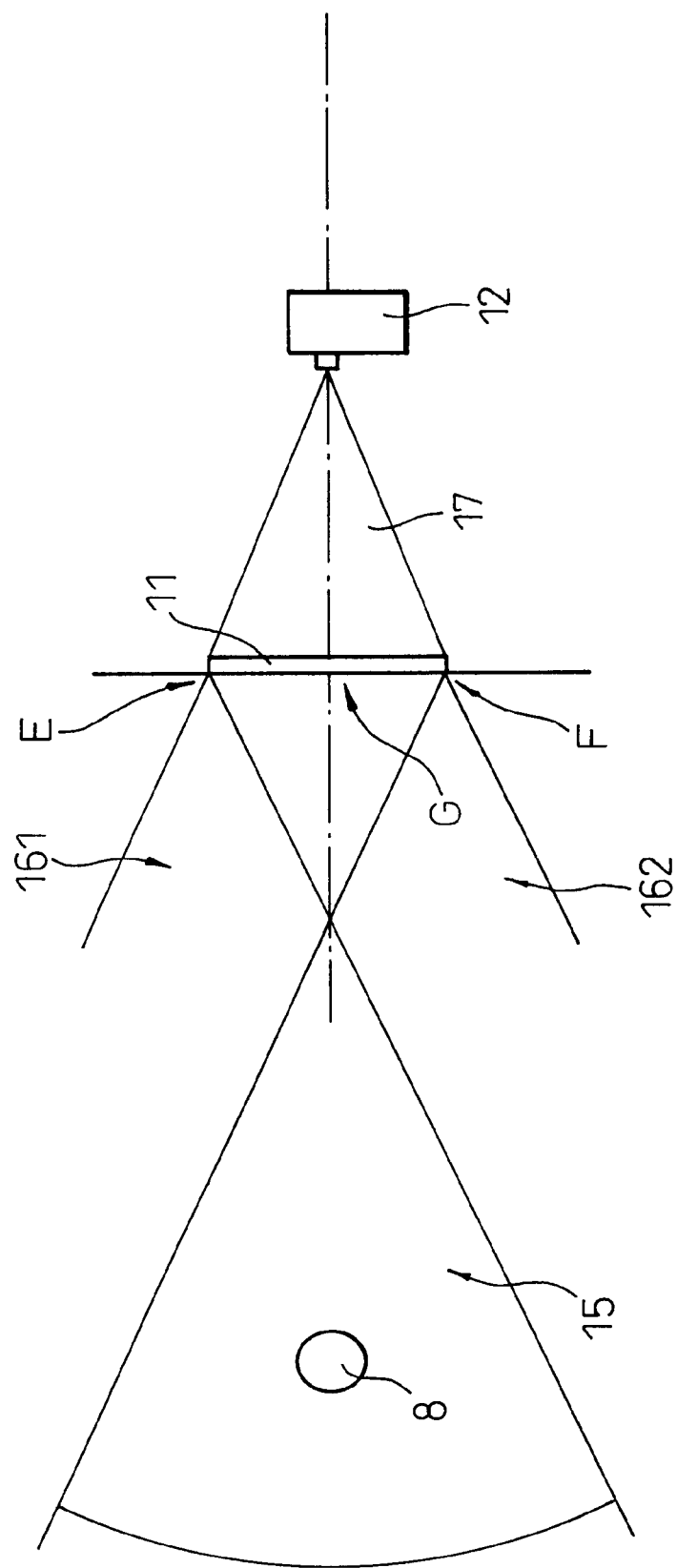
FIG. 2 is a plan view showing a viewing angle of a hologram screen of the embodiment A1.
Figure 3:
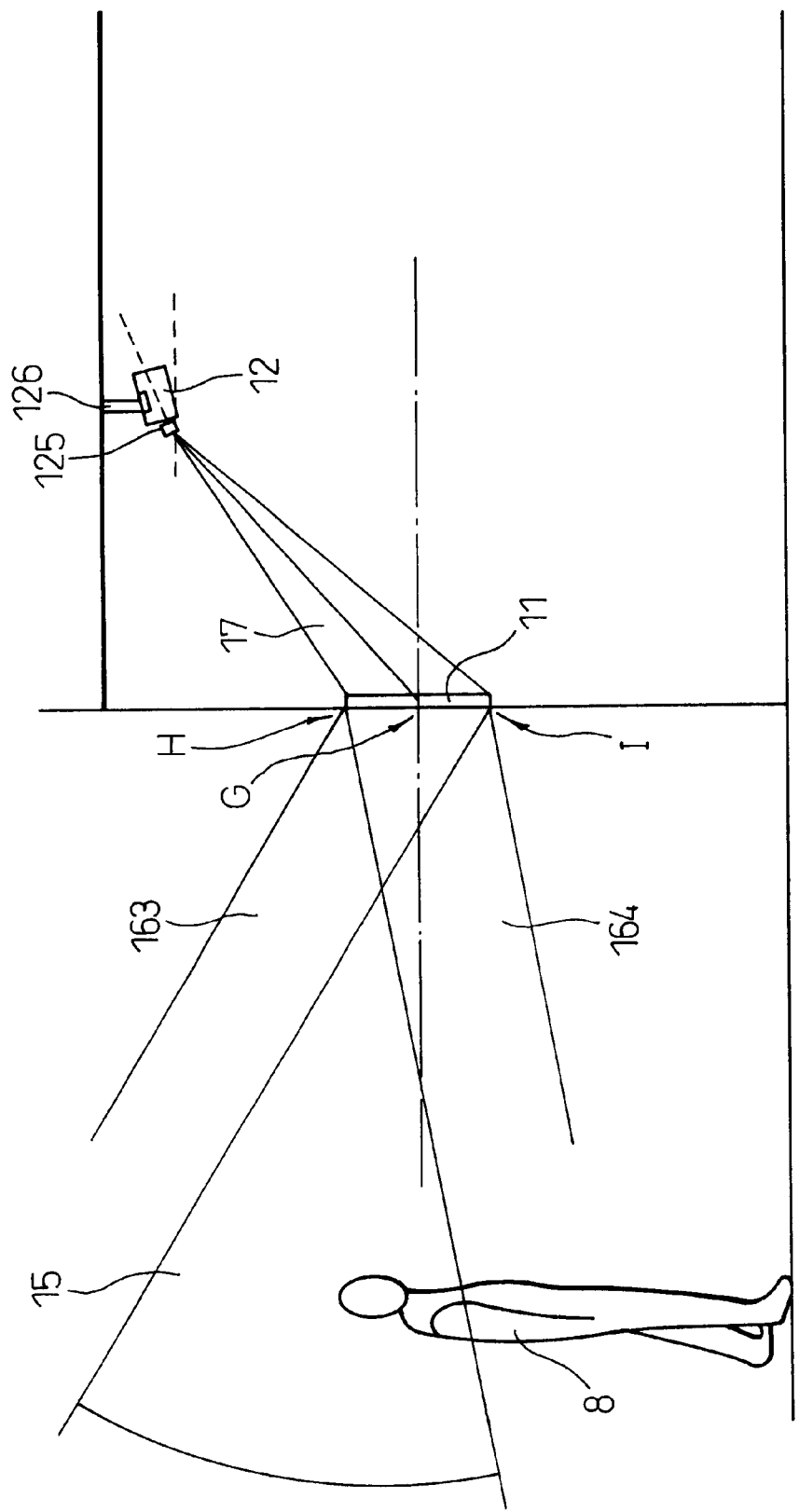
FIG. 3 is a side view showing the viewing angle of the hologram screen of the embodiment A1.

FIGS. 1 to 3 show an image information displaying system according to an embodiment A1 of the present invention.

The image information displaying system 1 has a transparent support 10, a hologram screen 11 attached to the support 10, and a projector 12 for projecting image information onto the screen 11.

The system 1 also has a sensor 13 that senses a person 8 who enters a viewing angle 15 of the screen 11, and a controller 14 for controlling the projector 12 according to signals from the sensor 13 so that the projector 12 may project image information onto the screen 11.

The system 1 is installed in a showroom 20. The hologram screen 11 is of a transmission type. The transparent support 10 on which the screen 11 is attached is a glass window of the showroom 20. An exhibit 21 is set behind the screen 11.

If no image information is displayed on the screen 11, viewers can see the exhibit 21 through the screen 11.

The principle of the transmission-type hologram screen will briefly be explained.

The hologram screen has a hologram element. A projector is installed behind the screen and projects image information onto the screen. The image information forms a real image on the screen. The screen scatters and transmits the light of the real image, which is seen by viewers.

The sensor 13 is fixed to the ceiling 29 of the showroom 20. The projector 12 is fixed to an arm 126, which is fixed to the ceiling 29. The projector 12 has a movable lens 125. The sensor 13 is an infrared sensor. The projector 12 is a liquid crystal projector.

The controller 14 is arranged in a roof-space 290 and is connected to the projector 12 and sensor 13. The controller 14 has a player having an optical disk that holds image information. The player is connected to the projector 12 through a cable for transmitting image information.

The viewing angle of the hologram screen 11 will be explained.

FIG. 2 is a plan view showing the system 1 in the showroom 20, and FIG. 3 is a side view showing the same.

The viewing angle 15 of the screen 11 has a sectorial area in which brightness is K0/2 or over. Here, K0 is the brightness of a front center point G of the screen 11. The shape of the viewing angle 15 is actually conical.

The viewing angle will be explained in more detail.

The projector 12 emits an image information beam 17, which spreads in a sectorial area and reaches the screen 11. A portion of the beam 17 that hits an edge E of the screen 11 is scattered by and transmitted through the edge E, to form a sector 161. Another portion of the beam 17 that hits another edge F of the screen 11 is scattered by and transmitted through the edge F, to form a sector 162. The sectors 161 and 162 overlap to form a new sector that is the viewing angle 15.

Although the beam 17 is scattered in a sectorial area in FIGS. 2 and 3 because the figures are plan views, it is actually scattered in a conical space. Accordingly, the viewing angle 15 is actually conical.

The viewing angle 15 and brightness K0 will be explained with reference to FIGS. 2 and 3.

The front center point G of the hologram screen 11 is the brightest point of the screen 11 and has the brightness K0.

In each of FIGS. 2 and 3, the viewing angle 15 is a sectorial area in which one can see image information displayed on the screen 11. The brightness of the screen 11 decreases in proportion to the distance therefrom.

The operation of the first embodiment will be explained.

If the person 8 who walks in front of the showroom 20 enters the viewing angle 15, the sensor 13 senses it and sends a signal to the controller 14. In response to the signal, the controller 14 activates the player and projector 12 The player sends image information to the projector 12, which projects the image information onto the screen 11.

The screen 11 is transparent and is attached to the support 10 that is also transparent. Accordingly, the screen 11 attracts no attention of the person 8 if no image information is displayed on the screen 11.

As soon as the person 8 enters the viewing angle 15, the projector 12 is activated to suddenly display image information on the glass window, i.e., the support 10 which the person 8 considered a vacant window.

As a result, the image information strongly attracts the attention of the person 8, thus providing a good eye-catching effect.

When the person 8 walks out of the viewing angle 15, the sensor 13 senses it and sends a signal to the controller 14 to stop the player and projector 12.

In this way, the projector 12 is activated only while the person 8 is present in the viewing angle 15, to greatly reduce the power consumption and running costs of the system 1.

Shortening the operation time of the system 1 results in extending the service life thereof.

In this way, the image information displaying system of the first embodiment provides an excellent eye-catching effect, reduces energy consumption and running costs, and extends its own service life.

Although the hologram screen 11 of the first embodiment is of a transmission type, it may be of a reflection type.

The reflection-type hologram screen will briefly be explained.

A projector is arranged in front of the screen and projects image information onto the screen. The image information forms a real image on the screen. The real image is scattered and reflected by the screen to catch the eyes of a viewer, and the viewer sees the real image.

A technique of manufacturing a hologram screen will be explained. A source beam is passed through a diffuser such as a ground glass to form an object beam, and at the same time, the source beam is used as it is as a reference beam. The object and reference beams form interference fringes on a photosensitive material, which forms the hologram screen. The transmission-type hologram screen is made by irradiating the photosensitive material with object and reference beams in the same direction. The reflection-type hologram screen is made by irradiating the photosensitive material with object and reference beams in opposite directions.

Each of the transmission- and reflection-type hologram screens is applicable to the image information displaying system of the present invention.

Embodiment A2

Figure 4:
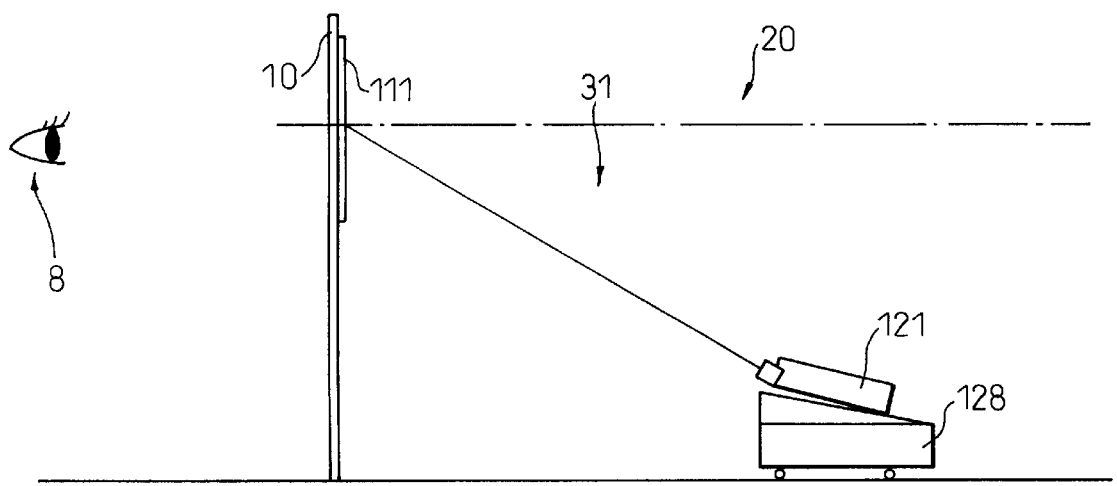
FIG. 4 is a side view showing an image information displaying system according to an embodiment A2 of the present invention.
Figure 5:
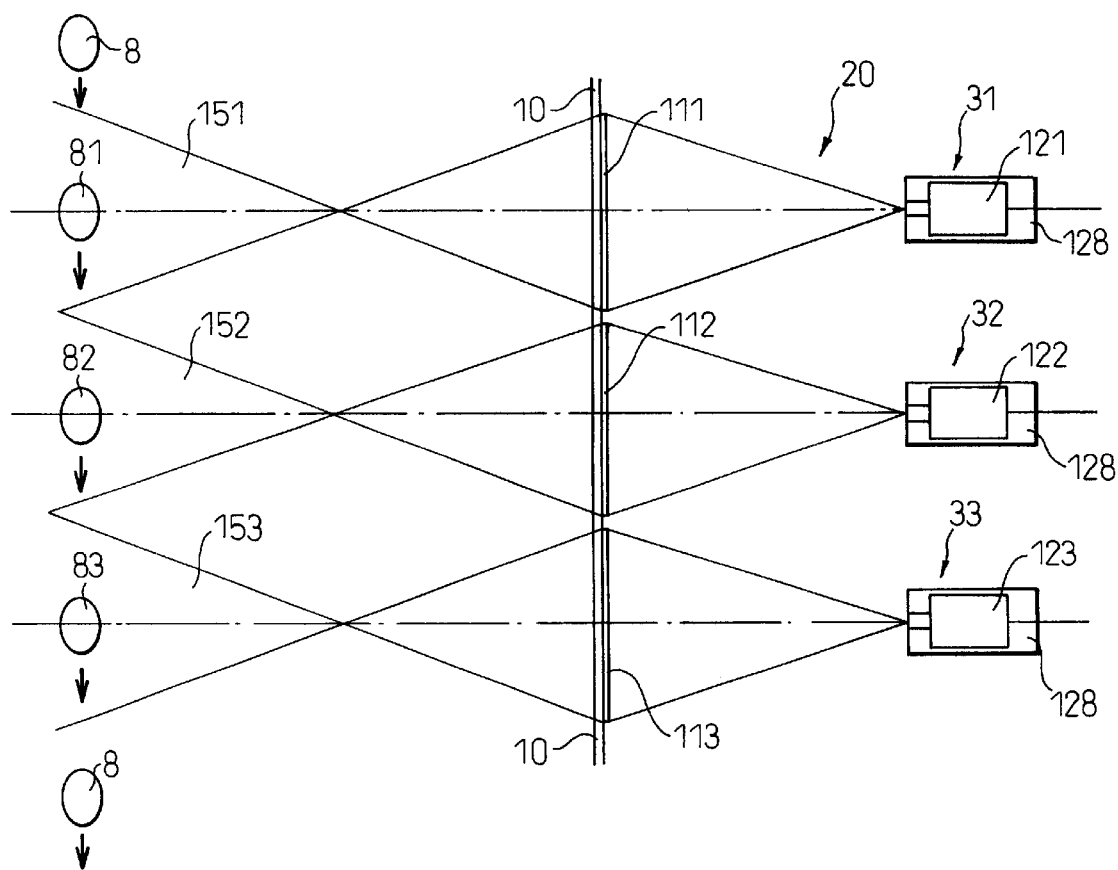
FIG. 5 is a plan view showing the embodiment A2.

FIGS. 4 and 5 show three image information displaying systems 31 to 33 installed in a showroom 20 according to an embodiment A2 of the present invention.

The systems 31 to 33 consist of a transparent support 10, which is a glass window, hologram screens 111 to 113 attached to the support 10, and projectors 121 to 123 for projecting image information onto the screens 111 to 113. The screens 111 to 113 are arranged side by side on the support 10 along the walking direction of a person 8.

Each of the projectors 121 to 123 is mounted on a base 128, which is placed on the floor. The systems 31 to 33 have a sensor (not shown) and a controller (not shown) connected to the projectors 121 to 123.

The hologram screens 111 to 113 have viewing angles 151 to 153, respectively.

The other parts of the second embodiment are the same as those of the first embodiment.

The operation of the second embodiment will be explained.

The person 8 walks along arrows shown in FIG. 5.

The person 8 enters the viewing angle 151. The sensor senses that the person 8 is at a position 81 and sends a signal to the controller. In response to the signal, the controller activates the projector 121, which projects image information onto the hologram screen 111.

The person 8 walks out of the viewing angle 151 and into the viewing angle 152 to reach a position 82. The sensor senses this and sends a signal to the controller. In response to the signal, the controller stops the projector 121 and activates the projector 122, which projects image information onto the hologram screen 112.

The person 8 walks out of the viewing angle 152 and into the viewing angle 153 to reach a position 83. The sensor senses this and sends a signal to the controller. In response to the signal, the controller stops the projector 122 and activates the projector 123, which projects image information onto the hologram screen 113.

Thereafter, the person 8 walks out of the viewing angle 153. The sensor senses this and sends a signal to the controller. In response to the signal, the controller stops the projector 123.

In this way, the systems 31 to 33 display image information according to the movement of the person 8. Namely, the systems 31 to 33 provide a dynamic effect that image information appears and disappears in synchronization with the movement of the person 8.

Accordingly, the systems 31 and 33 easily attract viewers' attention, thereby providing a good eye-catching effect.

The projectors 121 to 123 may consecutively provide a series of image information such that the projector 122 displays a continuation of image information displayed by the projector 121. However, they may provide different image information.

Embodiment A3

Figure 6:
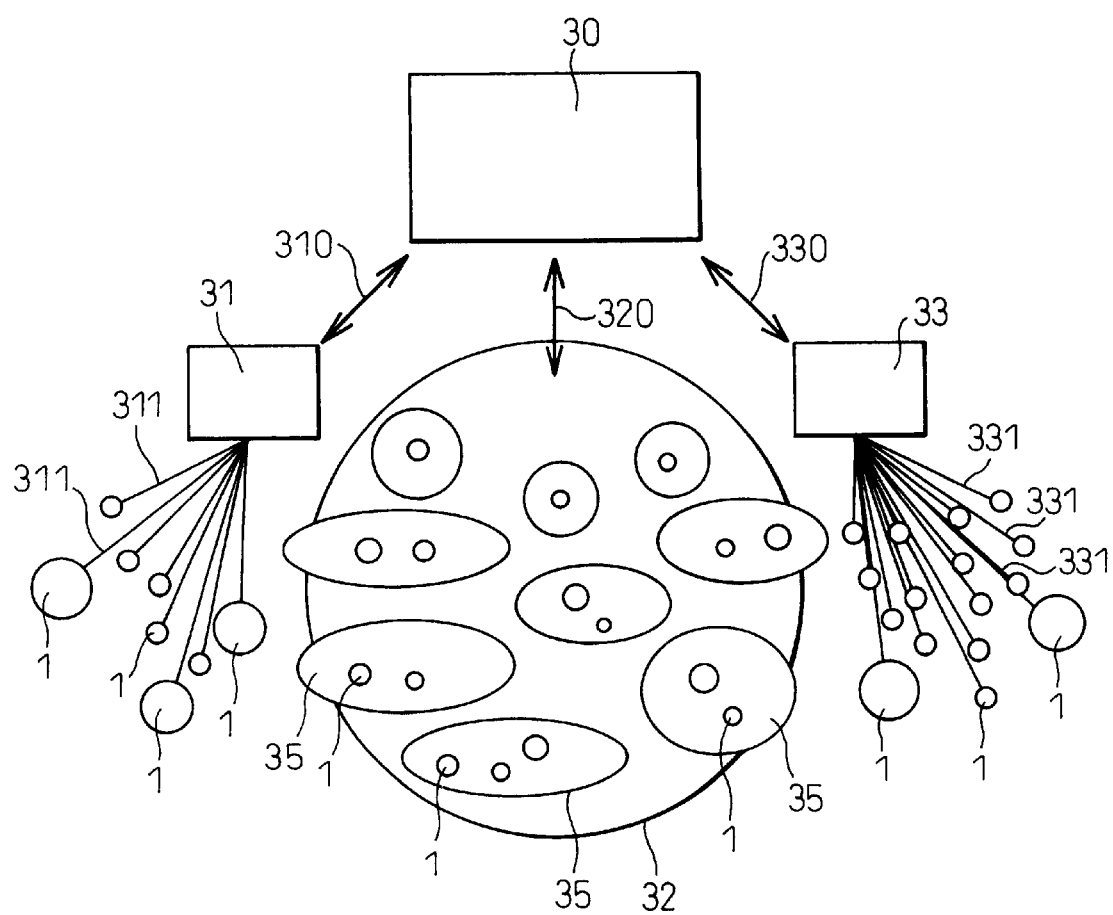
FIG. 6 shows an image information displaying system connected to a central control unit according to an embodiment A3 of the present invention.

FIG. 6 shows image information displaying systems centrally controlled by a central control unit according to an embodiment A3 of the present invention.

The image information displaying systems 1 are connected to and controlled by the central control unit 30 through communication circuits. The central control unit 30 may be a large computer, a workstation, etc.

The communication circuits for connecting the systems 1 to the central control unit 30 will be explained.

The central control unit 30 is connected to a relay 31 through a circuit 310 using optical fiber cables. The relay 31 may be a controller for distributing CATV programs. The relay 31 is connected to each image information displaying system 1 through a CATV circuit 311.

In this way, the central control unit 30 is connected to each system 1 through a public circuit. For example, the central control unit 30 is connected to a public circuit 32 through a circuit 320, and the public circuit 32 is connected to each system 1 through a private network 35. The circuit 320 may be a public circuit. The public circuit 32 and private network 35 are voice transmitting telephone circuits which may be analog or digital.

The central control unit 30 can be connected to a communication satellite 33 through a radio circuit 330. The satellite 33 is connected to each system 1 through a satellite broadcasting radio circuit 331.

The other parts of the third embodiment are the same as those of the first embodiment.

Each image information displaying system 1 has a sensor. When people enter a viewing angle of a hologram screen of the system 1, the sensor senses it and sends a signal to a controller of the system 1. In response to the signal, the controller sends a request of transmitting image information to the central control unit 30 through the circuit 311, relay 31, and circuit 310, or through the private network 35, public circuit 32, and circuit 320, or through the circuit 331, satellite 33, and circuit 330. In response to the request, the central control unit 30 transmits image information to the system 1.

Upon receiving the image information, the controller of the system 1 in question activates a projector thereof to project the image information onto the hologram screen to display the image information.

If the people go out of the viewing angle, the sensor senses it and sends a signal to the controller. In response to the signal, the controller stops the projector and sends a request for stopping the image information to the central control unit 30. Upon receiving the request, the central control unit 30 stops sending the image information.

In this way, the central control unit 30 centrally controls the image information displaying systems 1, to save manpower and reduce managing costs.

Embodiment A4

Figure 7:
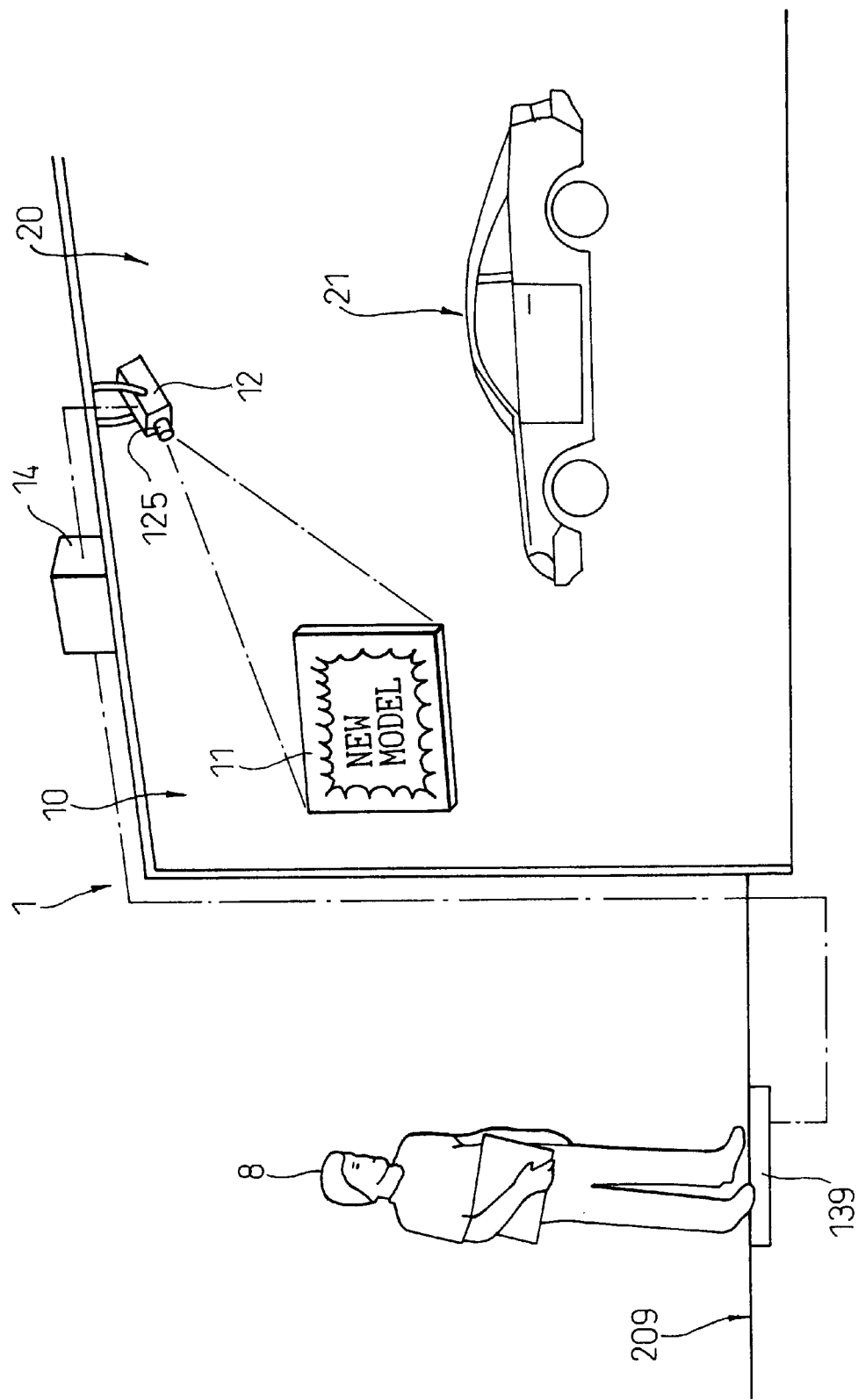
FIG. 7 shows an image information displaying system with a weight sensor according to an embodiment A4 of the present invention.

FIG. 7 shows an image information displaying system with a weight sensor according to an embodiment A4 of the present invention. The weight sensor senses a person entering a viewing angle of a hologram screen 11.

The system 1 has a transparent support 10, the hologram screen 11 attached to the support 10, a projector 12, and a controller 14. The system is installed in a showroom 20.

The weight sensor 139 is embedded in the floor 209 of the showroom 20. A range of the weight sensor 139 of sensing weight is set to be equivalent to the viewing angle of the hologram screen 11.

The other parts and operation of the fourth embodiment are the same as those of the first embodiment.

The controller 14 may have a timer to automatically start and stop the projector 12 according to time bands.

The system 1 may have a touch switch so that a person 8 may freely start and stop the projector 12.

Embodiment A5

FIGS. 8 to 11 show an image information displaying system with an illuminance sensor according to an embodiment A5 of the present invention. The illuminance sensor measures illuminance in a viewing angle of a hologram screen 11.

Figure 8:
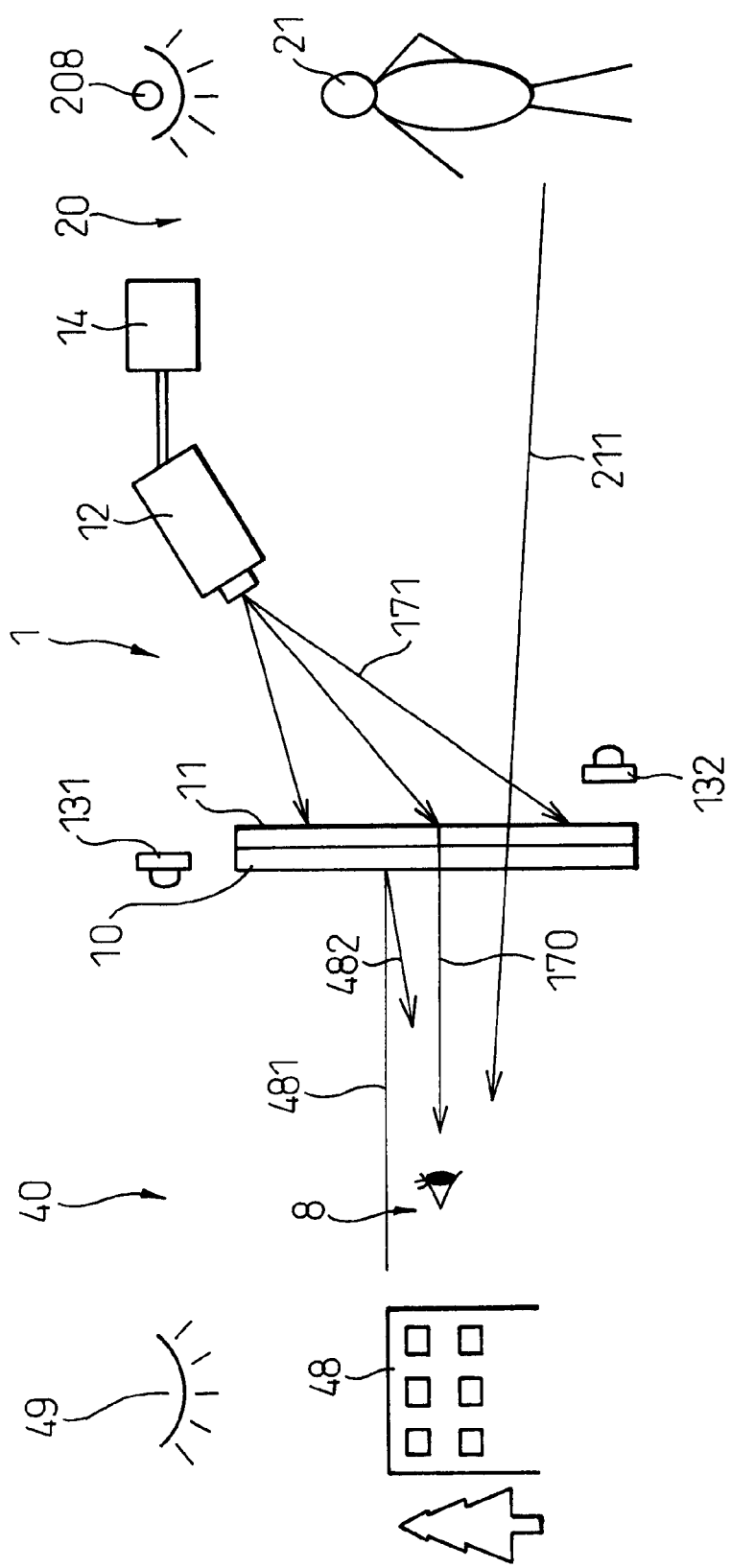
FIG. 8 shows an image information displaying system with an illuminance sensor according to an embodiment A5 of the present invention.

In FIG. 8, the system 1 has a transparent support 10, the hologram screen 11 attached to the support 10, a projector 12 for projecting image information onto the screen 11, illuminance sensors 131 and 132 for sensing ambient conditions in the viewing angle of the screen 11, and a controller 14 for controlling the quantity of a beam 171 emitted from the projector 12 according to signals from the sensors 131 and 132.

The system 1 is installed between a room light 208 of a showroom 20 and the sun 49 in the outside 40 of the showroom 20. The support 10 is a glass window of the showroom 20 facing the outside 40.

The sensor 131 is positioned in the viewing angle in the outside 40, and the sensor 132 is positioned in the viewing angle in the showroom 20. The hologram screen 11 is of a transmission type.

Figure 9:
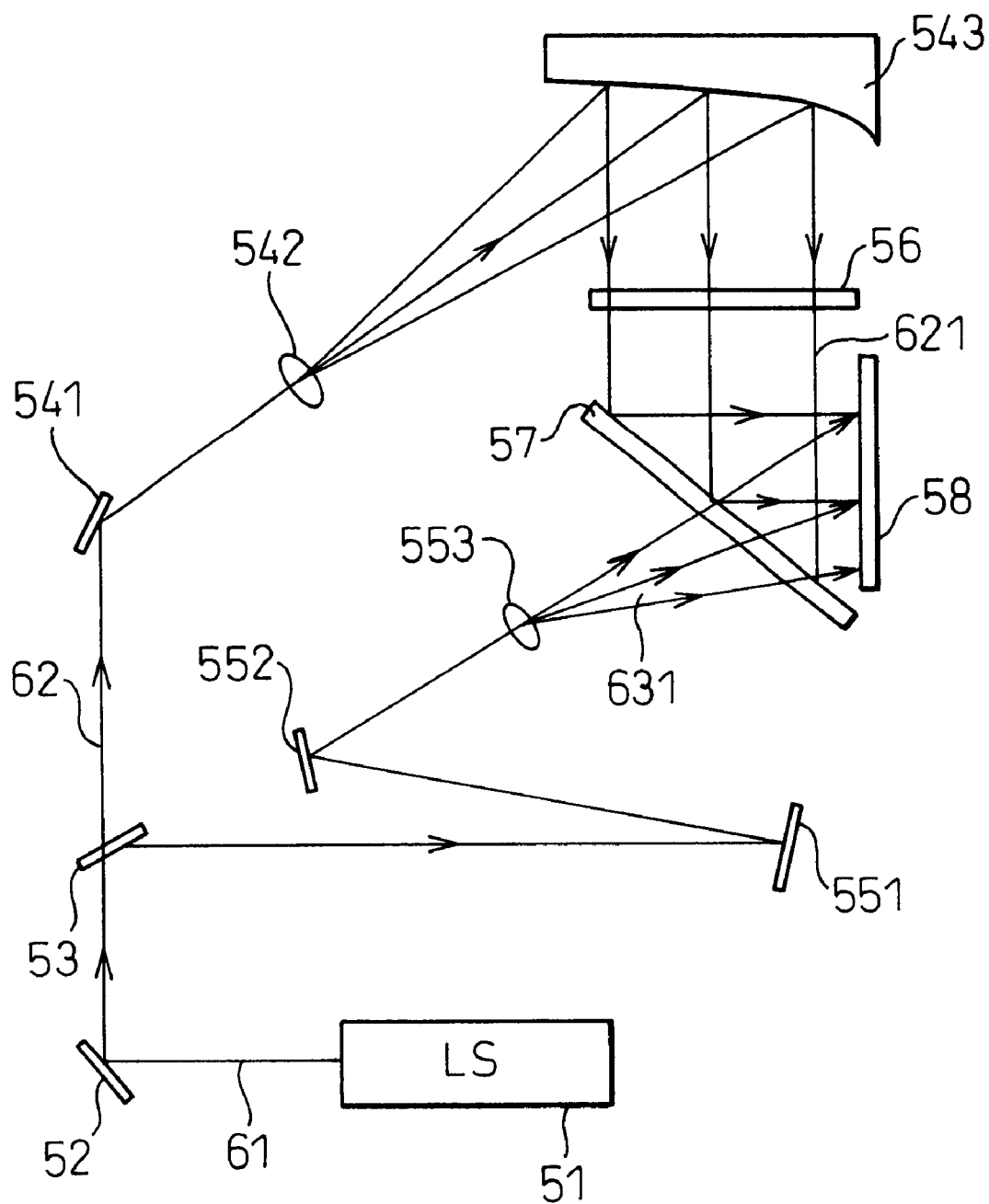
FIG. 9 explains a technique of manufacturing a hologram screen of the embodiment A5.

FIG. 9 shows a technique of manufacturing the hologram screen 11.

A laser source 51 emits a coherent beam 61, which is reflected by a mirror 52 and is divided by a half-mirror 53 into a beam 62 for making an object beam 621 and a beam 63 for making a reference beam 631. The beam 62 is reflected by a mirror 541 and is passed through an object lens 542 and an off-axis parabolic mirror 543, to form a parallel beam. The parallel .beam is passed through a diffuser 56 to form the object beam 621, which is made incident to a photosensitive material 58 through a half-mirror 57.

The other beam 63 from the half-mirror 53 is reflected by mirrors 551 and 552 and is passed through an object lens 553 to form a divergent beam. The divergent beam is passed through the half mirror 57 to form the reference beam 631, which is made incident to the photosensitive material 58.

As a result, the diffuser 56 is recorded on the photosensitive material 58, which serves as the transmission-type hologram screen 11.

When the projector 12 emits a beam 171 (FIG. 8) in the same direction as the reference beam 631 (FIG. 9) onto the screen 11, the beam 171 is transmitted through the screen 11 to form a diffracted beam 170, which is equivalent to a diffused beam provided by the diffuser 56.

Instead of the hologram screen formed by the technique mentioned above, a transparent base material such as ANGLE 21 of Nippon Itagarasu or LUMISTY of Sumitomo Kagaku Kogyo having a visual-field selecting function may be used as a screen.

Figure 10A:
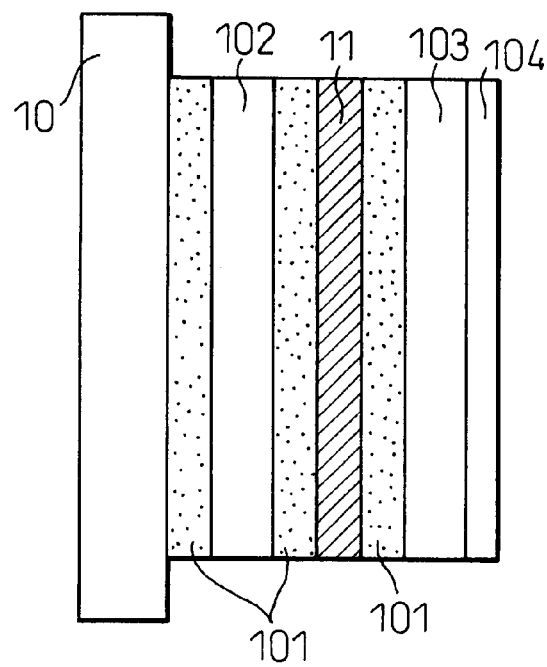
FIG. 10(a) is a sectional view showing a hologram screen with a polyester polarization film of thee embodiment A5.
Figure 10B:
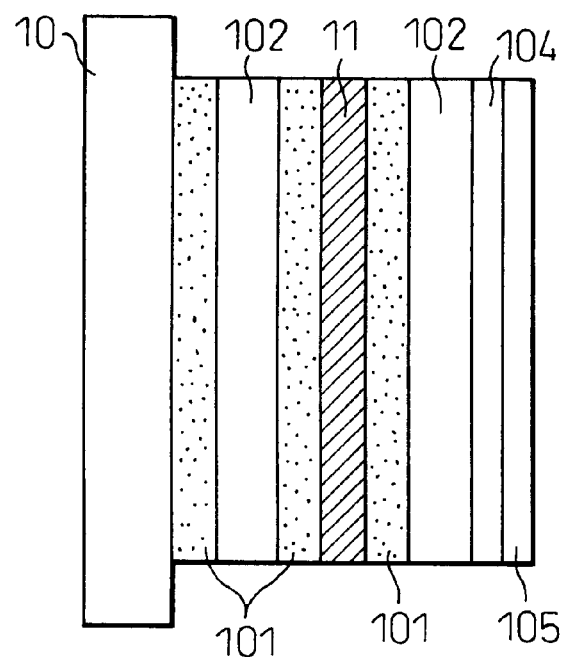
FIG. 10(b) is a sectional view showing a hologram screen with an antireflection film of the embodiment A5.

FIGS. 10(a) and 10(b) show each a hologram screen attached to a transparent support 10 with a polyester film 102 being interposed between them. These elements are bonded to one another with transparent adhesives 101.

In FIG. 10(a), a polyester polarization film 103 having a hard coat 104 is attached as an outermost layer of the hologram screen 11 with a transparent adhesive 101.

The hard coat 104 protects the hologram screen 11 from scratches when the screen 11 is cleaned. To provide this function, the hard coat 104 must have a pencil hardness of 1H or more.

The polyester film 102 is 140 micrometers thick, and the polyester polarization film 103 is 90 micrometers thick.

In FIG. 10(b), a polyester film 102 having an antireflection film 105 and a hard coat 104 is attached as an outermost layer of the hologram screen 11 with a transparent adhesive 101.

If the hard coat 104 is arranged outside the antireflection film 105, scratch resistance will improve but an antireflection effect will disappear. Accordingly, the hard coat 104 must be arranged under the antireflection film 105. The antireflection film 105 provides an effect of reducing noise light due to interface reflection at the back of the hologram screen 11.

An antireflection film may also be arranged for the structure of FIG. 10A, as an outermost layer of the polyester polarization film 103 having the hard coat 104.

In each of FIGS. 10A and 10B, an antifouling film may be arranged outside the antireflection film 105.

The operation of the fifth embodiment will be explained.

In FIG. 8, a viewer 8 observes image information displayed on the hologram screen 11. The viewer 8 receives light 482 from a background 48 behind the viewer 8 reflected by the screen 11, and light 211 from an exhibit 21 through the screen 11. The light 482 and 211 is noise light that interferes with the image information displayed on the screen 11.

The illuminance sensor 131 is arranged in the viewing angle of the screen 11 in the outside 40. The illuminance sensor 132 is arranged inside the showroom 20. These sensors 131 and 132 detect illuminance in the outside 40 and in the showroom 20.

The controller 14 receives signals from the sensors 131 and 132. If the illuminance from both the sensors 131 and 132 is high, the controller 14 increases the quantity of light emitted from the projector 12, to increase the brightness of images displayed on the screen 11. This results in making the noise light inconspicuous and improving the visibility of the images.

If the sensors 131 and 132 detect low illuminance, the quantity of light emitted from the projector 12 will be relatively high. In this case, halation will occur. Then, the controller 14 decreases the quantity of light emitted from the projector 12 to improve the visibility of images displayed on the screen 11.

If the sensors 131 and 132 detect illuminance that is excessively high to cause noise light that is uncontrollable even by maximizing the quantity of light emitted from the projector 12, the controller 14 may stop the projector 12.

In this way, the fifth embodiment is capable of optimizing the brightness of images projected from the projector 12 or stopping the projector 12 in response to ambient conditions in the viewing angle of the hologram screen 11.

Instead of adjusting the quantity of light emitted from the projector 12, it is possible to adjust the area of light emitted from the projector 12 to adjust the brightness of images displayed on the hologram screen 11. This is possible because the brightness of an image is in inverse proportion to the area of light that forms the image. The adjustment of a light emitting area is done by using an enlargement-contraction mechanism for adjusting a lens position of the projector 12.

Some image information has sufficient visibility even in a bright environment. In this case, image information that is hard to see under bright circumstances may be switched to another that is easy to see even under bright circumstances, if surrounding brightness is too high, thereby securing an eye-catching effect.

The illuminance sensors 131 and 132 may be brightness sensors to measure the brightness of the background 48 and exhibit 21.

Figure 11:
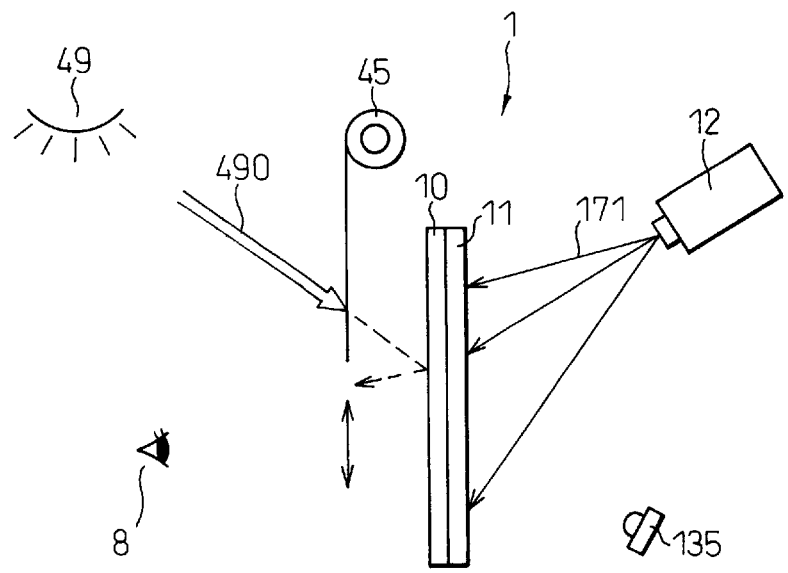
FIG. 11 shows an image information displaying system with a hologram screen having a shade according to the embodiment A5.

As shown in FIG. 11, it is possible to arrange an illuminance sensor 135 oriented toward the hologram screen 11, to measure the illuminance of direct sunlight 490 from the sun 49. If the measured illuminance is above a predetermined level, a shade 45 is driven to block the direct sunlight 490. The shade 45 may be a visor, a blind, a curtain, etc.

Embodiment A6

An image information displaying system according to an embodiment A6 of the present invention has a speaker for providing audio information.

Similar to the embodiment A1, the system of the sixth embodiment consists of a transparent support, a hologram screen attached to the support, a projector for projecting image information onto the screen, a volume sensor for sensing the volume of sound in a viewing angle of the screen, and a controller for controlling the projector and speaker in response to signals from the sensor.

In response to a sound volume detected by the volume sensor, the controller starts and stops the projector and adjusts the volume of the speaker.

If the volume sensor senses sounds greater than a predetermined level in the viewing angle of the screen, the controller determines that people are present in or around the viewing angle and activates the projector and speaker.

If the volume sensor senses no sound greater than the predetermined level in the viewing angle, the controller determines that there are no people in and around the viewing angle and stops the projector and speaker.

If the volume sensor senses nose larger that a predetermined level, the controller increases the volume of the speaker so that people in the viewing angle may clearly hear audio information from the speaker.

If the volume sensor senses noise smaller than the predetermined level, the controller determines that the inside of the viewing angle is quiet and reduces the volume of the speaker so that people in the viewing angle may not receive unpleasantly loud audio information The other parts of the sixth embodiment are the same as those of the embodiment A1.

The system of the embodiment A6 is capable of providing audio information as well as image information and adjusting the volume of audio information in the viewing angle to a proper level, thereby improving an eye-catching effect.

To easily detect a sound volume in the viewing angle, the volume sensor may have a sound collecting reflector, or may be a directional volume sensor.

Embodiment A7

FIGS. 12 to 16 show an image information displaying system installed in a mobile body and, in particular, in a car according to an embodiment A7 of the present invention.

Figure 12:
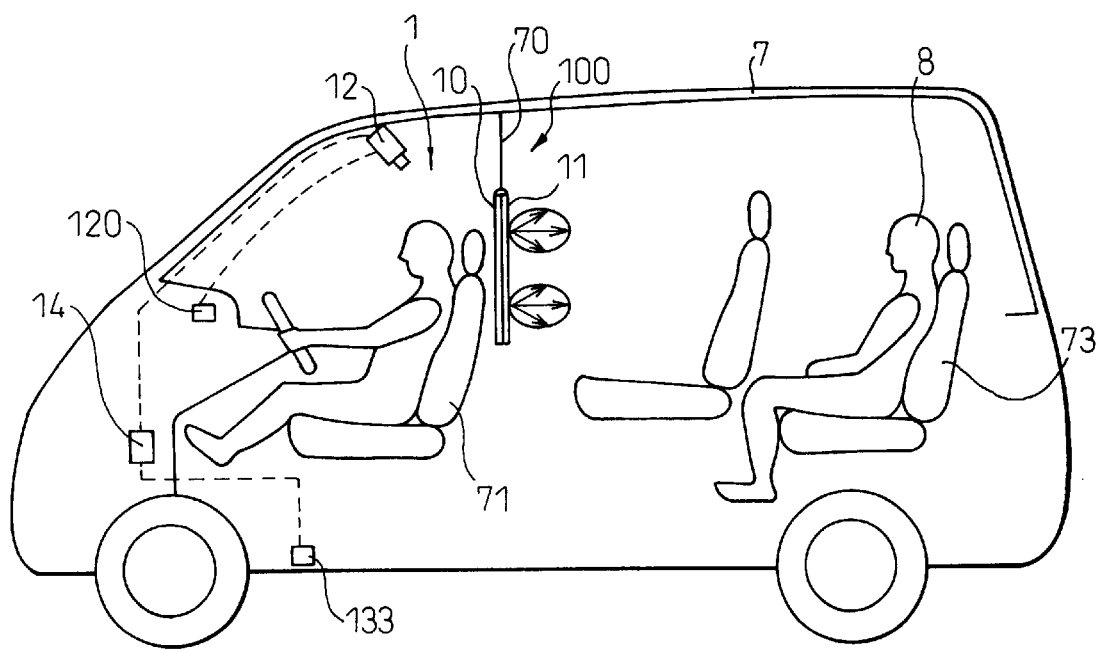
FIG. 12 shows an image information displaying system installed in a mobile body according to an embodiment A7 of the present invention.
Figure 13:
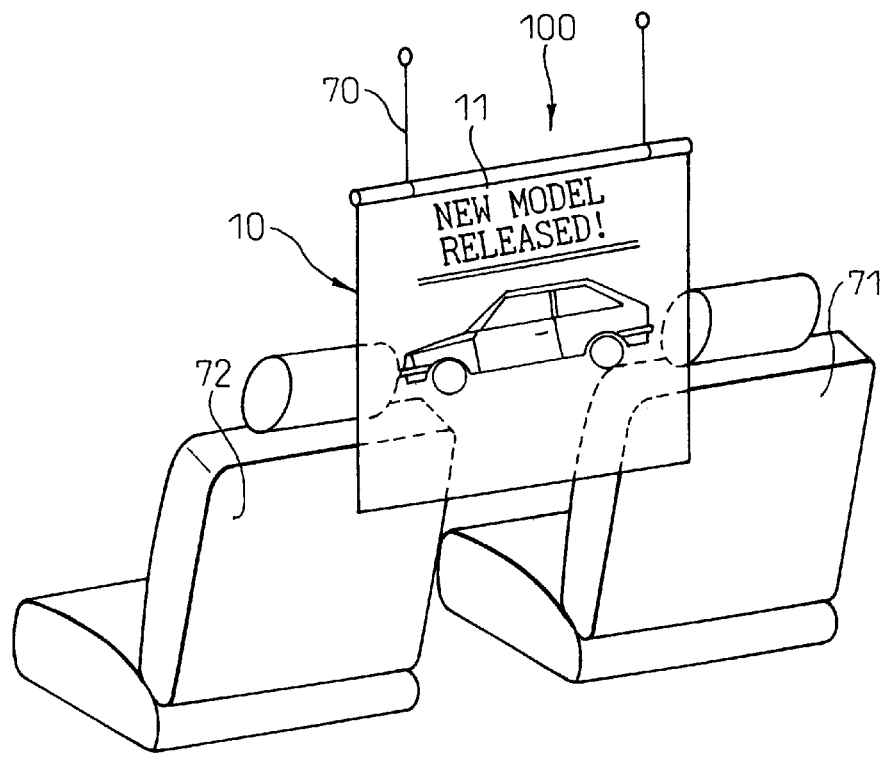
FIG. 13 shows an installed state of a hologram screen of the embodiment A7.

In FIGS. 12 and 13, a display unit 100 consists of a transparent support 10 and a hologram screen 11. The display unit 100 is attached to a suspender 70, which is attached to the ceiling of the car 7 and is positioned between a driver's seat 71 and an assistant's seat 72, so that a passenger 8 in a rear seat 73 may see image information on the screen 11.

In FIG. 12, the image information displaying system 1 also has a vibration sensor 133 and a controller 14. In response to signals from the vibration sensor 133, the controller 14 corrects a blur of image information due to the vibration of the car 7.

Figure 15:
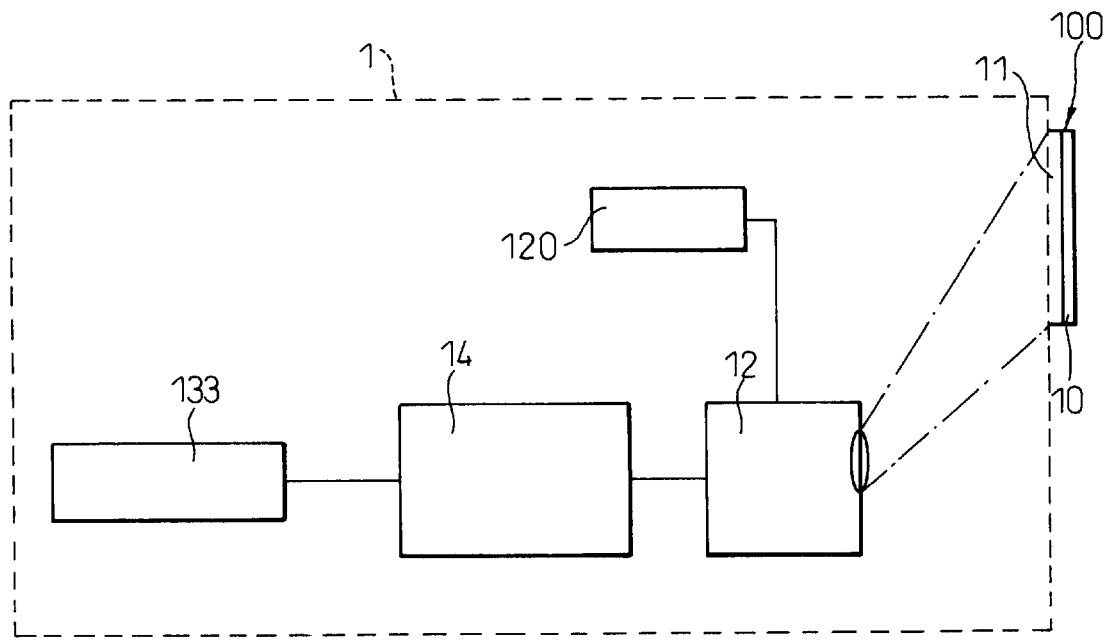
FIG. 15 shows an arrangement of the system of the embodiment A7.

The details of this arrangement will be explained with reference to FIG. 15.

A signal from the vibration sensor 133 is supplied to an electric corrector of the controller 14. An image source 120 such as a video deck supplies image information to a projector 12. The electric corrector corrects the image information held in the projector 12 according to the signal from the vibration sensor 133, and the projector 12 projects the corrected image information onto the display unit 100.

The other parts of the embodiment A7 are the same as those of the embodiment A1.

The system 1 is mounted on the car 7 and, therefore, image information to be seen by the passenger 8 will be blurred during the driving of the car 7 if no measure against vibration is taken. The seventh embodiment corrects image information according to signals from the vibration sensor 133 and projects the corrected image information from the projector 12, so that the passenger 8 may see the corrected image information without a blur.

The other operations and effects of the embodiment A7 are the same as those of the embodiment A1.

Figure 16:
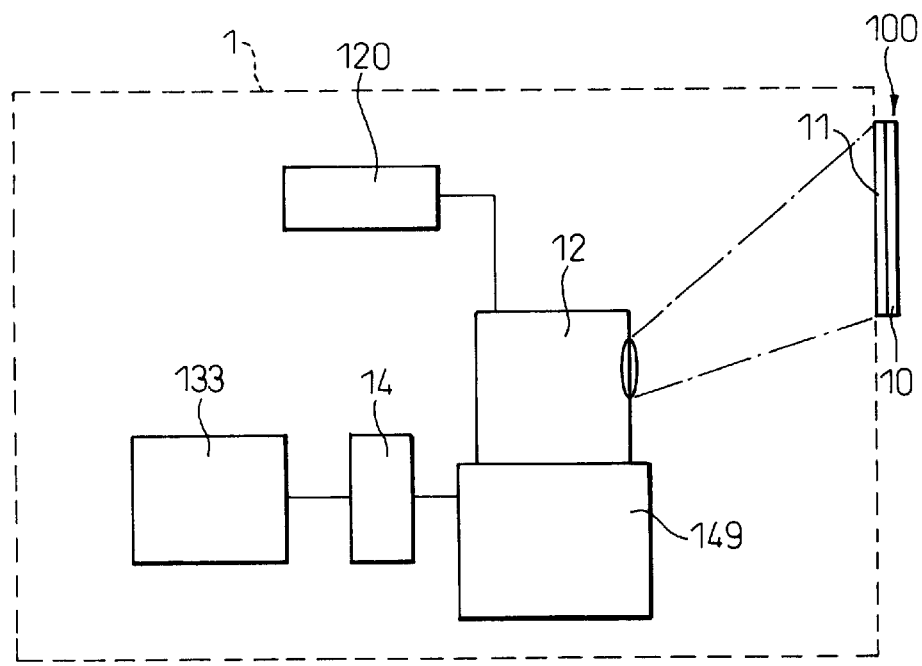
FIG. 16 shows the system of the embodiment A7 with a projector having a damping mechanism.

FIG. 16 shows a modification of the embodiment A7.

In response to signals from the vibration sensor 133, the controller 14 suppresses the vibration of the projector 12 caused by the vibration of the car 7.

For this purpose, the modification employs a damping mechanism 149 for the projector 12. Signals from the vibration sensor 133 are supplied to the controller 14, which controls the damping mechanism 149 accordingly. Image information is supplied from the image source 120 to the projector 12. According to signals from the vibration sensor 133, the controller 14 activates the damping mechanism 149, to cancel the influence of the vibration of the car 7 on the projector 12.

This modification is capable of displaying image information without a blur.

Figure 14:
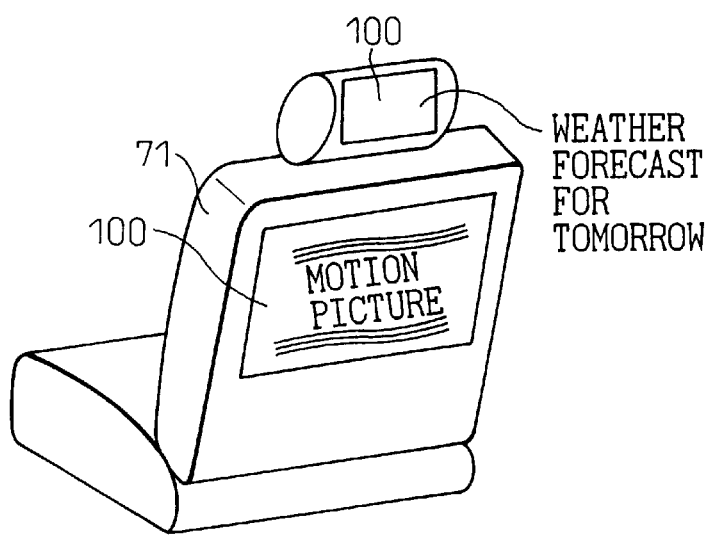
FIG. 14 shows another installed state of the hologram screen of the embodiment A7.

The display unit 100 of the embodiment A7 may be embedded in the back of the driver's seat 71 as shown in FIG. 14.

Embodiment B1

An image information displaying system according to the embodiment B1 of the invention will be explained with reference to FIGS. 17 to 20.

Figure 17:
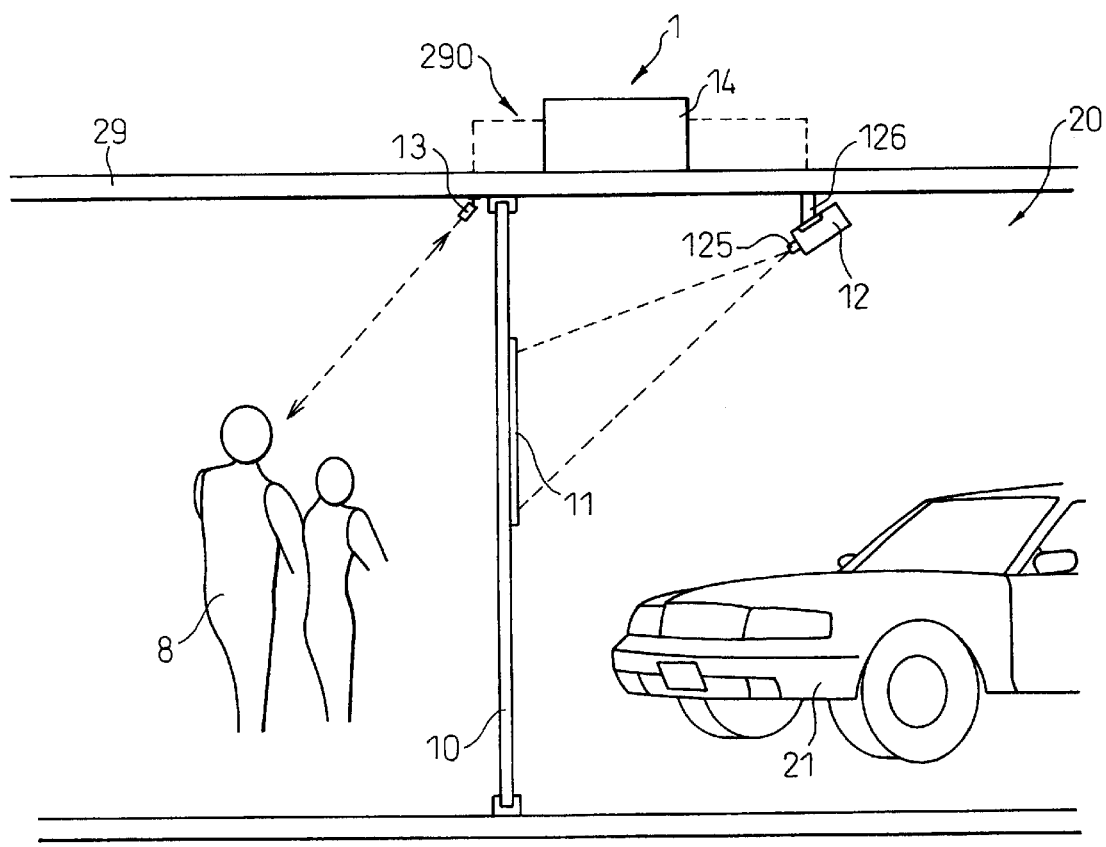
FIG. 17 is a diagram for explaining a configuration of an image information displaying system according to an embodiment B1.

As shown in FIG. 17, the image information displaying system 1 according to this embodiment comprises a transparent support 10, a hologram screen 11 attached to the transparent support 10, and a radiation unit 12 for radiating image information on the hologram screen 11.

Figure 18:
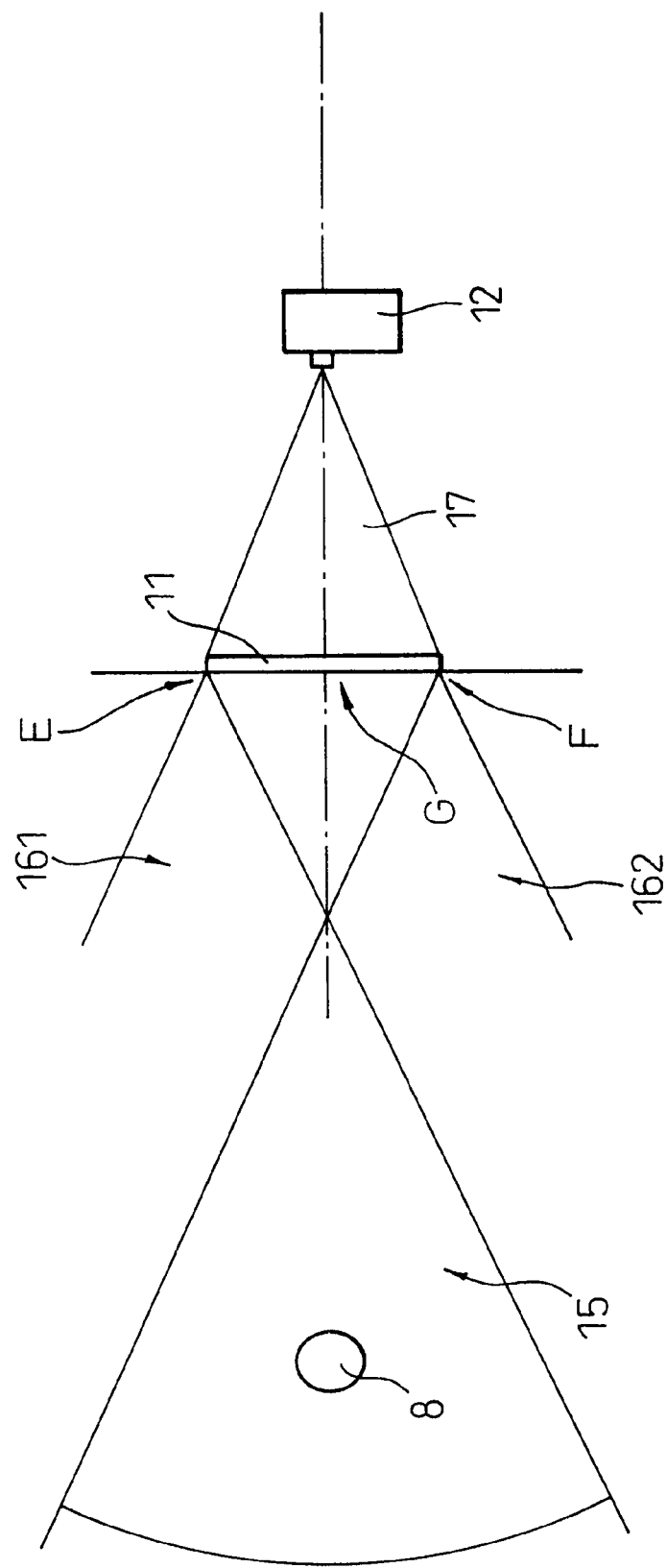
FIG. 18 is a plan view for explaining the viewing angle of a hologram screen of an image information displaying system according to the embodiment B1.
Figure 19:
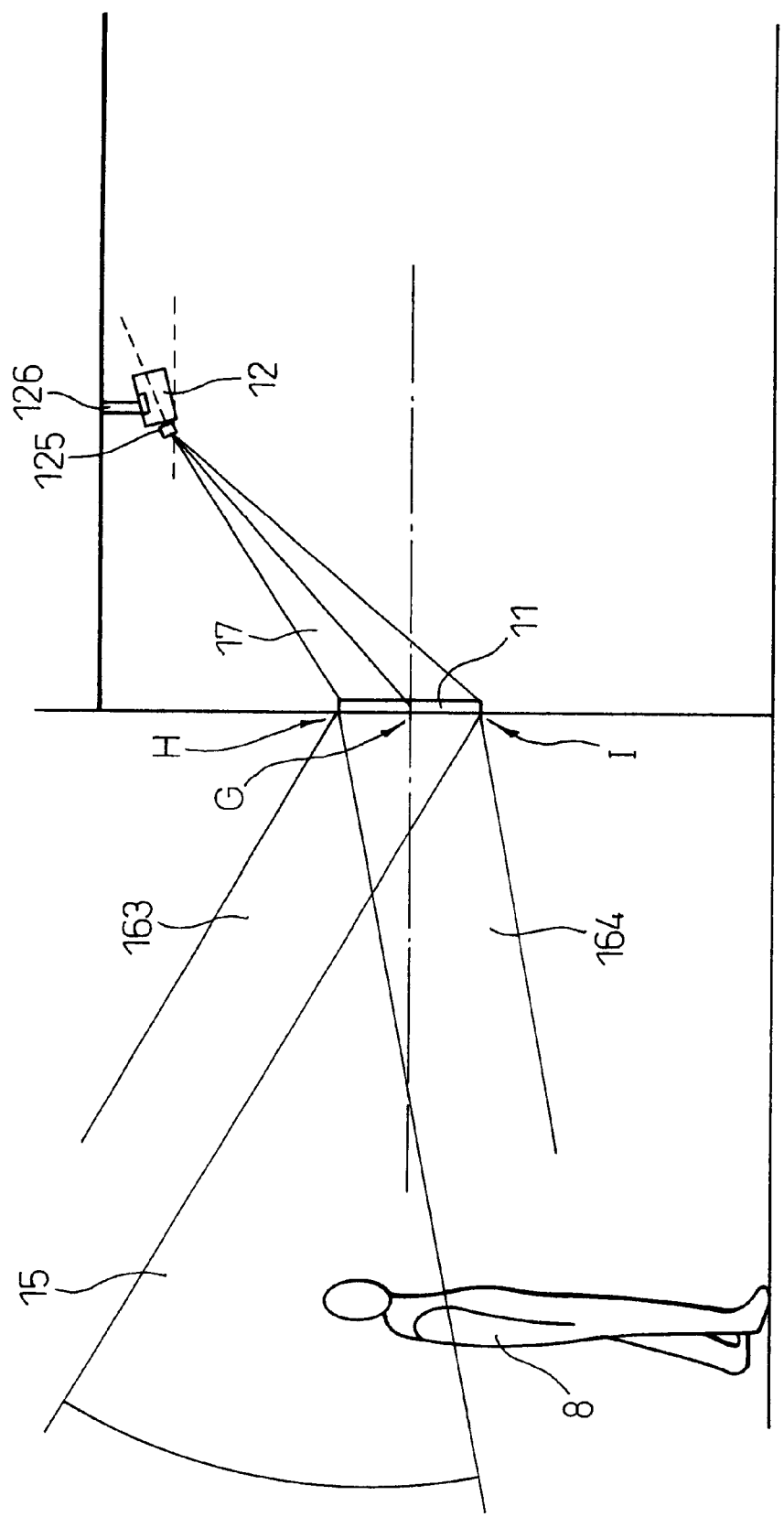
FIG. 19 is a side view for explaining the viewing angle of a hologram screen of an image information displaying system according to the embodiment B1.

As shown in FIGS. 18, 19, the image information displaying system 1 further comprises a sensor 13 for detecting the entry of a viewer 8 into a viewing angle 15 of the hologram screen 11, and a radiation control unit 14 adapted to control the radiation unit 12 in such a manner as to radiate the image information on the hologram screen 11 based on the signal from the sensor 13.

FIG. 17 shows a showroom 20 in which the image information displaying system 1 according to this embodiment is installed. The hologram screen 11 is of transmission type. The transparent support 10 attached to the hologram screen 11 is the window glass of the showroom 20. A commodity 21 is exhibited behind the hologram screen 11.

While the image information is not on display, the exhibited commodity 21 can be viewed through the hologram screen 11.

The principle of the hologram screen of transmission type will be briefly explained.

The radiation unit is arranged on the back of the screen (hologram screen) including a hologram element, and the image information is radiated from the radiation unit. This image information is focused thereby to form a real image on the hologram screen. The beam transmitted by scattering from this real image enters the eyes of the viewer so that the viewer can view the real image with his own eyes.

The sensor 13 is fixed on a ceiling 29 outside the showroom 20. The radiation unit 12 is fixed by means of an arm 126 on the ceiling 29 inside the showroom 20. A lens portion 125 for radiating the image information from the radiation unit 12 is movably configured. The sensor 13 is an infrared sensor. The radiation unit 12 is a liquid crystal projector.

The radiation control unit 14 is arranged in the space 290 above the ceiling of the showroom 20. The radiation control unit 14 is connected to both the sensor 13 and the radiation unit 12.

The viewing angle of the hologram screen 11 will be explained.

FIG. 18 shows the showroom 20 and the image information displaying system 1 as viewed from above (plan view), and FIG. 19 shows them sideways (side view).

The viewing angle 15 of the hologram screen 11 is in the range of a fan-shaped or sectorial area described in FIG. 18. Within this range, the brightness is not less than K0/4, where K0 is the brightness at the center front G of the hologram screen 11. The viewing angle is in the shape of a cone.

The viewing angle will be explained in detail.

In FIG. 18, the radiation beam 17 (containing the image information) issued from the radiation unit 12 reaches the hologram screen 11 while fanning out. The radiation beam 17 that has impinged on an end portion E of the hologram screen 11 is transmitted by scattering and proceeds to fan out. The sectorial area thus formed is designated by reference numeral 161. The sectorial area formed by the beam impinging on the other end portion F of the hologram screen 11 is designated by numeral 162. A new sectorial area formed by the portions overlapped by the sectorial areas 161, 162 constitutes the viewing angle 15.

Similarly in FIG. 19, the radiation beam 17 that has reached an end portion H of the hologram screen 11 is transmitted by scattering while expanding in the shape of a fan 163. In the case where the radiation beam 17 reaches an end portion I, on the other hand, it fans out in the fan shape 164. A new sectorial area formed by the overlapped portions of the sectorial areas 163, 164 makes up the viewing angle 15.

The foregoing description is made with reference to the plan views 18, 19. Therefore, the radiation beam 17 is assumed to expand in the shape of a fan. Actually, however, it proceeds to diffuse into the space and therefore the viewing angle 15 assumes a conical shape.

The brightness K0 and the viewing angle will be described more specifically with reference to FIGS. 18 and 19.

In FIGS. 18 and 19, a point G is the one at the center front of the hologram screen 11, where the brightness is given as K0. The point G is the brightest point on the hologram screen 11.

In FIGS. 18 and 19, the viewing angle 15 represents a sectorial portion as shown. Within this viewing angle 15, the image information projected on the hologram screen 1 is visible. The brightness of the hologram screen 11 decreases with the distance from the center point G.

The image information displaying system 1 was described above.

Now, an explanation will be given of the central control unit 30 configured to control the image information displaying system 1.

Figure 20:
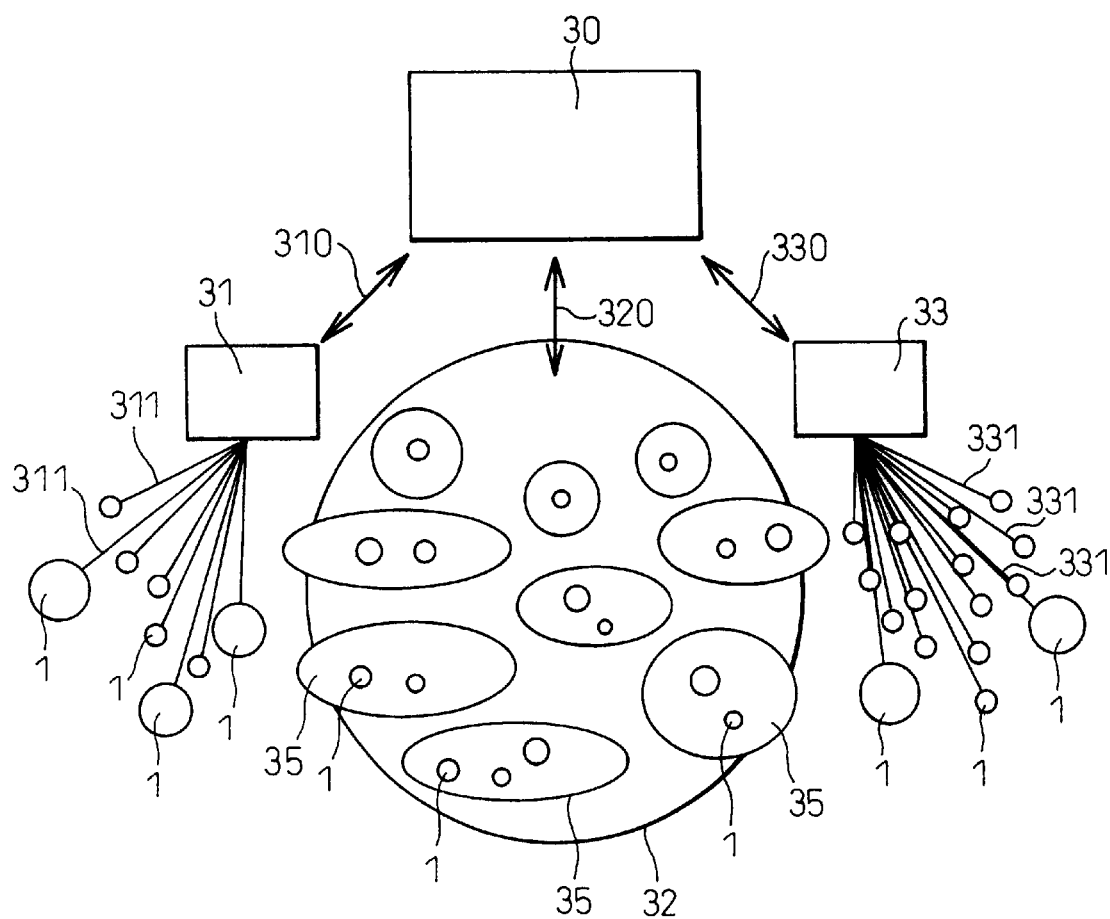
FIG. 20 is a diagram for explaining a multiplicity of image information displaying systems connected to a central control unit according to the embodiment B1.

As shown in FIG. 20, the image information displaying systems 1 are controlled by the central control unit 30 including a mainframe computer or various work stations connected through various communication lines.

The communication line connecting the central control unit 30 and each image information displaying system 1 will be explained.

As shown in FIG. 20, the central control unit 30 and a relay 31 are connected by a line 310 made of an optical fiber cable. The relay 31 also functions a controller for CATV program distribution. The relay 31 and various image information displaying systems 1 are connected to each other by CATV lines 311.

As shown in FIG. 20, the central control unit 30 and each image information displaying system 1 are connected by the telephone line. In this case, the central control unit 30 is connected to the telephone circuit 32 through a line 320 and further from the telephone circuit 32 through extension networks 35 to each image information displaying system 1. The line 320 can also be the telephone line. The telephone circuit 32 and the extension networks 35 are voice transmission (analog or digital) lines used for telephone.

As shown in FIG. 20, the central control unit 30 is connected by a radio channel 330 to a broadcasting communication satellite 33, which, in turn, is connected to each image information displaying system 1 using broadcast satellite lines 331.

Now, an explanation will be given of the operation of the image information displaying systems 1 and the central control unit 30.

As shown in FIG. 17, in each image information displaying system 1, the sensor 13 detects the entry of the viewer into the viewing angle 15 and sends a corresponding signal to the radiation control unit 14. Upon receipt of this signal, the radiation control unit 14 gives a request to the central control unit 30 to distribute the image information through the lines 311, the relay 31 and the line 310, or through the extension networks 35, the telephone circuit 32 and the line 320 or through the lines 331, the communication satellite 33 and the line 330. The central control unit 30 that has received this request sends out the image information to each image information displaying system 1.

The radiation control unit 14 that has received the image information activates the radiation unit 12 while at the same time sending out the received image information to the radiation unit 12. In this way, the radiation unit 12 radiates the image information on the hologram screen 11, so that the image information is displayed on the hologram screen 11.

After that, the sensor 13 of each image information displaying system 1 detects that the viewer 8 has left the viewing angle 15. In response to the signal from the sensor 13, the radiation control unit 14 deactivates the radiation unit 12 while at the same time requesting the central control unit 30 to stop the image information. The central control unit 30 that has received this request stops sending out the image information.

As described above, all the image information displaying systems 1 can be controlled and operated collectively by the central control unit 30, and therefore both energy and labor are saved. Also, the image information are managed collectively by the central control unit 30 for a reduced management cost.

The operation and effects of the image information displaying system 1 according to this embodiment will be explained.

The sensor 13 detects the viewer 8 passing in front of the showroom 20 and into the viewing angle 15, and sends out a signal to the radiation control unit 14. In response to this signal, the radiation control unit 14 activates the reproduction unit and the radiation unit 12, and sends out the image information to the radiation unit 12. The image information is displayed on the hologram screen 11.

The hologram screen 11 is transparent and attached on the window glass making up a transparent support 10. As long as the image information is not displayed, therefore, the hologram screen 1 is so inconspicuous that it hardly attracts the attention of the viewer 8.

Once the viewer 8 enters the viewing angle 15, however, the radiation unit 12 is activated and the image information is suddenly displayed on the window glass (transparent support 10) which has thus far been considered empty by the viewer 8.

As a result, the attention and interest of the viewer 8 are considerably attracted to the image information. In other words, a good eye-catching effect is produced.

After that, the viewer 8 leaves the viewing angle 15. This is detected by the sensor 13 which sends a signal to the radiation control unit 14. The radiation control unit 14 deactivates the reproduction unit and the radiation unit 12.

Thus, the radiation unit 12 operates only during the period when the viewer 8 exists within the viewing angle 15, and the operation time of the radiation unit 12 can be reduced remarkably as compared with the case where the image information is constantly supplied. In this way, the power consumption of the system is reduced for a lower running cost.

Since the operation time of the system can be shortened, the service life of the system is lengthened.

As described above, according to this embodiment, an image information displaying system is provided which is superior in the eye-catching effect, low in energy consumption and running cost, and long in service life.

Although the present embodiment uses the hologram screen of transmission type, the reflection-type hologram can alternatively be used.

The principle of the reflection-type hologram screen will be briefly described.

The radiation unit is arranged in front of the hologram screen, and the image information is radiated from the radiation unit. This image information is focused on the hologram screen to form a real image thereon. The beam reflected from this real image by scattering enters the eyes of the viewer so that the viewer can grasp the real image.

Also, the hologram screen can be so configured that interference fringes are formed in a photosensitive material by a beam diffused through a light diffuser such as ground glass as an object beam and by a non-diffused beam as a reference beam. The reference beam and the object beam are radiated from the same direction for the transmission-type hologram screen, while they are radiated from opposite directions for the reflection-type hologram screen.

In this case, an image information displaying system similar to the present embodiment can be produced.

Embodiment B2

Figure 21:
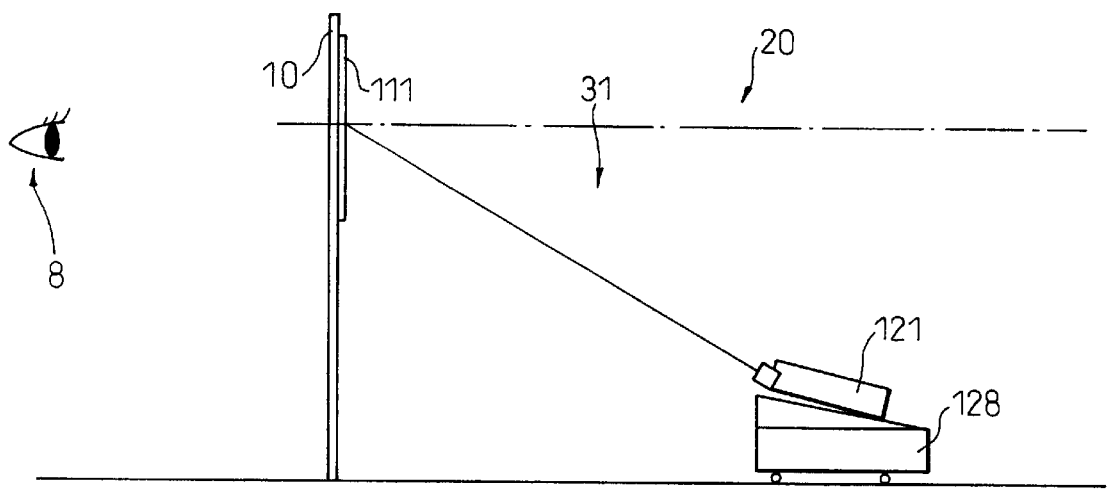
FIG. 21 is a side view for explaining an image information displaying system according to an embodiment B2.
Figure 22:
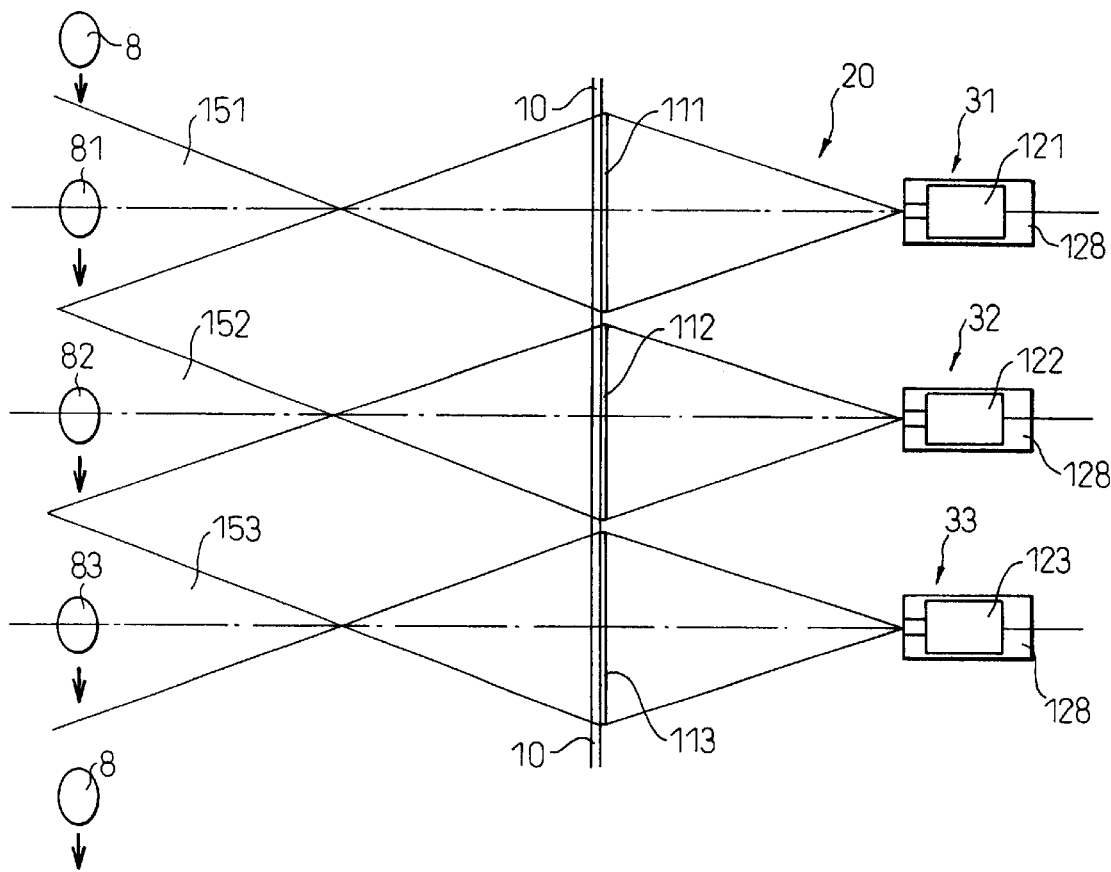
FIG. 22 is a plan view for explaining an image information displaying system according to the embodiment B2.

This embodiment refers to a configuration example in which three image information displaying systems 31 to 33 are installed in a showroom 20 as shown in FIGS. 21 and 22.

As shown in FIGS. 21, 22, the three image information displaying systems 31 to 33 according to this embodiment include a transparent support 10 constituting window glass, three hologram screens 111 to 113 attached to the transparent support 10 and three radiation units 121 to 123 for radiating the image information on the hologram screens 111 to 113, respectively. The hologram screens 111 to 113 are attached in juxtaposition horizontally (along the direction in which the viewer 8 moves) with respect to the transparent support 10.

As shown in FIG. 21, the radiation units 121 to 123 are mounted on a rest 128 on the floor. Also, a sensor and a radiation control unit, though not shown, are connected to the radiation units 121 to 123.

The reference numerals 151 to 153 designate viewing angles corresponding to the hologram screens 111 to 113, respectively.

The other component parts are similar to the corresponding ones, respectively, in the embodiment B1.

The operation and effects of this embodiment will be explained.

As shown in FIG. 22, the viewer 8 moves downward from above in the drawing.

The viewer 8 enters the viewing angle 151. The sensor detects that the viewer 8 has reached the position designated by reference numeral 81 and sends a signal to the radiation control unit. In response to this signal, the radiation control unit activates the radiation unit 121 thereby to radiate the image information on the hologram screen 111.

The viewer 8 continues to move and leaves the viewing angle 151, and then enters the viewing angle 152 reaching the position 82. This is detected by a sensor and a signal is sent to the radiation control unit. As a result, the radiation control unit deactivates the radiation unit 121 and activates the radiation unit 122, thereby radiating the image information on the hologram screen 112.

The viewer 8 further moves, leaves the viewing angle 152 and enters the viewing angle 153, reaching the position 83. This movement is detected by a sensor which sends a signal to the radiation control unit. In response to this signal, the radiation control unit deactivates the radiation unit 122 and activates the radiation unit 123. Then, the image information is radiated on the hologram screen 113.

After that, the viewer 8 leaves the viewing angle 153. A sensor detects this movement, and sends a signal to the radiation control unit, which in turn deactivates the radiation unit 123.

In the above-described manner, the image information displaying systems 31 to 33 according to this embodiment can display the image information at positions interlocked with the movement of the viewer 8. As a result, a dynamic effect is produced in which the image information appears and disappears with the movement of the viewer 8.

The image information displaying systems 31 to 33 according to this embodiment can thus readily attract the attention and interest of the viewers and produce a good eye-catching effect.

The image information radiated from the radiation units 121 to 123 and displayed can be the same one (such as when the continuation of the image radiated by the radiation unit 121 is radiated also by the radiation unit 122) or different ones.

Embodiment B3

This embodiment refers to an image information displaying system using a weight sensor for detecting the entry of the viewer into the viewing angle.

Figure 23:
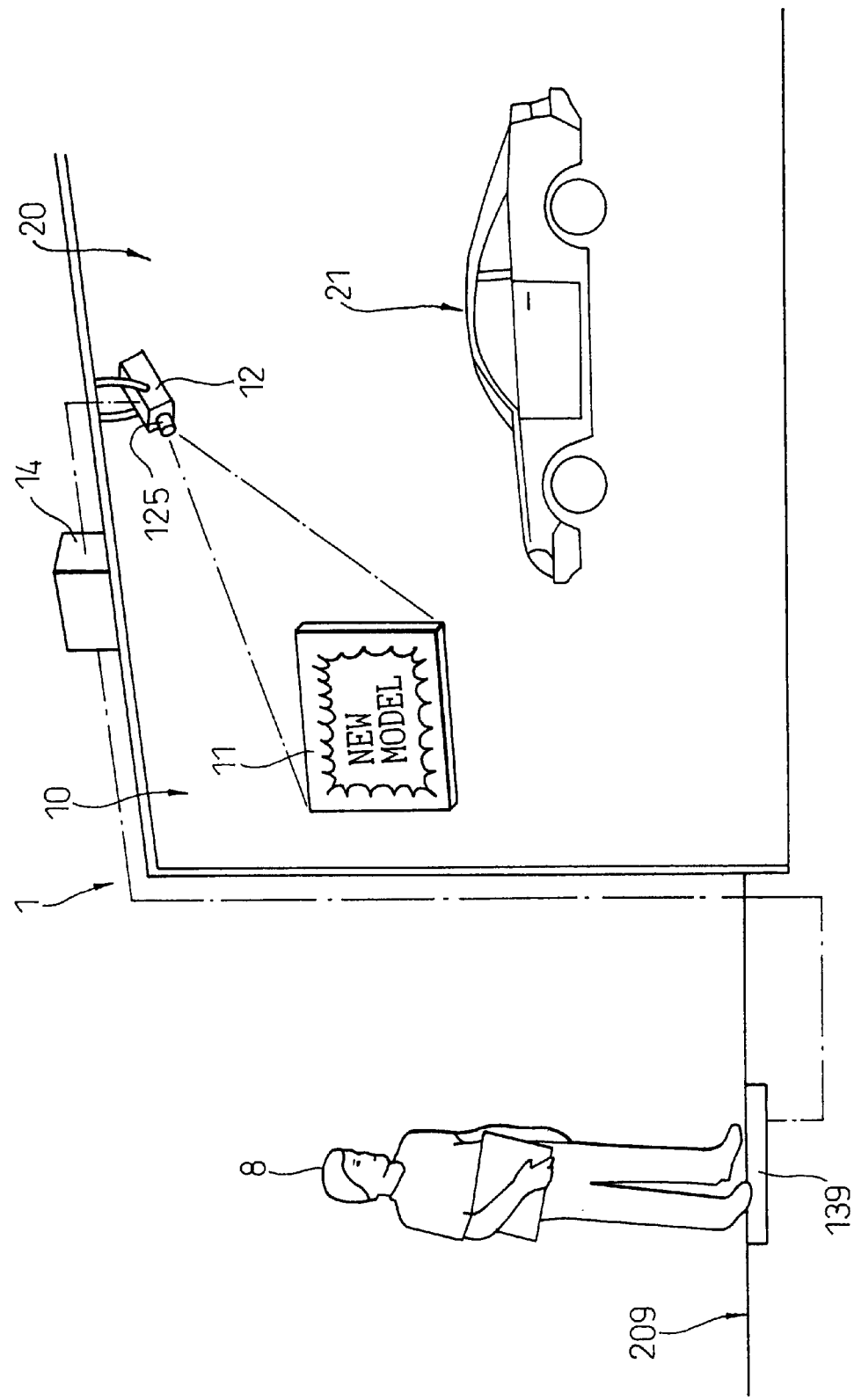
FIG. 23 is a diagram for explaining an image information displaying system using a weight sensor according to the embodiment B3.

As shown in FIG. 23, the image information displaying system 1 according to this embodiment, like the first embodiment, includes the transparent support 10, the hologram screen 11, the radiation unit 12 and the radiation control unit 14 and is installed in a showroom 20.

A weight sensor 139 capable of detecting the weight is buried in the front floor 209 of the showroom 20. The range in which the weight sensor 139 can detect the weight is set as an area where the viewing angle described above is projected on the floor surface 209.

The remaining parts of the configuration are similar to the corresponding parts of the first embodiment and have similar functions and effects to the corresponding parts of the embodiment B1.

According to this embodiment, a timer can be included in the radiation control unit 14 for automatically activating and deactivating the radiation unit 12 in desired time zones.

Also, a touch switch or the like can be provided enabling the viewer 8 to activate and deactivate the radiation unit 12 freely.

Embodiment B4

This embodiment refers to an image information displaying system using an illuminance sensor as the above-mentioned sensor capable of detecting the light amount within the viewing angle, as shown in FIGS. 24 to 27.

Figure 24:
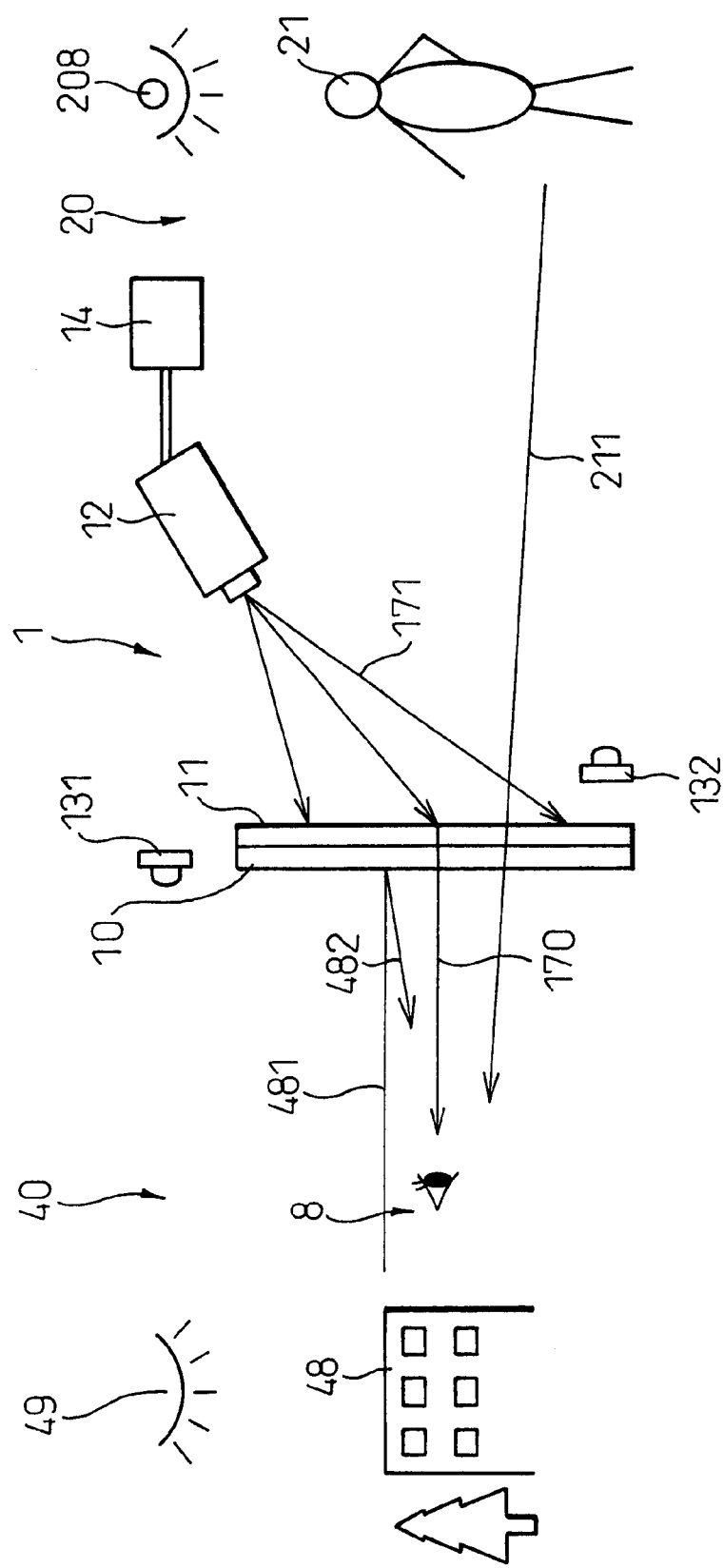
FIG. 24 is a diagram for explaining an image information displaying system using a illuminance sensor according to the embodiment B4.
Figure 25:
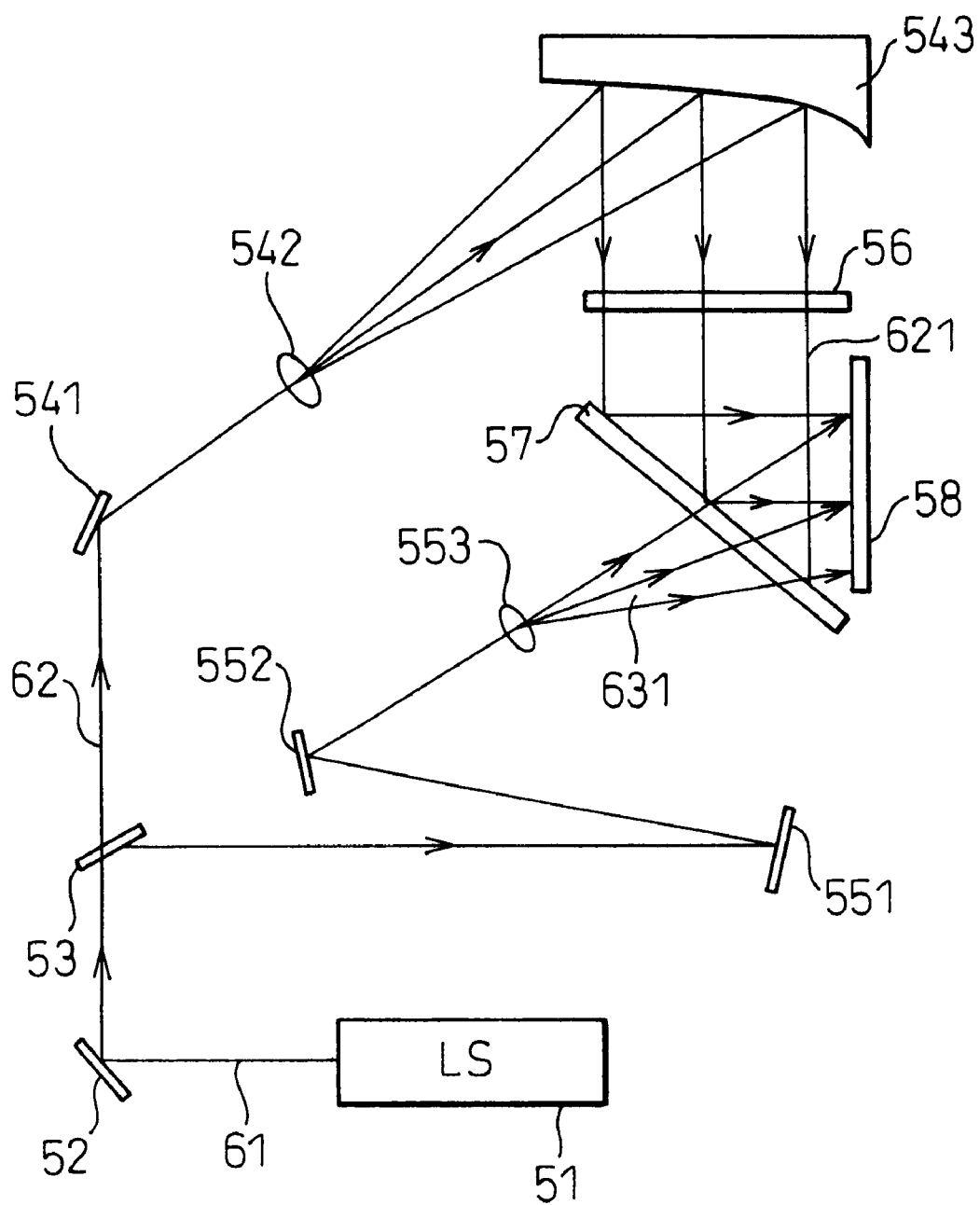
FIG. 25 is a diagram for explaining a method of fabricating a hologram screen according to the embodiment B4.

As shown in FIG. 24, the image information displaying system 1 according to this embodiment includes the transparent support 10, the hologram screen 11 attached to the transparent support 10, the radiation unit 12 for radiating the image information, illuminance sensors 131, 132 for detecting the ambient condition within the viewing angle of the hologram screen 11, and the radiation control unit 14 capable of adjusting the amount of the radiation beam 17 produced from the radiation unit 12 in accordance with the signals from the illuminance sensors 131, 132.

The image information displaying system 1 is installed between the showroom 20 radiated by a room lamp 208 and an outdoor environment 40 radiated by the sun 49. In other words, the window glass partitioning the showroom 20 and the outdoor environment 40 makes up the transparent support 10.

The illuminance sensor 131 is installed within the viewing angle on the outdoor side of the transparent support 10. The illuminance sensor 132, on the other hand, is installed in the showroom 20.

The hologram screen 11 is of transmission type.

Now, a method of fabricating the hologram screen 11 will be explained with reference to FIG. 9.

The light path of the coherent beam 61 emitted from a laser beam source 51 is bent by a mirror 52, and split into the light path for an object beam 621 and the light path for the reference beam 631 by a half mirror 53. The beam 62 emitted from one of the light paths (to the left in the drawing) is converted into parallel beams through a mirror 541, an objective lens 542 and an off-axis paraboloidal mirror 543, after which it passes through a tabular diffuser 56 to form an object beam 621. The beam further enters a photosensitive material 58 through a half mirror 57.

The other beam 63 that has left the half mirror 53, on the other hand, is converted into a divergent beam by an objective lens 553 through mirrors 551, 552, and then enters the photosensitive material 58 through the half mirror 57 as a reference beam 631.

As a result, the photosensitive material 58 is formed with a transmission-type hologram having the diffuser 56 recorded therein. This constitutes the hologram screen 11 according to this embodiment.

The hologram screen 11 thus obtained is irradiated with a radiation beam 171 using the radiation unit 12 from the direction of the reference beam 631 in FIG. 9. Then, the diffracted beam 172 that has been transmitted through the hologram screen 11 can make the same beam as the beam diffused by the diffuser 56.

The hologram screen that can be fabricated by the above-mentioned fabrication method can be replaced by a screen having a transparent support having the function of selecting the field of view (for example, Angle 21 of Nippon Sheet Glass Co., Ltd., or Lumistay of Sumitomo Chemical Co., Ltd.).

Figure 26A:
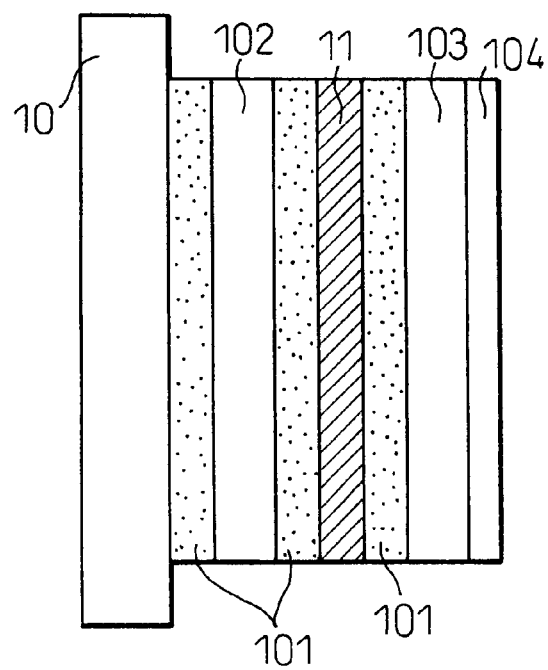
FIG. 26(a) is a sectional view for explaining a hologram screen having a polyester polarizing film according to the embodiment B4.
Figure 26B:
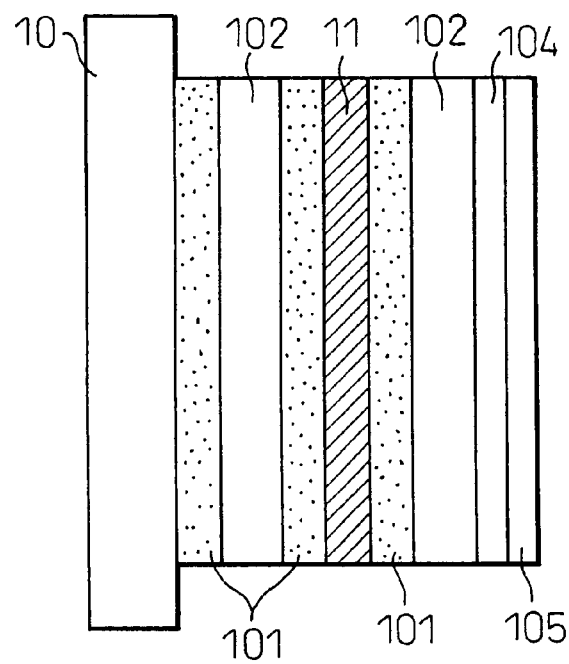
FIG. 26(b) is a sectional view for explaining a hologram screen having an antireflection film according to the embodiment B4.
Figure 27:
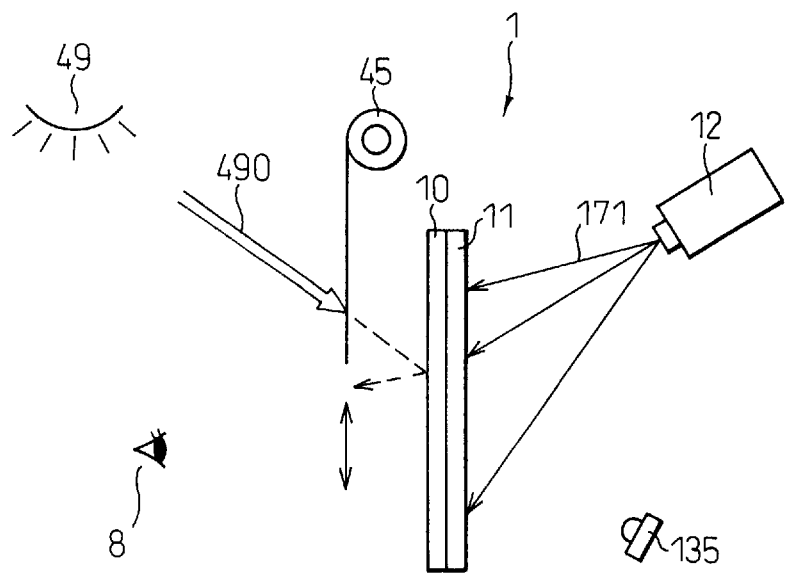
FIG. 27 is a diagram for explaining an image information displaying system having a sunshade of a hologram screen according to the embodiment B4.

As shown in FIGS. 26(a), 26(b), the hologram screen 11 and the transparent support 10 are bonded to each other using a transparent adhesive 101 through a polyester film 102.

Further, as shown in FIG. 26(a), a polyester polarizing film 103 with a hard coat 104 can be bonded to the outermost layer of the hologram screen 11 by the transparent adhesive 101.

The provision of the hard coat 104 can prevent the hologram screen 11 from being scratched at the time of cleaning (the scratch resistance is improved). Also, the hard coat 104 is required to have at least 1 H of pencil hardness for achieving the above-mentioned object.

The polyester films 102 are 140 µm thick, and the polyester polarizing film 103 is 90 µm thick.

Also, FIG. 26(b) shows a configuration in which the polyester film 102 with the hard coat 104 and the antireflection film 105 are attached to the outermost layer of the hologram screen 11 using the transparent adhesive 101.

The scratch resistance would be improved by attaching the hard coat 104 to the exterior of the antireflection film 105. In order to avoid the resulting loss of the antireflection effect, however, it is necessary to attach the hard coat 104 on the inside of the antireflection film 105. The antireflection film 105 has the effect of reducing the noise light caused by the reflection at the interface on the back of the hologram screen 11.

Also, the antireflection film 105 can be attached to the outermost layer of the polyester polarizing film 103 with the hard coat 104 in FIG. 26(a).

Apart from FIGS. 26(a), 26(b), an antifouling film capable of reducing the fouling can be attached on the outside of the antireflection film 105.

The operation and effects of this embodiment will be explained.

As shown in FIG. 24, consider the image information radiated on the hologram screen 11. The noise light other than the beam constituting the image information is observed from the two beams including a beam 481 projected on the background 48 of the viewer on the front and back sides of the hologram screen 11 and a beam 211 from the exhibited commodity 21 constituting the background on the back side of the hologram screen 11.

In this embodiment, the illuminance sensor 131 is installed within the viewing angle on the outdoor environment 40 side of the transparent support 10. The illuminance sensor 132, on the other hand, is installed within the showroom 20. These two illuminance sensors 131, 132 can detect the illuminance of the outdoor environment 40 and the interior of the showroom 20, respectively.

This fact is utilized in the following manner. specifically, assume that the signals from the illuminance sensors 131, 132 are applied to the radiation control unit 14 and that the illuminance detected by the sensors is high. In this case, the light amount of the radiation beam emitted from the radiation unit 12 is increased to increase the brightness of the image projected on the hologram screen. Thus, the noise light is rendered less conspicuous, and the recognizability of the image is improved.

In the case where the illuminance detected by the sensors is low and the light amount of the radiation beam is large, in contrast, the image is brightened often causing a halation. In such a case, the amount of the radiation beam 17 from the radiation unit 12 is reduced to improve the visual recognizability of the image.

In the case where the illuminance sensors 131, 132 detect the illuminance of a value more than the value at which it is expected that the effect of the noise cannot be avoided even if the light amount is maximized, the radiation unit 12 may be deactivated.

The controller is configured to activate or deactivate the radiation unit or adjust the sound volume of the speaker in accordance with the sound volume within the viewing angle detected by the sound volume sensor.

In the case where the sound of a certain decibel level is detected in the viewing angle by the volume sensor, the viewer is assumed to have entered or reached the periphery of the viewing angle, and the controller activates the radiation unit and the speaker.

In the case where the volume sensor fails to detect a sound of some decibel level within the viewing angle, no viewer is assumed to exist within or around the viewing angle, so that the controller deactivates the radiation unit and the speaker.

Further, in the case where a noise higher than a predetermined decibel level is detected by the volume sensor within the viewing angle, the controller adjusts the sound volume of the speaker upward so that the sound from the speaker may be clearly audible.

In the case where only a sound not more than a predetermined sound level is detected by the volume sensor within the viewing angle, on the other hand, the interior of the viewing angle is regarded to be in quiet state, and the sound volume of the speaker is adjusted downward by the controller not to give an uncomfortable feeling to the viewer.

The remaining component elements of the configuration are the same as the corresponding component elements of the embodiment B1.

The image information displaying system according to this embodiment can provide audio information as well as image information and at the same time can adjust the sound volume of the audio information corresponding to the condition within the viewing angle. Thus, an even better eye-catching effect can be secured.

The use of a directional volume sensor having a reflector capable of collecting the sound in the viewing angle is more effective to detect the sound volume within the viewing angle.

Embodiment B5

This embodiment will be explained with reference to the case in which, as shown in FIGS. 28 to 32, an image information displaying system is installed in an automotive vehicle constituting a mobile body.

Figure 28:
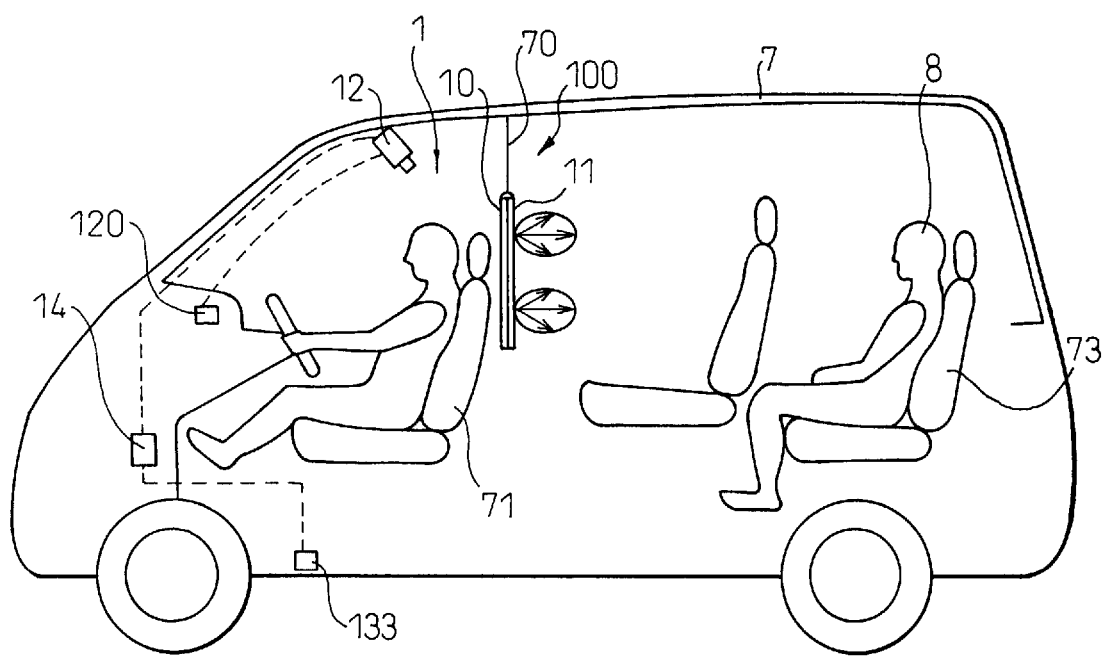
FIG. 28 is a diagram for explaining an image information displaying system mounted on a mobile body according to the embodiment B6.
Figure 29:
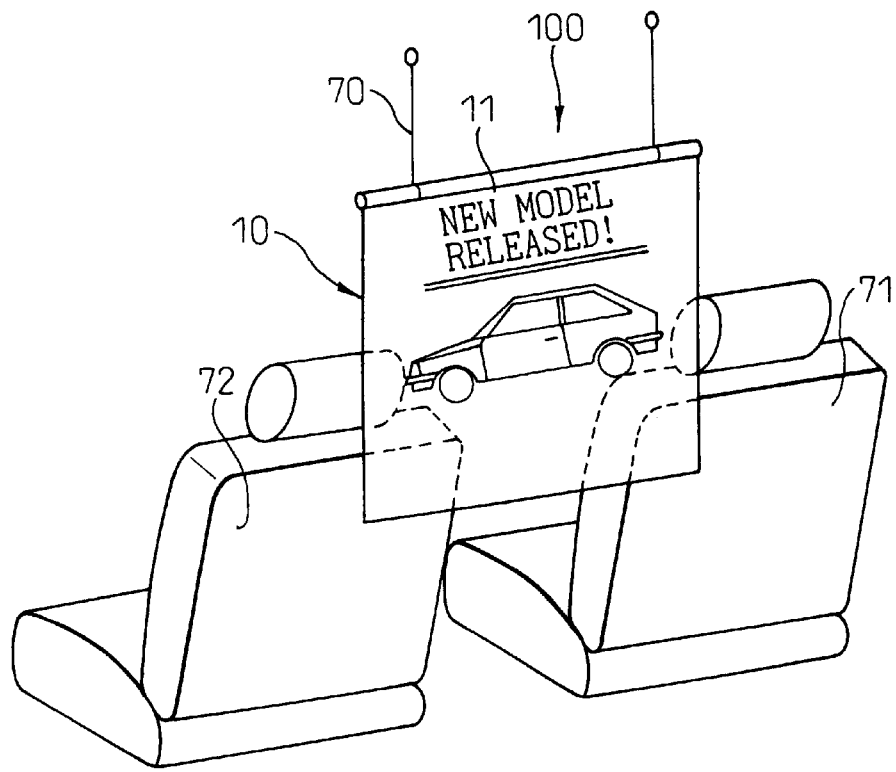
FIG. 29 is a diagram for explaining a manner in which the display unit of an image information displaying system is installed according to the embodiment B6.
Figure 30:
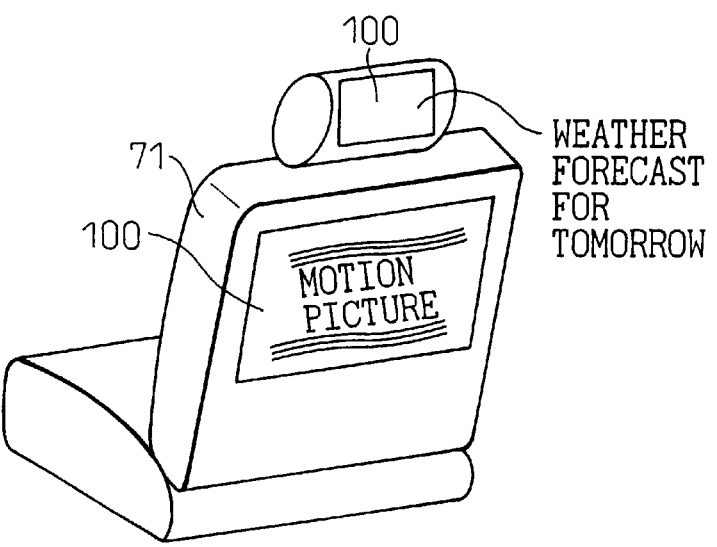
FIG. 30 is a diagram for explaining another manner in which the display unit of an image information displaying system is installed according to the embodiment B6.

As shown in FIGS. 28, 29, a display unit 100 including a transparent support 10 and a hologram screen 11 is suspended by use of a suspension 70 from the ceiling of a mobile body 7 between the driver's seat 71 and the front passenger seat 72 at such a position that a viewer 8 in the rear seat 73 can see the image information.

As shown in FIG. 28, the image information displaying system 1 according to the present embodiment comprises a vibration sensor 133, and in response to the signal from the vibration sensor 133, the blur of the image signal due to the vibration of the mobile body is corrected by the radiation control unit 14.

Figure 31:
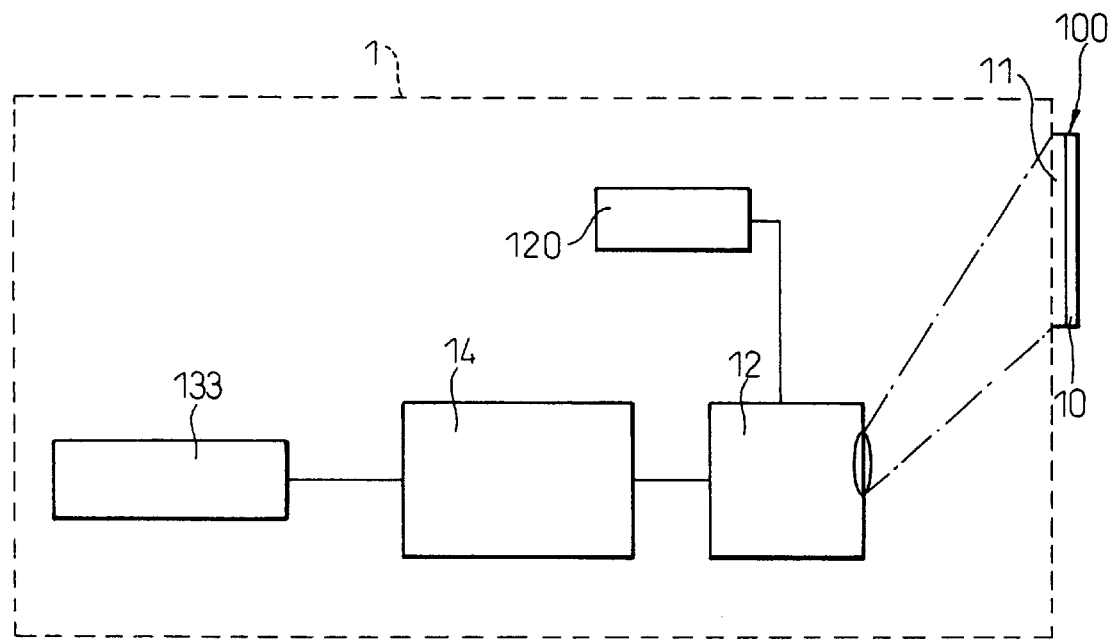
FIG. 31 is a diagram for explaining a configuration of an image information displaying system according to the embodiment B6.

This configuration will be described in detail with reference to FIG. 31.

The signal from the vibration sensor 133 is applied to an electrical correction circuit in the radiation control unit 14. Also, the image information is applied to the radiation unit 12 from a source 120 such as a video deck. The electrical correction circuit of the radiation control unit 14 reversely corrects the vibration of the image information inputted to the radiation unit 12, and the resulting image information is radiated on the display unit 100 from the radiation unit 12.

The other parts of the configuration are similar to the corresponding parts of the embodiment B1.

The image information displaying system 1 is mounted on the mobile body 7, and therefore the image information would fluctuate as it is presented to the viewer 8 unless some countermeasure is taken while the mobile body 7 is running. In this embodiment, however, the image information is radiated from the radiation unit 12 after being corrected based on the signal from the vibration sensor 133. Therefore, the effect of the vibration is offset and the image is free of blur.

The other functions and effects are the same as those of the embodiment B1.

The different points of the configuration of the information displaying system 1 according to this embodiment will be explained.

Figure 32:
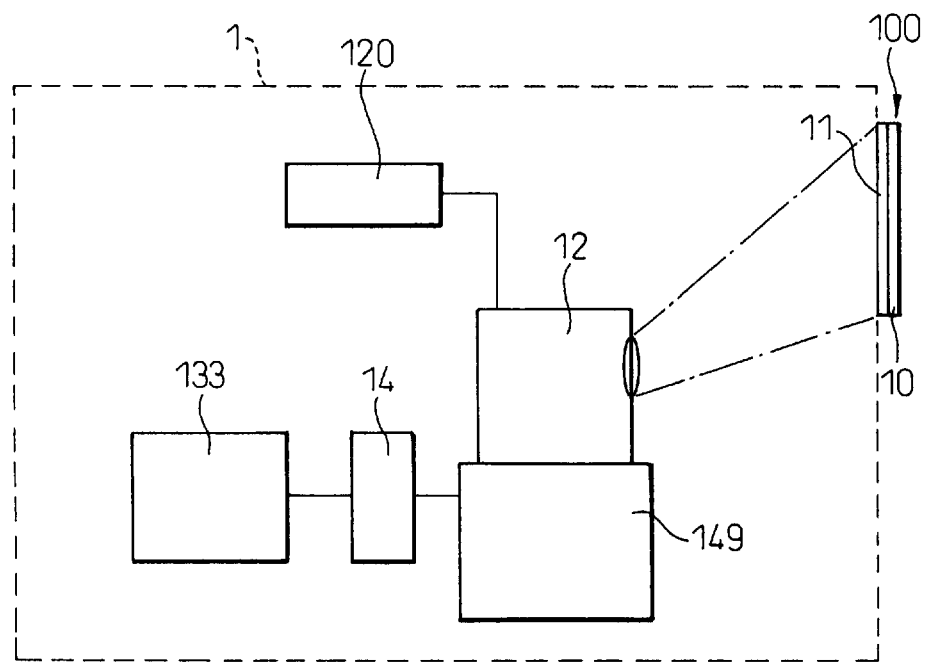
FIG. 32 is a diagram for explaining a configuration of an image information displaying system having a vibration control mechanism of a radiation unit according to the embodiment B6.

As shown in FIG. 32, the radiation control unit 14 is adapted to suppress, based on the signal from the vibration sensor 133, the vibrations of the radiation unit 12 due to the vibrations of the mobile body 7.

The signal from the vibration sensor 133 is applied to a vibration control mechanism 149 in the radiation unit 12 from the radiation control unit 14. Also, the image information, as in the preceding case, is applied to the radiation unit 12 from a source 120 such as a video deck. The radiation control unit 14 activates the vibration control mechanism 149 based on the signal of the vibration sensor 133, so that the effect of the vibration of the mobile body 7 on the radiation unit 12 is canceled.

In this configuration, the same effect is obtained as in the aforementioned configuration, and the viewer 8 can observe a correct image free of blur.

Embodiment B6

This embodiment refers to the correction of the image information by a central control unit.

The image information displaying system according to this embodiment has a configuration similar to that of the first embodiment, and comprises a hologram screen and a radiation unit. The radiation unit is made up of a liquid crystal projector.

Figure 33A:
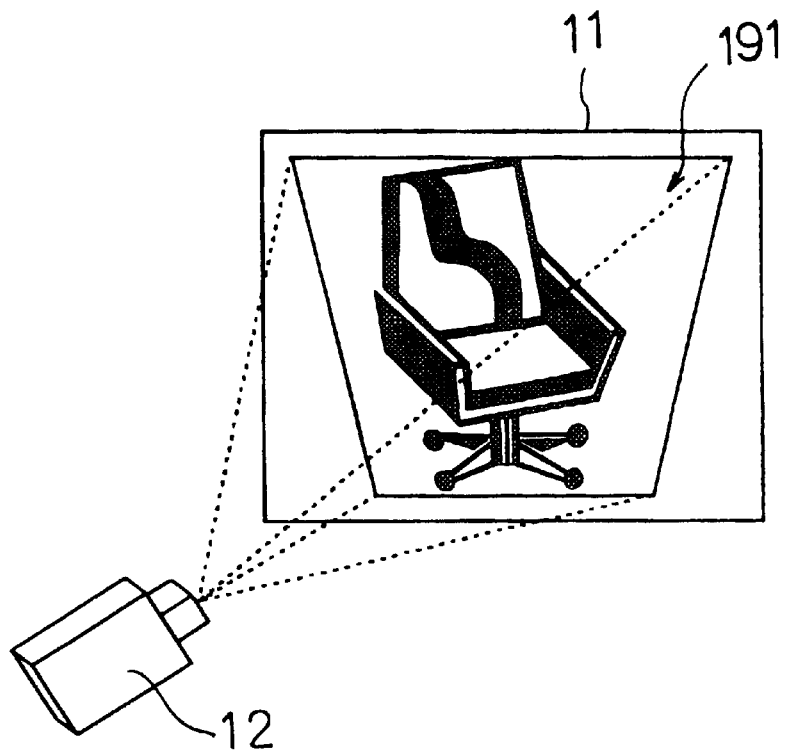
FIG. 33(a) is a diagram for explaining the image that has developed a trapezoidal distortion according to the embodiment B7.
Figure 33B:
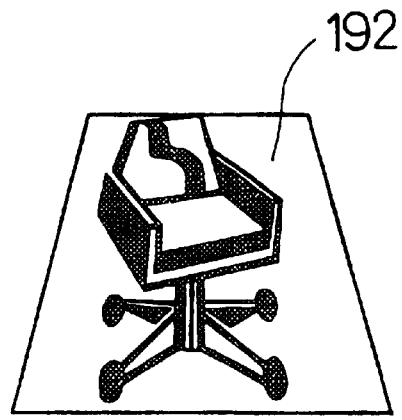
FIG. 33(b) is a diagram for explaining the image subjected to uniform compressive complementary correction according to the embodiment B7.
Figure 33C:
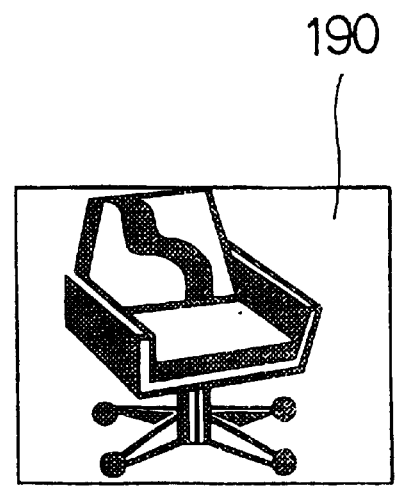
FIG. 33(c) is a diagram for explaining the image subjected to trapezoidal distortion correction according to the embodiment B7.

The image information distributed from the central control unit remains in normal state until it reaches the LCD of the liquid crystal projector. The image 190 in normal state is shown in FIG. 33(c).

The radiation unit 12 is fixed at a position diagonally below the hologram screen 11. Therefore, the beam radiated from the radiation unit 12 enters the hologram screen 11 from a diagonal direction. In many cases, therefore, as shown in FIG. 33(a), the image information is deformed into a trapezoid with the result that a distorted image 191 is projected on the screen. This is a trapezoidal distortion.

The amount of the trapezoidal distortion can be predetermined by calculations on relative positions of the radiation unit 12 and the hologram screen 11. In this embodiment, the central control unit is supplied beforehand with the relative positions of the hologram screen 11 and the radiation unit 12, and arithmetic operations are performed based on the input relation. According to the result of the arithmetic operations, the LCD signal of the liquid crystal projector constituting the radiation unit 12 is subjected to correction by uniform compressive complementation. As a result, a distorted image 192 as shown in FIG. 33(b) is produced by the LCD signal.

The radiation beam containing this image 192 is radiated on the hologram screen 11, whereby the deformation due to the trapezoidal distortion is offset by the distortion applied according to the arithmetic operations.

Thus, a normal image 190 as shown in FIG. 33(c) is displayed on the hologram screen.

The other points are similar to those of the embodiment B1.

As described above, according to this embodiment, an image information displaying system is obtained which can display a normal image free of trapezoidal distortion. The image information displaying system proper is not required to correct the trapezoidal distortion, and therefore requires no device for correcting the trapezoidal distortion. The image information displaying system can thus be reduced in cost. The other functions and effects are similar to those of the embodiment B1.

Embodiment C1

A hologram displaying system according to this embodiment will be explained with reference to FIGS. 34 to 40.

As shown in FIGS. 34 to 35, a hologram displaying system 1 according to this embodiment comprises a hologram screen 11 and a projector 12 for projecting an image beam 125 on the hologram screen 11. The distance A between the lower end 111 of the hologram screen 11 and the floor surface 31 is 110 cm.

The center height C of the hologram screen is 140 cm above the floor surface 31. The distance B from the upper end 112 to the horizontal ceiling surface 32 is 100 cm. The distance E between the left end 113 and the wall surface 33, and the distance between the right end 114 and the wall surface 34 are both 35 cm.

The image beam 125 is projected on the hologram screen 11 at a projection angle α of 35 degrees. The diagonal length of the hologram screen 11 is 40 inches. The projection distance D of the image beam 125 is 160 cm.

The projection distance D is the length between the center of the hologram screen 11 and a lens 120 of a projector constituting the projector 12.

Now, the hologram displaying system as it is installed according to this embodiment will be explained with reference to FIG. 36.

Figure 36:
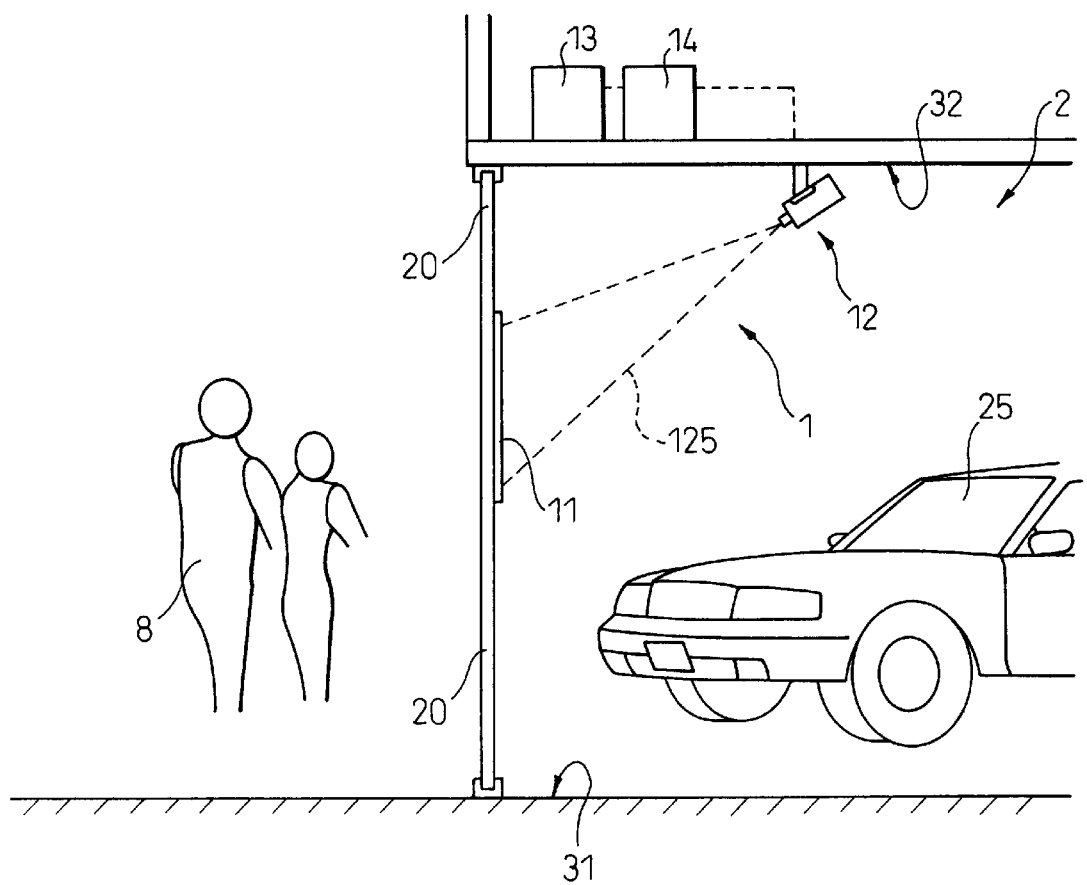
FIG. 36 is a diagram for explaining the layout of a hologram displaying system according to the embodiment C1.

FIG. 36 shows a showroom 20 in which the hologram displaying system 1 according to this embodiment is installed. The hologram-screen 11 is of transmission type, and is adhered to the window glass 20 in the showroom by spraying water on the surface of the hologram screen 11. The adhesive previously formed on the hologram screen 11 is an acrylic ester copolymer which forms a transparent film when dried.

A commodity 25 is exhibited behind the hologram screen 11.

As long as the image is not on display, the commodity 25 can be viewed through the hologram screen As shown in FIG. 34, the projector 12 is fixed by a fixing jig 129 on the horizontal ceiling surface 32 of the showroom 20. The fixing jig 129 fixes the projector 12 at an inclination angle B of 35 degrees to the horizontal ceiling surface. The lens 120 for projecting the image beam of the projector 12 is movable.

The projector 12 is a commercially available liquid crystal projector having a brightness of not less than 400 cd/m$^2$ (on condition that the image beam is normal white). Coefficients a and b of the projector 12 are 4.6 and −23.7, respectively.

The projector, to hide it from the viewer 8, can be covered with such objects as a foliage plant to present a greater feeling of wonder, thus improving the eye-catching effect.

A trapezoidal distortion correction mechanism 14 is arranged on the back of the horizontal ceiling surface 32 of the showroom 20. The arrangement also includes an optical disk having an image recorded therein and a reproduction unit 13 having the optical disk housed therein. The reproduction unit 13, the trapezoidal distortion correction mechanism 14 and the projector 12 are connected to each other by cable.

The image inputted from the reproduction unit 13 is reshaped by the trapezoidal distortion correction mechanism 14 so that the image may assume a correct shape when projected on the hologram screen 11. After that, the trapezoidal distortion correction mechanism 14 sends out the image to the projector 12.

The hologram screen 11 according to this embodiment has a sandwiched structure in which at least one hologram element of transmission type is attached to a PET film and another PET film is attached to a reflection surface thereof.

The viewing angle of the hologram screen according to this embodiment is 35 degrees vertical and 60 degrees horizontal.

Now, the functions and effects of the embodiment will be explained.

In the hologram displaying system 1 according to this embodiment, the hologram screen 11 is installed under the above-mentioned conditions, and therefore the viewing angle 89 is located just within the range of the line of sight of the viewer 8.

Consequently, the hologram displaying system 1 according to this embodiment can display the image within the range of the line of sight of the viewer 8. Also, the transparency of the hologram screen 11 makes the viewer 8 feel as if the image is projected in an empty space.

Thus, the hologram displaying system 1 according to this embodiment has the effect of attracting the attention of the people, i.e., has an eye-catching effect.

As described above, according to this embodiment, a hologram displaying system is provided which can display a superior image and has a good eye-catching effect.

With the hologram displaying system 1 according to this embodiment, the hologram screen 11 is installed in such a manner that the lower end 111 thereof meets the above-mentioned conditions.

As a consequence, the hologram screen 11 is installed some distance away from the floor surface 31 and thus a spatial margin is created around it. This prevents the heat from staying in the surroundings of the hologram screen 11 and heating the hologram screen 11.

As described above, in the hologram displaying system according to this embodiment, image distortion due to heat is prevented.

The hologram screen according to this embodiment, which is in the form of a flat plate, can assume other shapes such as tabular strips forming a screen or a curtain suspended from the ceiling.

These shapes permit the hologram screen to be rolled up or otherwise retracted or housed when not used for effective utilization of a limited space.

The hologram screen 11 according to this embodiment, which is attached on the window glass 20 in the showroom 2, can alternatively be installed by being fitted in an indoor partition or a commodity shelf.

The hologram screen 11 according to this embodiment can be installed by being attached on either the front or back of the window glass 20.

Figure 37B:
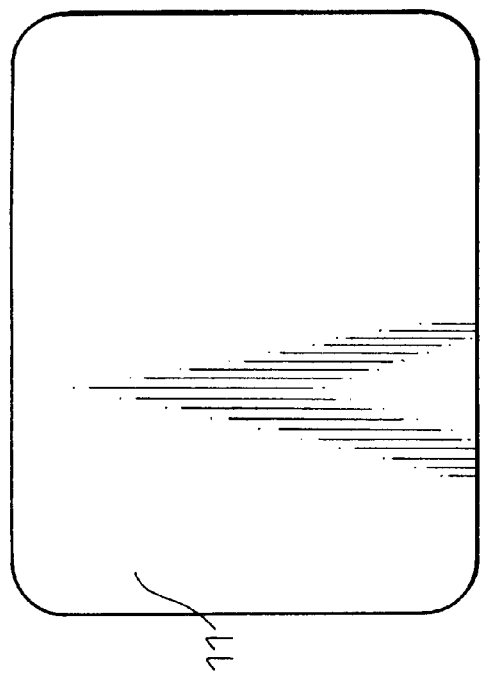
FIGS. 37(a) and 37(b) are plan views of a hologram screen with the corners thereof chamfered.
Figure 37D:
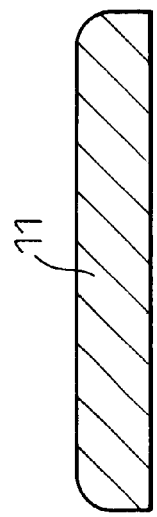
FIGS. 37(c) and 37(d) are sectional views of a hologram screen having a tapered section according to the embodiment C1.
Figure 37A:
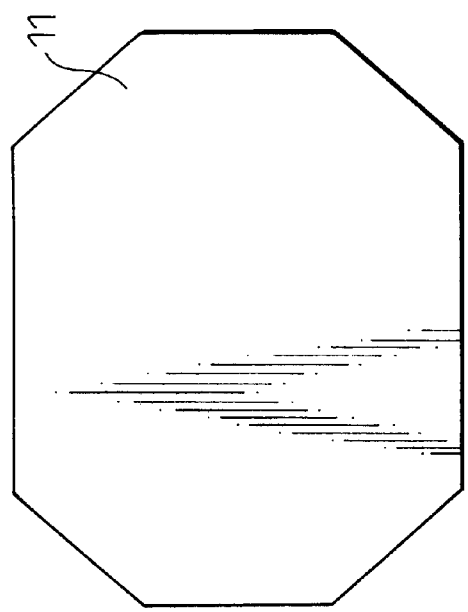
Figure 37C:
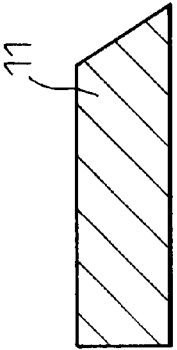

In order to prevent the hologram screen 11 from coming off at the time of cleaning or otherwise, as shown in FIGS. 37(c), 37(d), the hologram screen 11 can have a tapered section.

As an alternative, as shown in FIGS. 37(a), 37(b), the corners of the hologram screen 11 can be chamfered off. This chamfering can be effected by cutting off the corners in straight fashion as shown in FIG. 37(a), or by curving the corners as shown in FIG. 37(b).

Figure 38A:
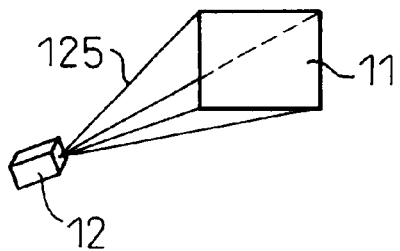
FIGS. 38(a) to 38(c) are diagrams for explaining a configuration employing a plurality of hologram screens according to the embodiment C1.

With the hologram displaying system 1 according to this embodiment, as shown in FIG. 38(a), the hologram screen 11 is installed as a single unit on which the image beam 125 is projected using a single projector 12.

Figure 38B:
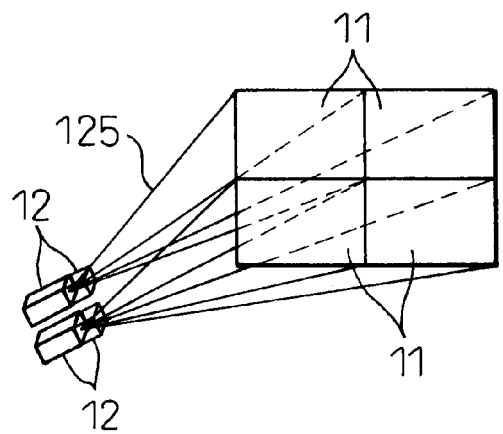

Instead, as shown in FIG. 38(b), four hologram screens 11 can be arranged side by side to form a single large screen on which four projectors 12 can project the image beam 125.

Figure 38C:
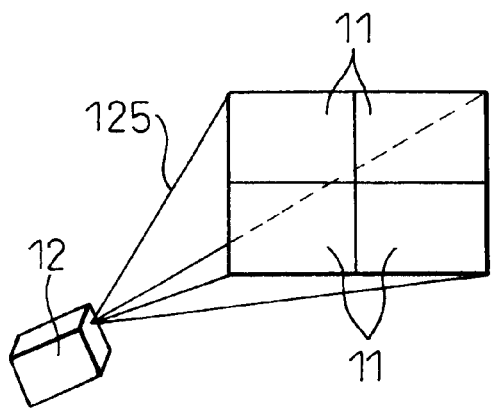

Further, as shown in FIG. 38(c), the image beam 125 can be projected on four hologram screens 11 from a single large projector 12.

Figure 39:
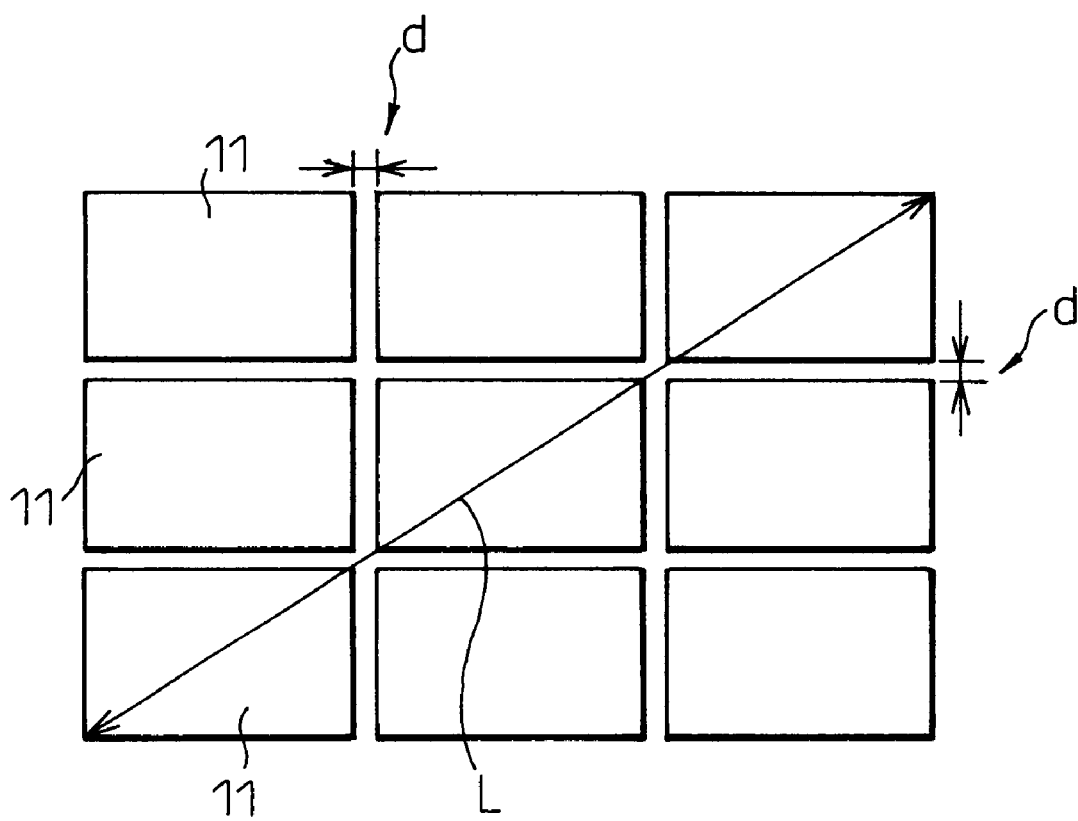
FIG. 39 is a diagram for explaining the diagonal length of a plurality of hologram screens combined according to the embodiment C1.

Also, as shown in FIG. 39, nine hologram screens 11, arranged in a matrix of three by three to form a single large screen having a diagonal length of L, can be used with the hologram displaying system 1.

In the case where a plurality of hologram screens 11 are arranged in the same plane to form a large single screen, the gap length d between adjacent hologram screens 11 is determined to some degree by the distance between the viewer and the hologram screen 11. Specifically, the farther the viewer stands from the hologram screen 11, the less ugly the image appears even when the gap is so large as to fragment the image.

In the case where the viewer stands several tens of meters away from the screen, for example, even a gap as large as 10-odd cm may be allowable.

The images that can be displayed on this hologram displaying system include, in addition to commodity advertisements, information on such matters as outings, weather forecasting, traffic news, commodity campaigns, new products, sales promotion means such as a quiz game, and alarm in case of an emergency. Also, the hologram displaying system according to this embodiment can be used as a virtual exhibition shelf for introducing commodities that cannot be physically exhibited. Also, in combination with a touch screen, the hologram display screen can be used as a touch panel.

Further, with the hologram displaying system 1 according to this embodiment, in order to display the full image with high quality on the hologram screen 11, the image is desirably finely adjusted using an image positioning mechanism or the like attached to the projector 12.

Since the hologram displaying system 1 according to this embodiment is configured of the hologram screen 11 of transmission type, such an adjustment as described above is required to be conducted by the operator observing the hologram screen 11 from the position of the viewer 8 shown in FIG. 1.

The hologram screen 11 of the hologram displaying system 1 according to this embodiment can be installed on the ceiling, the wall, the floor, etc., as well as on the window glass 20.

Figure 40A:
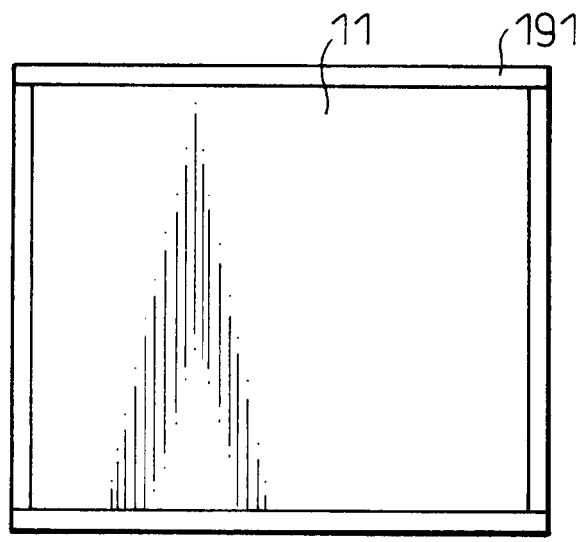
FIGS. 40(a) and 40(b) are diagrams for explaining a hologram screen bonded by an adhesive tape and a seal, respectively, according to the embodiment C1.
Figure 40B:
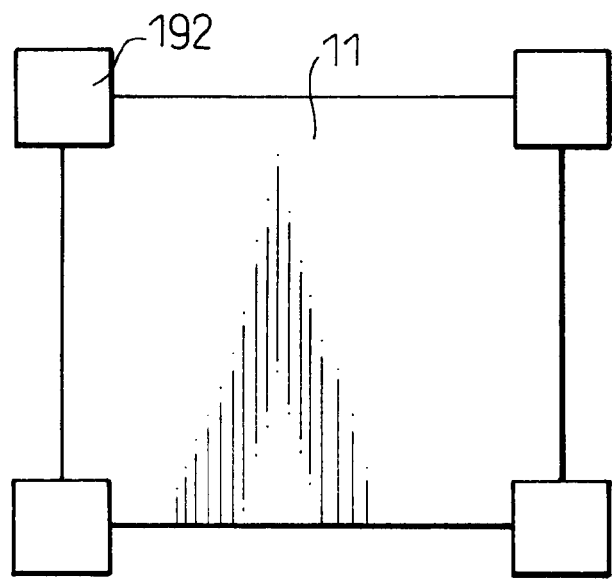

Also, the hologram screen 11 can be attached to the window glass 20 by use of adhesive tapes 191 or seals 192 as shown in FIG. 40. In this case, the whole edges of the hologram screen 11 may be fixed as shown in FIG. 40(a), or fixed only at the four corners as shown in FIG. 40(b).

The interference fringes indispensable for the hologram screen 11 to exhibit the functions thereof are very delicate and easily broken under a strong force. The use of the adhesive tapes 191 or the seals 192, however, permits the hologram screen 11 to be detached with a small force. The hologram screen 11, after being fixed, can thus be reused in another place.

The projector can be arranged outside the showroom and the image beam can be radiated from outside on the hologram screen attached on the window glass 20. In such a case, the image projected on the hologram screen can be observed also from inside the showroom with equal effect.

Further, the hologram screen can be attached on either the front or the back of the window glass 20 (i.e. either inside or outside the showroom). The effect is the same for either case.

Embodiment C2

Figure 41:
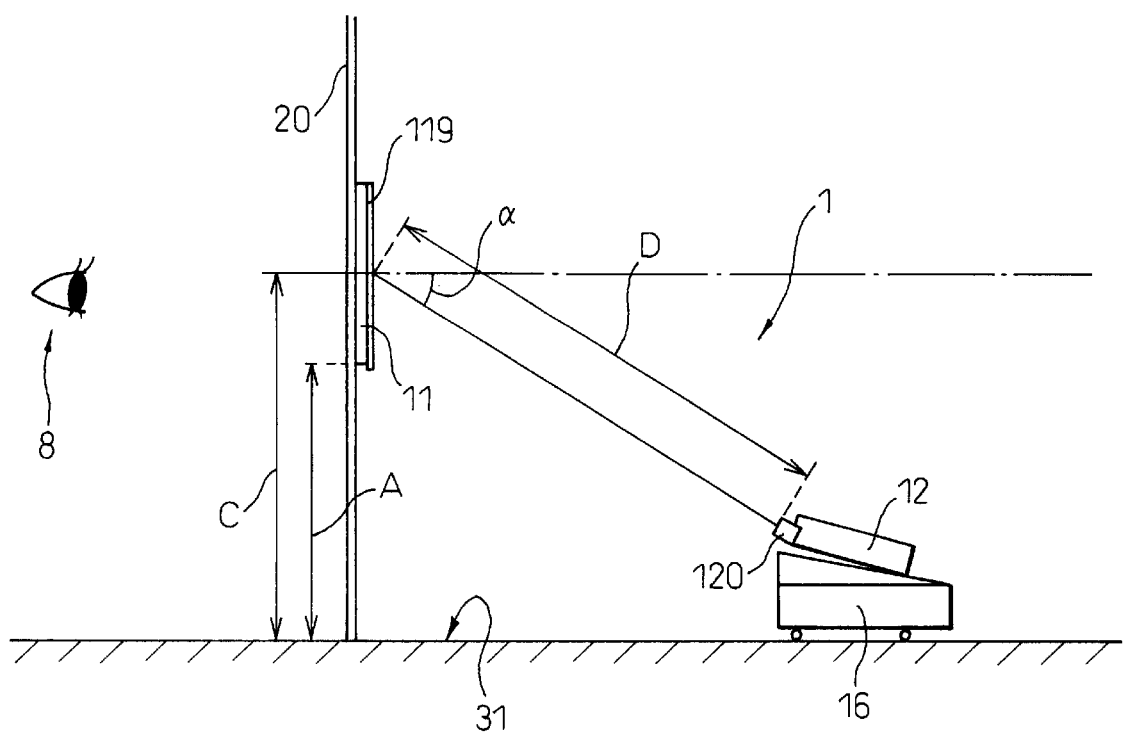
FIG. 41 is a side view for explaining a hologram displaying system according to the embodiment C2.
Figure 42:
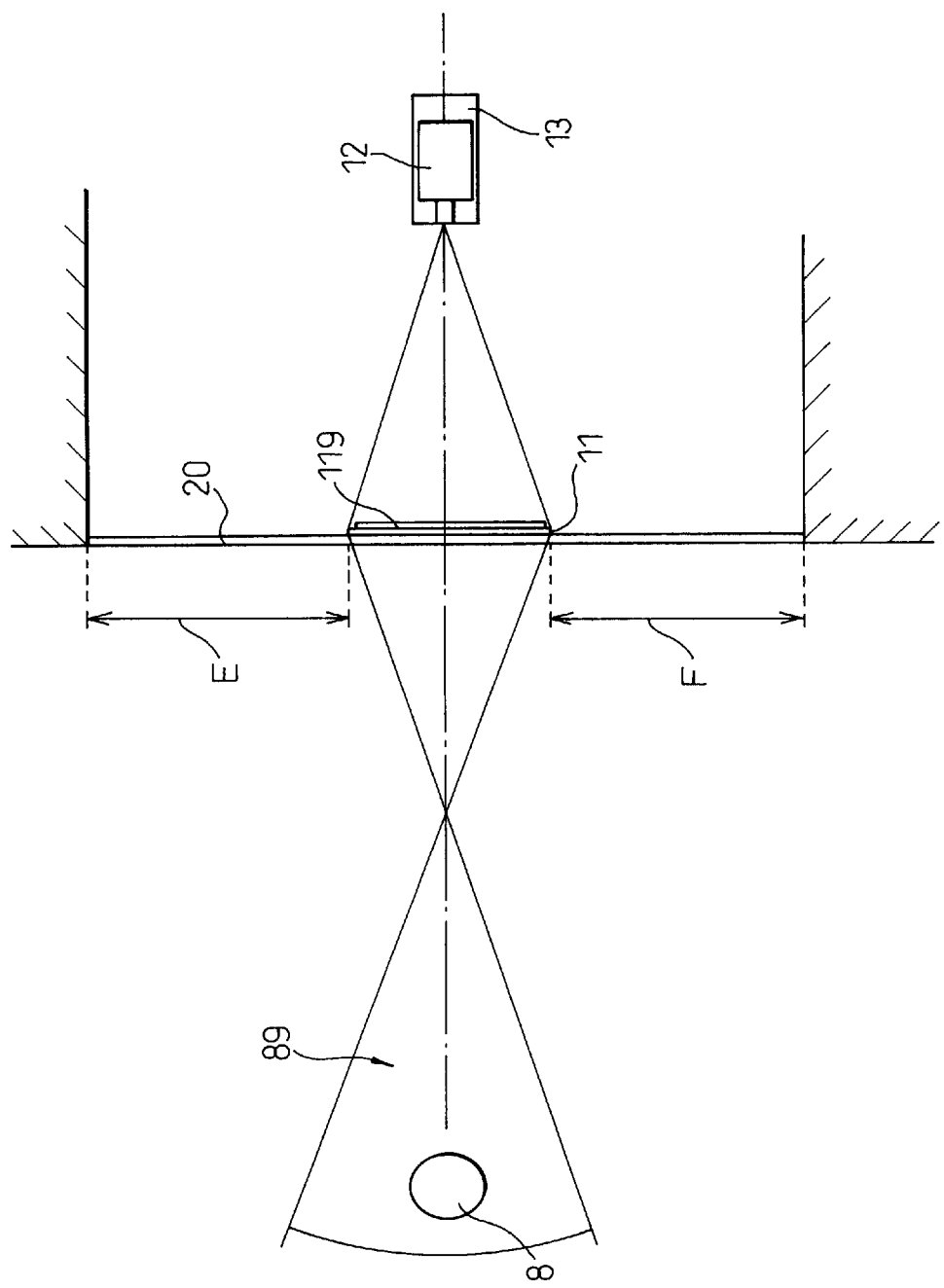
FIG. 42 is a plan view for explaining a hologram displaying system according to the embodiment C2.
Figure 43:
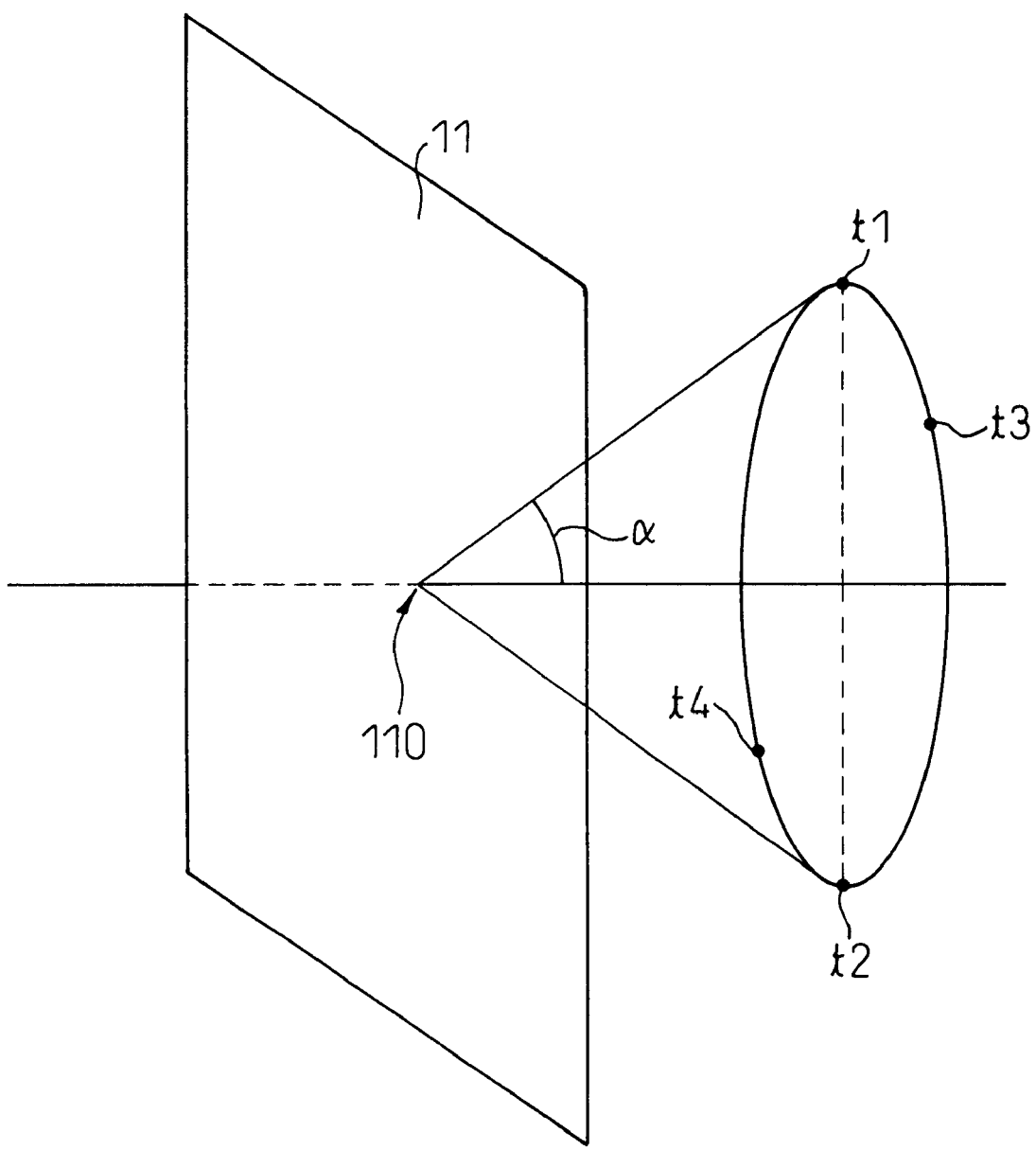
FIG. 43 is a diagram for explaining the positions at which the hologram screen and the projector can be installed when the projection angle is α according to the embodiment C2.

This embodiment refers to a hologram displaying system 1 with a projector 12 installed on the floor surface as shown in FIGS. 41 to 43.

As shown in FIGS. 41 and 42, the hologram displaying system 1 according to this embodiment is also installed in a showroom, and comprises a hologram screen 11 attached on the window glass 20 and a projector 12 fixed on a rest 16 and arranged on a floor surface 31.

With this hologram displaying system 1, the distance A is 130 cm, the center height C is 160 cm, the projection distance D is 160 cm, and the distances E and E are both 35 cm. The projection angle $\alpha$ is 35 degrees.

The hologram screen 11 of the hologram displaying system 1 according to this embodiment has attached thereto a thermal stress alleviating film 119 composed of biaxial oriented PET.

The other points are the same as the corresponding points of the embodiment C1.

With the hologram displaying system 1 according to this embodiment, the projector 12 is arranged under the hologram screen 11 which in turn is located at the relative position described above.

As a result, the zero-order beam from the projector 12 can be prevented from intruding the line of sight of the viewer 8. Also, the viewing angle of the hologram screen 11 can be included in the range of the line of sight of the viewer 8. Thus a superior eye-catching effect can be produced. Further, since the projector 12 is installed on the floor surface, ceiling work is not required, thus facilitating the installation work. Also, the thermal stress alleviating film 119 has an added effect of preventing the deformation of the interference fringes under thermal stress.

The other functions and effects of this embodiment are similar to those of the embodiment C1.

According to the embodiment C1 and this embodiment, the projector 12 is installed above and under the hologram screen 11, respectively. This indicates that the projector 12 is located at points t1 and t2, respectively, in FIG. 43.

As shown in FIG. 43, the projection angle of a indicates that the projector is installed on the circumference of the circle constituting the bottom surface of an assumed circular cone having an apex at the center 110 of the hologram screen 11.

Specifically, the projectors have the same projection angle α when they are installed at position t1 above the hologram screen 11, at position t2 under the hologram screen 11, at position t3 diagonally above the hologram screen 11 and at position t4 diagonally under the hologram screen 11.

Thus the installation of the projector on the circumference shown in FIG. 43 at the angle α of 20 to 50 degrees has the same effect as the embodiment C1.

Embodiment C3

Figure 44:
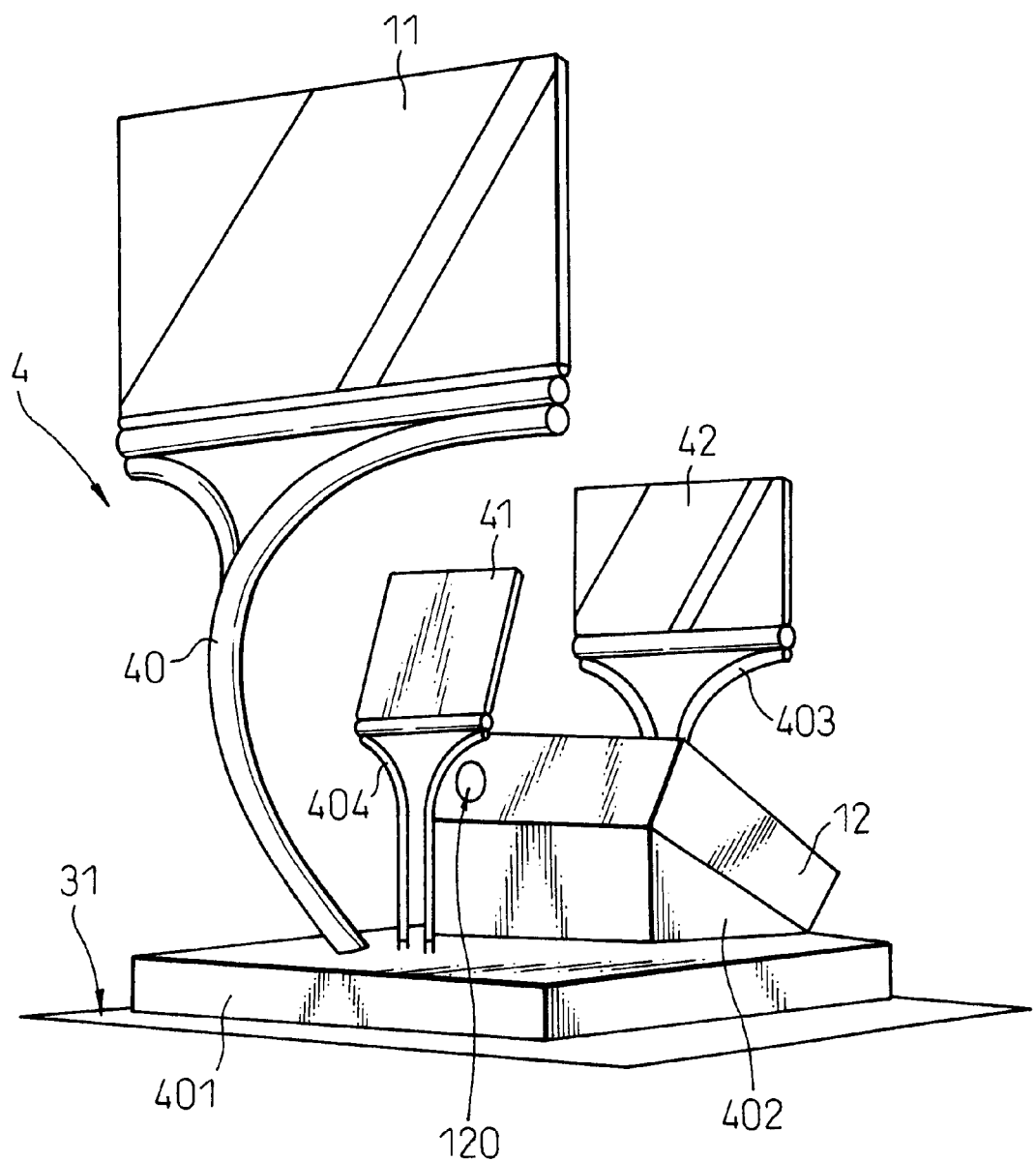
FIG. 44 is a perspective view for explaining a hologram displaying system having two mirrors according to the embodiment C3.

This embodiment refers to the hologram displaying system 1 further comprising two mirrors interposed between the hologram screen 11 and the projector 12, as shown in FIG. 44.

As shown in FIG. 44, the hologram displaying system 1 according to this embodiment comprises a hologram screen 11 supported on a support member 40 on a base 401, a first mirror 41 supported on a support member 404, a projector 12 arranged on a rest 402, and a rest 403 and a second mirror 41 arranged above the projector 12.

The other points are similar to those of the embodiment C1.

In the hologram displaying system 4 according to this embodiment, the image beam emitted from the projector 12 is reflected on the first mirror 41 and proceeds to the second mirror 42. The image beam, after being reflected on the second mirror 42, reaches the hologram screen 11 on which the image is projected.

With the hologram displaying system 4 according to this embodiment, the distance is short between the projector 12 and the hologram screen 11. The fact that the image beam is reflected on the first mirror 41 and the second mirror 42, however, makes it possible to project an image not less than 40 inches in size while at the same time forming a long beam path as required to secure the incident angle of 35 degrees.

Consequently, the hologram displaying system 4 that can be installed in a limited space is realized.

The beam path length can be adjusted by employing either a concave or a convex mirror. Also, the difference of the beam path length between the upper and lower ends of the hologram screen and the vertical out-of-focus condition can be adjusted by coloring the mirrors and the hologram screen.

Especially, the use of an aspheric mirror will have the effect of correcting the trapezoidal distortion.

Embodiment C4

Figure 45:
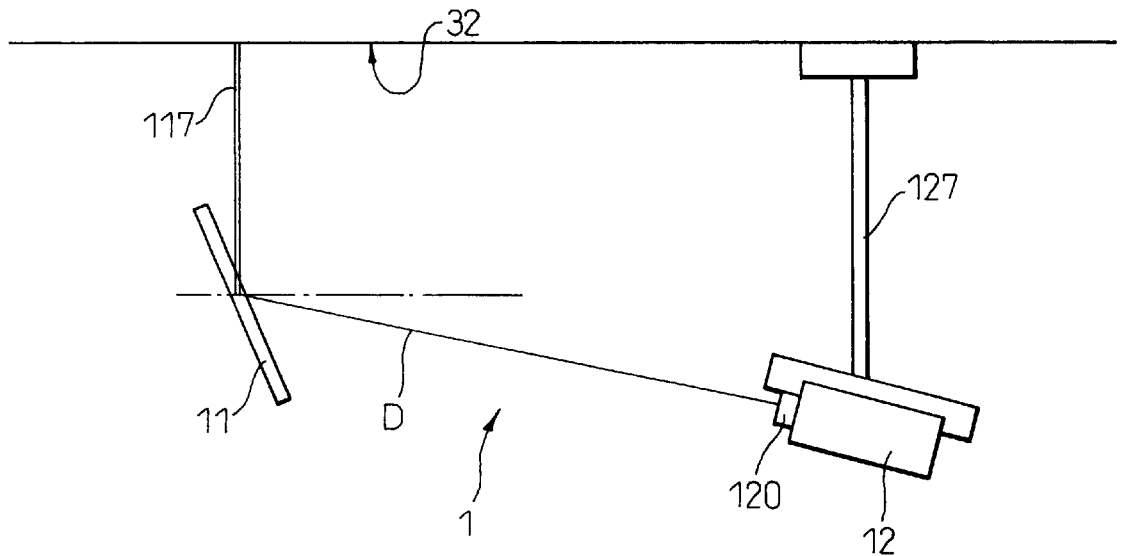
FIG. 45 is a side view for explaining a hologram displaying system so configured that a hologram screen and a projector are suspended from the ceiling according to the embodiment C4.

This embodiment refers to a hologram displaying system 1 comprising a projector 12 and a hologram screen 11 suspended from the horizontal ceiling surface 32 by means of arms 117, 127 as shown in FIG. 45.

With the hologram displaying system 1, the hologram screen 11 is installed diagonally to secure some distance between the hologram displaying system 1 and the hologram screen 11 and thus to secure the projection distance D of the image beam.

The other parts of the configuration, the functions and effects of this embodiment are similar to those of the embodiment C1.

Embodiment C5

In the hologram displaying system according to this embodiment, the image beam issued from the projector is reflected on a mirror driven by a drive unit to change the angle thereof. In this way, an image is formed on a plurality of hologram screens.

Further, a rail is laid on the ceiling surface and the floor surface to move the projector alone or with the mirror to produce a fresh dramatic presentation effect.

Embodiment C6

Figure 46:
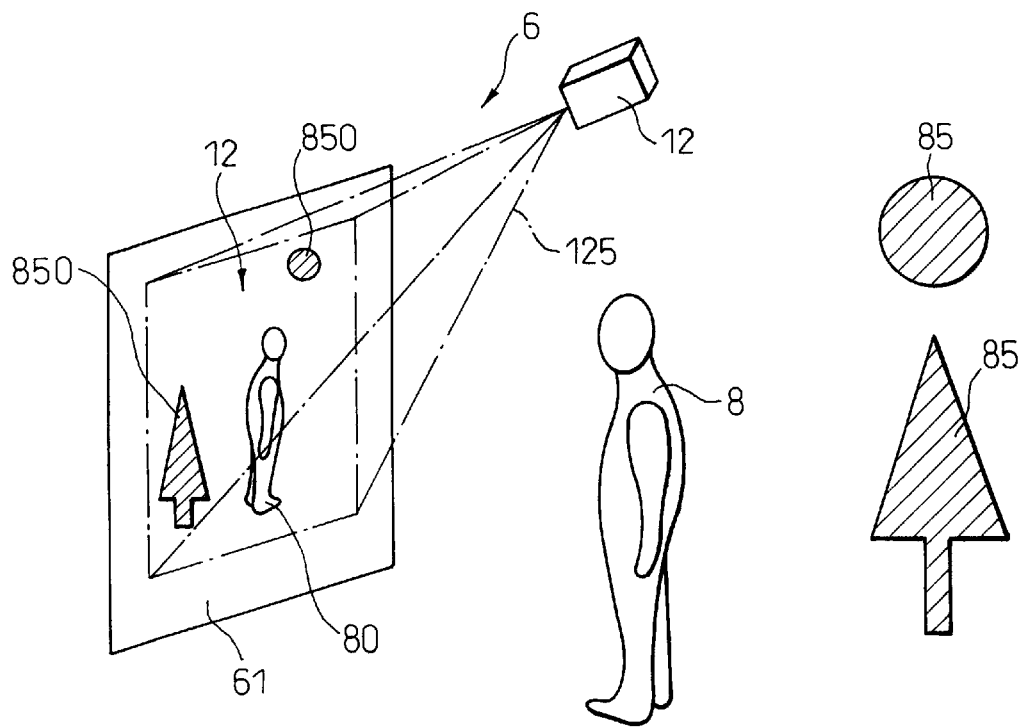
FIG. 46 is a diagram for explaining the configuration and the operation of a hologram displaying system according to the embodiment C6.
Figure 47:
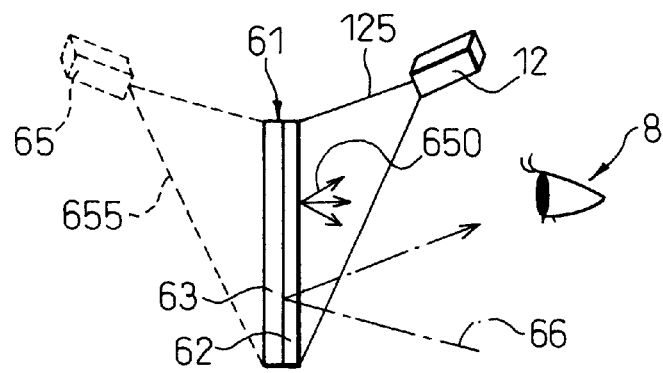
FIG. 47 is a diagram for explaining the principle of a hologram displaying system according to the embodiment C6.
Figure 48:
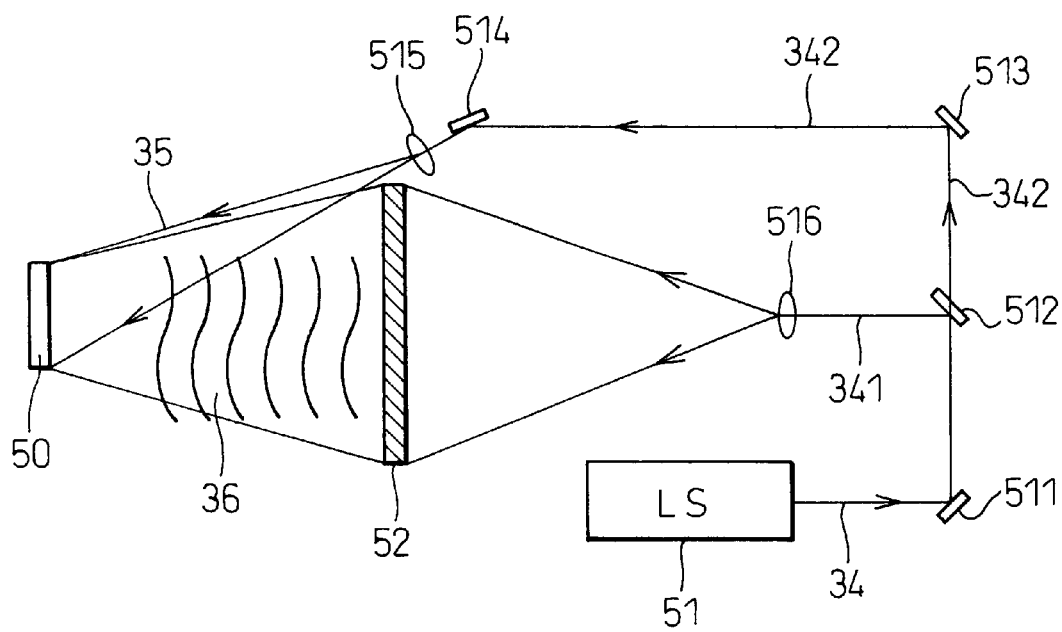
FIG. 48 is a diagram for explaining a method of fabrication of a hologram displaying system of transmission type according to the present invention.
Figure 49:
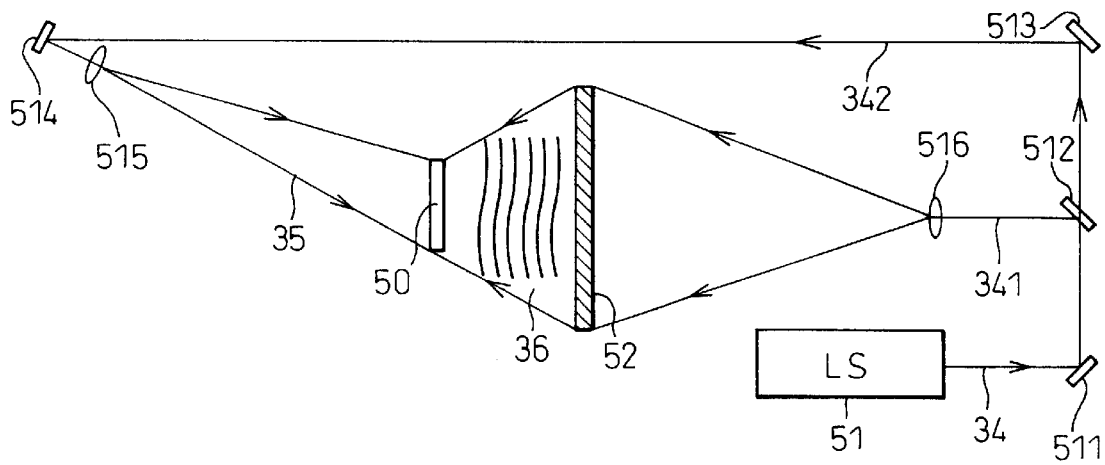
FIG. 49 is a diagram for explaining a method of fabrication of a hologram displaying system of reflection type according to the invention.

This embodiment refers to a hologram displaying system using a hologram screen configured of a mirror and a hologram element attached to each other, as shown in FIGS. 46 and 47.

The hologram screen 61 according to this embodiment includes a hologram element 62 and a mirror 63 attached to each other as shown in FIG. 47.

The image beam 125 is projected on the hologram screen 61 by use of the projector 12 from the side nearer to the hologram element 62.

The other points are similar to the corresponding points of the embodiment C1.

The image is projected on the hologram screen 61 according to this embodiment in the following-described manner.

As shown in FIG. 47, the image beam 125 is projected from the projector 12. The image beam 125 is transmitted through the hologram element 62 of transmission type and reaches the mirror 63. The image beam 125 is reflected on the surface of the mirror 63 and enters the hologram element 62 again.

The hologram element 62 is of transmission type, and the interference fringes in the hologram element 62 diffracts only the image beam 125 reflected from the mirror 63, in the direction of arrow 650. As a result, the projector 125 arranged nearer to the hologram element 62 appears as if located at the position designated by numeral 65 nearer to the mirror 63 and it appears as if the image beam 655 is projected from the particular position.

As shown in FIG. 46, assume that the hologram 61 is installed at a sufficiently bright place. The surrounding scenes 85 are imaged on the mirror 63 (the arrow 66 in FIG. 47 represents the trace of the beam projected from the scenes 85). The person 8 standing in front of the hologram screen 61 is also reflected on the mirror 63. In this way, the image 850 of the scenes 85 and the image 80 of the person 8 are displayed on the hologram screen 61.

As described above, the surrounding scenes 85, the person 8 standing in front of the hologram screen 61 and the image reproduced by the image beam 125 projected from the projector 12 are all displayed on the hologram screen 61.

Consequently, the person 8 can feel as if any of the scenes 85 on his/her background is displayed on the hologram 61 and the image is displayed thereon.

The viewer himself/herself thus appears in the projected image. In this way, a dramatic presentation improving the eye-catching effect can be realized and a synthetic picture can be made.

Embodiment C7

Figure 50:
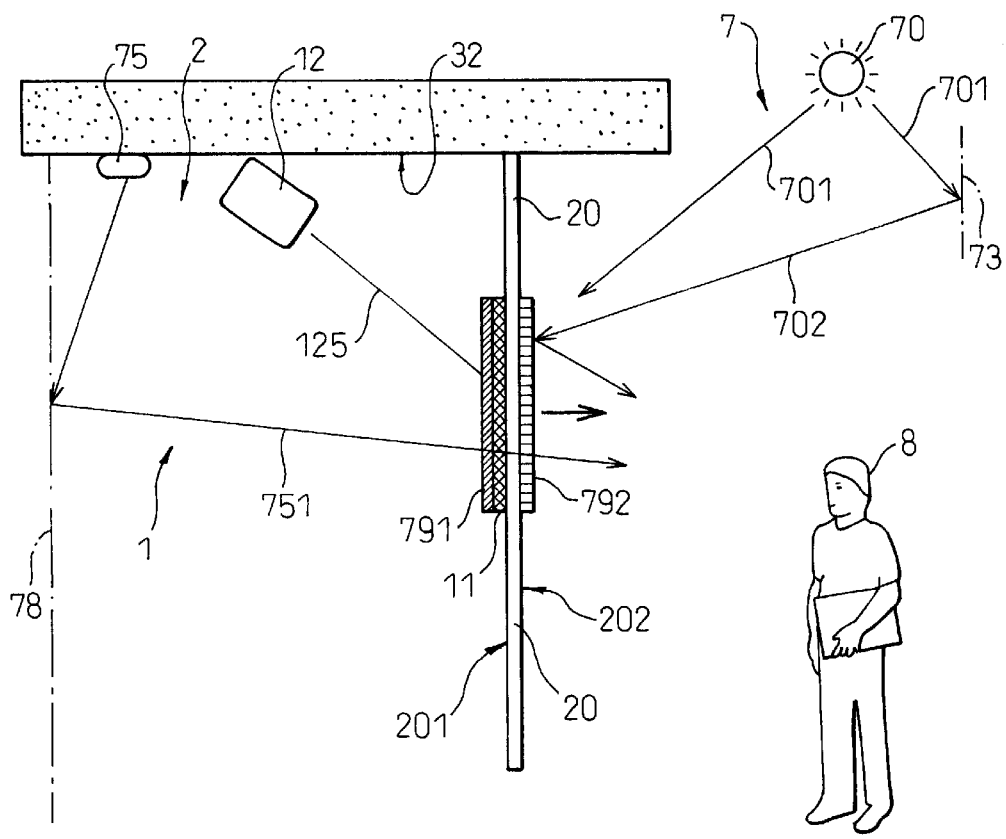
FIG. 50 is a diagram for explaining the configuration of a hologram displaying system according to the embodiment C7.
Figure 51A:
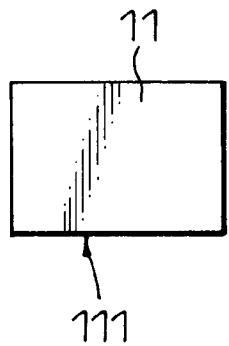
FIGS. 51(a) to 51(f) are diagrams for explaining various forms of hologram screen according to the embodiment C8.
Figure 51B:
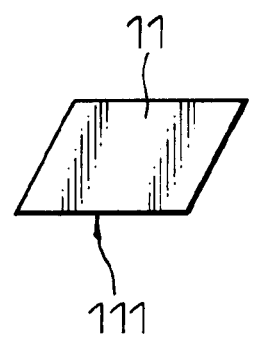
Figure 51C:
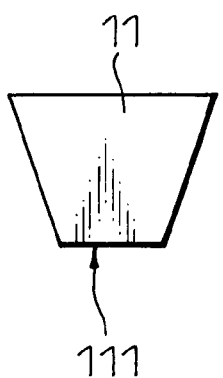
Figure 51D:
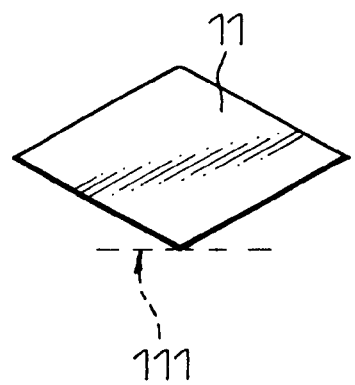
Figure 51E:
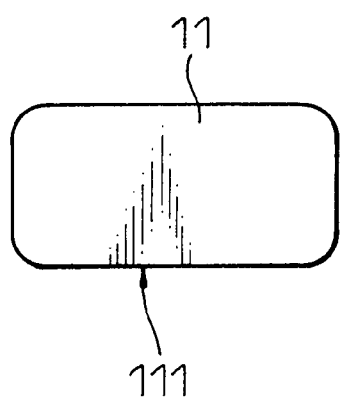
Figure 51F:
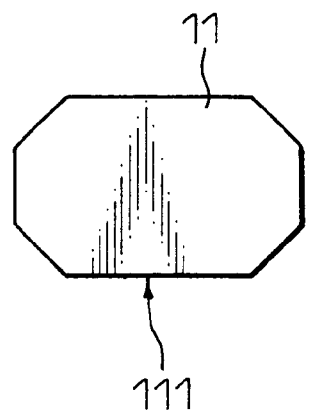
Figure 52A:
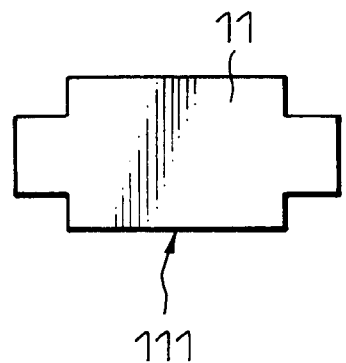
FIGS. 52(a) to 52(f) are diagrams for explaining various forms of hologram screen according to the embodiment C8.
Figure 52B:
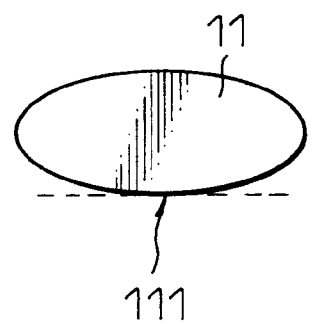
Figure 52C:
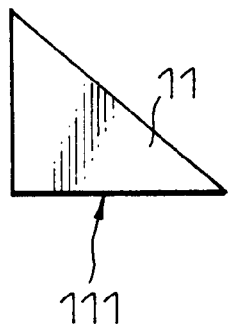
Figure 52D:
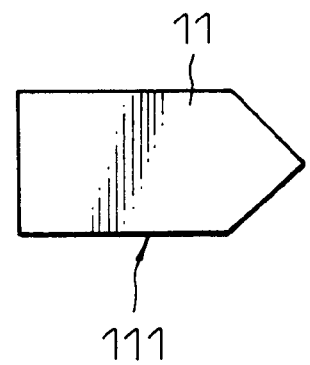
Figure 52E:
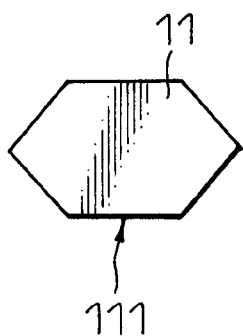
Figure 52F:
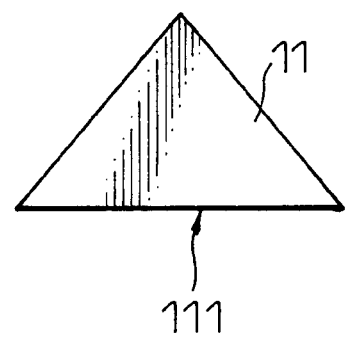
Figure 53A:
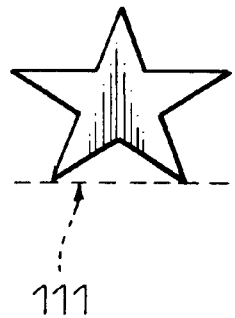
FIGS. 53(a) to 53(f) are diagrams for explaining various forms of hologram screen according to the embodiment C8.
Figure 53B:
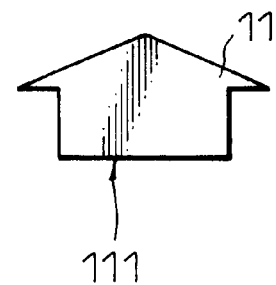
Figure 53C:
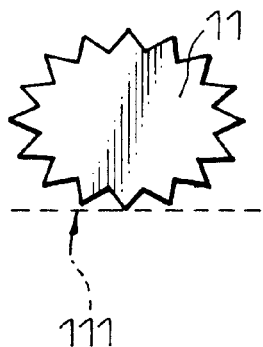
Figure 53D:
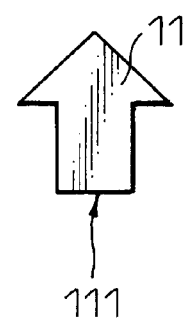
Figure 53E:
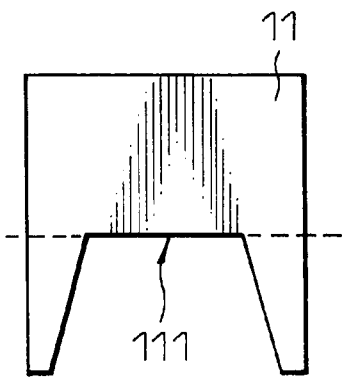
Figure 53F:
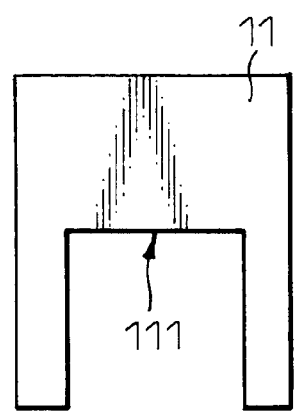

This embodiment refers to a hologram displaying system configured of an antireflection film or a polarizing film attached to a hologram screen as shown in FIG. 50.

As shown in FIG. 50, the hologram displaying system 1 according to this embodiment, like the first embodiment, comprises a hologram screen 11 attached to the inner surface 201 of the window glass 20 and a projector 12 fixed on the horizontal ceiling surface 32.

A polarizing film 791 is attached to the indoor side of the hologram screen 11, and an antireflection film 792 is arranged on the outdoor side through the window glass 20. In FIG. 50, reference numeral 78 designates an indoor background, numeral 7 an outdoor environment, and numeral 79 an outdoor background. The other points are similar to the first embodiment.

In the hologram displaying system 1 according to this embodiment, the following phenomenon occurs when the viewer observes the hologram screen.

An illumination unit 75 is arranged on the horizontal ceiling surface 32 of the showroom 2. The illumination beam emitted from the illumination unit 75 is reflected on the indoor background 78 or the like and the beam 751 reflected from it reaches the viewer 8 through the hologram screen 11.

In the outdoor environment 7, on the other hand, the direct sunlight 701 from the sun 70 is reflected on the outdoor background 79 or the like. The beam 702 thus reflected is reflected on the window glass 20 and reaches the viewer 8.

Suppose that the polarizing film 791 according to the embodiment is lacking. The reflected beam 751 would be superposed on the image projected on the hologram screen, so that the background brightness increases for a reduced image contrast.

Assume, again, that the antireflection film 792 according to this embodiment is lacking. The direct sunlight 701 and the reflected beam 702 would be reflected on the window glass 20. Therefore, the outdoor beam brightness would increase and the image contrast would be reduced.

The image contrast, as described above, is determined as (image white screen brightness+background brightness+external light brightness)/(image black screen brightness+background brightness+external light brightness).

As described above, the background brightness and the external light brightness can be reduced and the image contrast can be improved further by providing the polarizing film 791 and the antireflection film 792 on the hologram screen 1.

Thus, the image appearance can be produced which secures a sufficient eye-catching effect.

Embodiment C8

This embodiment refers to a hologram screen used with a hologram displaying system.

As shown in FIGS. 51(*a*) to 51(*f*), 52(*a*) to 52(*f*) and 53(*a*) to 53(*f*), the hologram screen 11 is not limited to a specific shape, but a hologram screen 11 of the desired shape including those described or not described in the accompanying drawings can be used with the hologram displaying system.

In each of the hologram screens 11 shown in FIGS. 51(*a*) to 51(*f*), 52(*a*) to 52(*f*) and 53(*a*) to 53(*f*), the lower end 111 is represented by a straight side (FIGS. 51(*a*), 52(*a*), 53(*b*)), or in the case of an apex or an arc, by a straight line passing the lowest point thereof (FIGS. 51(*d*), 52(*b*), 53(*a*)). In the case where the lowest portion substantially fails to contribute to the image, another portion contributing to the image constitutes the lowest end (FIGS. 53(*e*), 53(*f*)).

The center of each hologram screen 11 of FIGS. 51(*a*) to 51(*f*), 52(*a*) to 52(*f*) and 53(*a*) to 53(*f*) coincides with the gravitational center thereof. The center of the hologram screen shown in FIGS. 53*e*, 53*f*, however, is the gravitational center of the portion contributing to the image.

Figure 54:
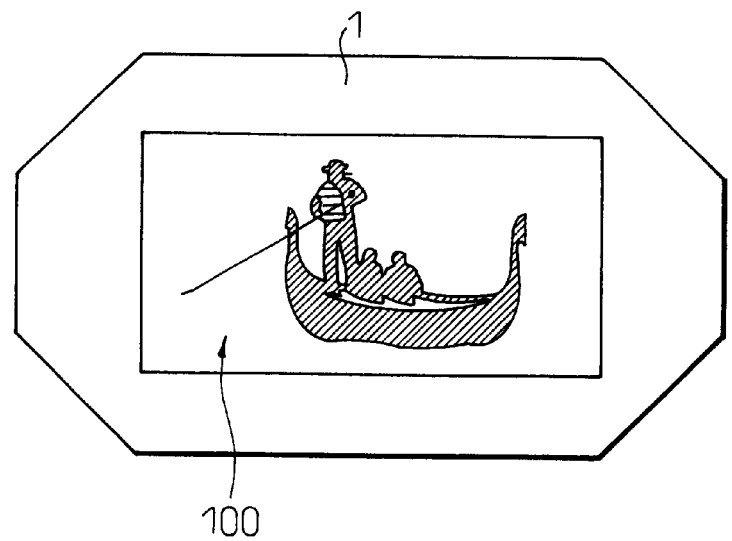
FIG. 54 is a diagram for explaining a hologram screen on which an image 100 is partially projected according to the embodiment C8.

When the image beam is projected on the hologram screen 11, the image is not necessarily formed over the entire surface of the hologram screen 11 but, as shown in FIG. 54, the image 100 can be projected partially using the zoom function of the projector.

The other points are similar to those of the embodiment C1.

Also, even when using the hologram screen 11 described above, the same functions and effects as those of the first embodiment can be obtained.

Embodiment C9

Figure 55:
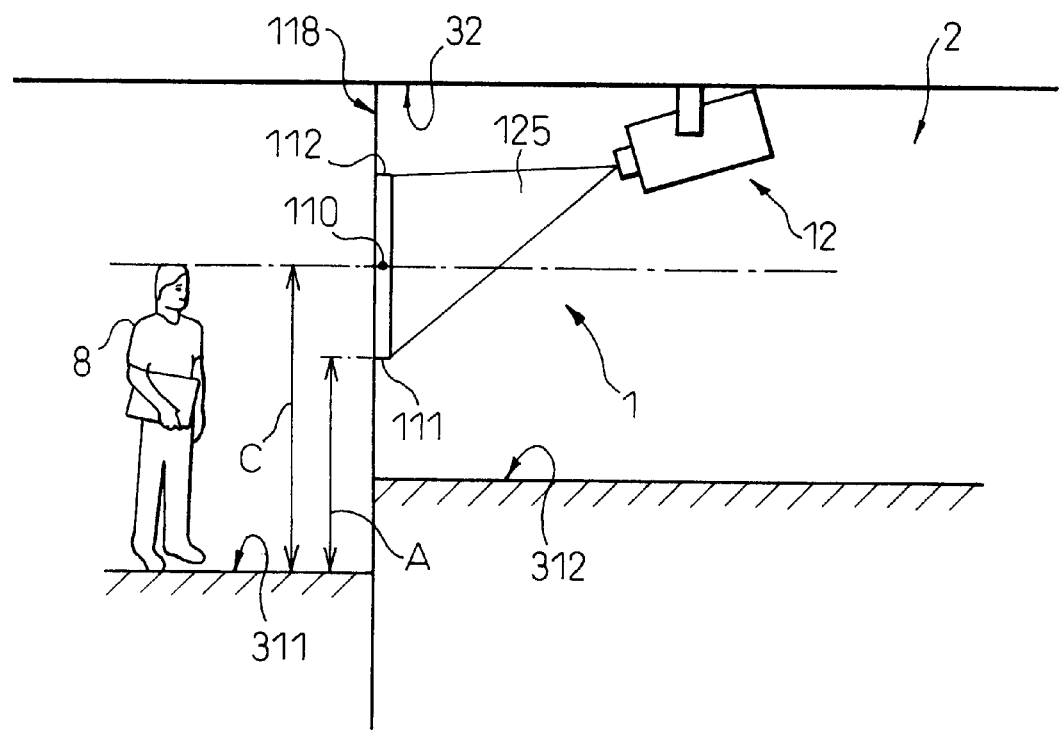
FIG. 55 is a diagram for explaining a hologram displaying system installed at a place in a showroom where the floor level of the showroom and the floor on which the viewer stands are different in height according to the embodiment C9.
Figure 56:
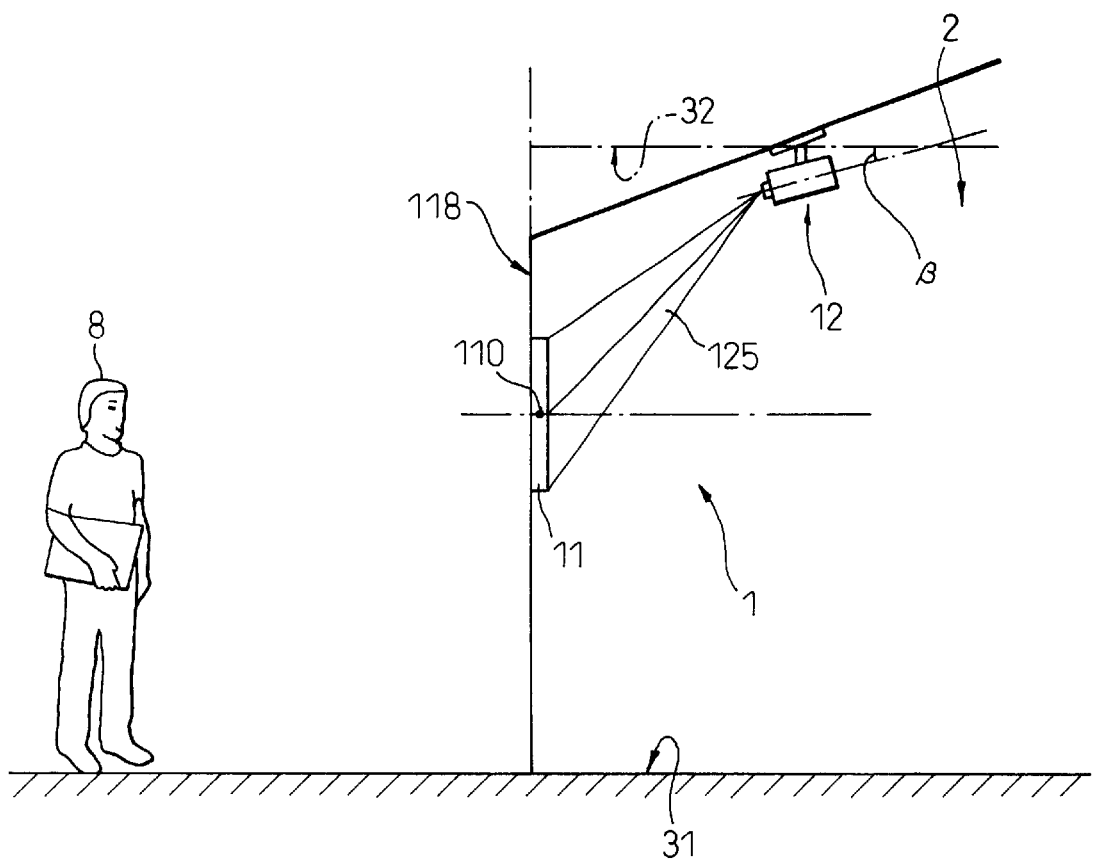
FIG. 56 is a diagram for explaining a hologram displaying system installed in a showroom having a diagonal ceiling surface according to the embodiment C9.

This embodiment refers to the place of installation of the hologram displaying system as shown in FIGS. 55 and 56.

As shown in FIG. 55, the hologram displaying system according to this embodiment has a configuration similar to that of the first embodiment. The floor surface 311 on which the viewer 8 stands has a height different from the floor surface 312 in the showroom 2 in which the hologram displaying system 1 is installed.

In this case, the lower end 111 of the hologram screen 11 is 80 to 180 cm above the floor surface 311 (designated A in FIG. 55), or the center of the hologram screen 11 is located 110 to 210 cm above the floor surface 311 (designated by C in FIG. 55).

Also, as shown in FIG. 56, the hologram displaying system 1 according to this embodiment has a configuration similar to that of the first embodiment, and is installed in the showroom 2 having an inclined ceiling.

In this showroom 2, the straight line perpendicular to the surface 118 on which the hologram screen 11 is installed is not parallel to the ceiling surface. The plane containing the straight line perpendicular to the installation surface 118 is considered as a horizontal ceiling surface 32. The angle β formed by the horizontal ceiling surface 32 and the projector 12 is an inclination angle which is 20 to 50 degrees.

What is claimed is:

1. An image information displaying system comprising:
    a display unit, including:
        a transparent support;
        a hologram screen attached to the transparent support;
        a projector for projecting image information onto the hologram screen; and
        a sensor to determine whether or not there is a person within an area in a viewing angle of the hologram screen; and
    a controller for controlling the projector in response to signals from the sensor such that, if the sensor detects a person within the area in the viewing angle of the hologram screen, the controller activates the projector to project the image information onto the hologram screen.

2. The system of claim 1, wherein the viewing angle corresponds to an area whose brightness is K0/2 or over, where K0 is a brightness value at a front center point of the hologram screen).

3. The system of any one of claims 1 and 2, wherein the sensor is an illuminance sensor.

4. The system of claim 1, further comprising:
a speaker for providing audio information, wherein the sensor is a volume sensor.

5. The system of claim 1, wherein the sensor is designed to sense people who enter the viewing angle.

6. The system of claim 1, wherein the system is installed in a mobile body.

7. The system of claim 6, wherein the system is installed between two seats arranged in the mobile body.

8. The system of any one of claims 6 and 7, wherein the hologram screen is retractable when not used.

9. The system of any one of claims 6 and 7, wherein the sensor is a vibration sensor, and the controller corrects, according to signals from the vibration sensor, a blur of image information due to the vibration of the mobile body.

10. The system of any one of claims 6 and 7, wherein the sensor is a vibration sensor, and the controller suppresses, according to signals from the vibration sensor, the vibration of the projector due to the vibration of the mobile body.

11. The system of claim 1, wherein the system comprises at least one additional display unit, wherein the controller acts as a central control unit which controls each display unit and controls at least one of image and sound information, said central control unit being in electronic communication with each respective display unit.

12. The system of claim 11, wherein the central control unit receives signals from the sensor through said electronic communication, and according to the signals, controls the projector.

13. The system of claim 1, wherein the hologram screen has a diffuser recorded thereon.

14. An image information displaying system comprising a plurality of image information displaying units and a central control unit in electronic communication through respective communication lines with said plurality of image information displaying units, each of said image information displaying units including a transparent support, a hologram screen attached to said transparent support and a radiation unit for radiating image information on said hologram screen;
said image information displaying units being so configured as to be controlled by said central control unit in response to signals electronically transmitted therefrom through said communication lines.

15. An image information displaying system according to claim 14, comprising selected one of first and second configurations;
said first configuration being that said central control unit performs the process of correcting said image information;
said second configuration being that a relay is interposed between said central control unit and said image display unit, and a selected one of said central control unit and said relay performs the process of correcting said image information.

16. An image information displaying system according to claim 15, wherein said process of correcting said image information is correcting a trapezoidal distortion.

17. An image information displaying system according to claim 15, wherein said process of correcting said image information is at least a selected one of color adjustment, color correction, image position adjustment, image brightness adjustment and image contrast adjustment.

18. An image information displaying system according to claim 14, further comprising means for supplying audio information, wherein a selected one of said central control unit and said relay is capable of correcting said audio information.

19. An image information displaying system according to claim 14, further comprising a sensor for detecting the ambient condition in the viewing angle of said hologram screen and a radiation control unit for controlling said radiation unit based on the signal from said sensor.

20. An image information displaying system according to claim 19, wherein said viewing angle is in a range not less than K0/4, where K0 is the brightness value at the center front of the hologram screen.

21. An image information displaying system according to claim 19, wherein said sensor is an illuminance sensor.

22. An image information displaying system according to claim 19, wherein said sensor is a sound volume sensor.

23. An image information displaying system according to claim 19, wherein said sensor detects the entry of a viewer into said viewing angle.

24. An image information displaying system according to claim 19, installed on a mobile body.

25. An image information displaying system according to claim 24, installed between at least two seats in a mobile body.

26. An image information displaying system according to claim 24, wherein said hologram screen is retractable when not in use.

27. An image information displaying system according to claim 24, wherein said sensor is a vibration sensor, and said radiation control unit corrects the blur of said image information caused by the vibration of said mobile body, based on the signal from said vibration sensor.

28. An image information displaying system according to claim 24, wherein said sensor is a vibration sensor, and said radiation control unit suppresses the blur of said radiation unit caused by the vibration of said mobile body, based on the signal from said vibration sensor.

29. An image information displaying system according to claim 19, wherein selected one of said central control unit and said relay receives a signal from said sensor, through said electronic communication, and controls said radiation control unit based on said signal.

30. An image information displaying system according to claim 14, wherein a diffuser is recorded in said hologram screen.

* * * * *